US011334044B2

(12) United States Patent
Goyal

(10) Patent No.: US 11,334,044 B2
(45) Date of Patent: May 17, 2022

(54) BUILDING SYSTEM WITH SEMANTIC MODELING BASED SEARCHING

(71) Applicant: Johnson Controls Tyco IP Holdings LLP, Milwaukee, WI (US)

(72) Inventor: Siddharth Goyal, Germantown, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/379,661

(22) Filed: Apr. 9, 2019

(65) Prior Publication Data
US 2020/0159723 A1    May 21, 2020

Related U.S. Application Data

(60) Provisional application No. 62/769,447, filed on Nov. 19, 2018, provisional application No. 62/791,991, filed on Jan. 14, 2019.

(51) Int. Cl.
*G06F 16/248* (2019.01)
*G05B 19/042* (2006.01)
(Continued)

(52) U.S. Cl.
CPC ..... *G05B 19/0426* (2013.01); *G05B 13/0265* (2013.01); *G06F 3/0482* (2013.01);
(Continued)

(58) Field of Classification Search
CPC ...... G05B 19/0426; G05B 2219/23008; G05B 2219/2642; G05B 2219/25011;
(Continued)

(56) References Cited

U.S. PATENT DOCUMENTS 5,812,394 A    9/1998 Lewis et al.
8,401,991 B2   3/2013 Wu et al.
(Continued)

FOREIGN PATENT DOCUMENTS

CN    106406806 A    2/2017
CN    107598928 A    1/2018
(Continued)

OTHER PUBLICATIONS

Balaji, et al., Brick: Metadata schema for portable smart building applications, dated Feb. 11, 2018, 20 pages.
(Continued)

*Primary Examiner* — Beau D Spratt
(74) *Attorney, Agent, or Firm* — Foley & Lardner LLP

(57) ABSTRACT

A building system including one or more memory devices configured to store instructions thereon, wherein the instructions, when executed by one or more processors, cause the one or more processors to cause a user interface of a user device to display a plurality of nodes of a semantic building model and a plurality of relationships between the plurality of nodes of the semantic building model. The instructions cause the one or more processors to receive a search input from the user device, generate a search result based on the search input, wherein the search result comprises an indication of a portion of nodes of the plurality of nodes and a portion of relationships of the plurality of relationships, and cause the user interface to display the portion of nodes of the plurality of nodes and the portion of relationships of the plurality of relationships.

20 Claims, 30 Drawing Sheets

(51) Int. Cl.
| | |
|---|---|
| *G06F 9/451* | (2018.01) |
| *G06F 16/242* | (2019.01) |
| *G06F 30/13* | (2020.01) |
| *G06F 40/30* | (2020.01) |
| *G06F 3/04817* | (2022.01) |
| *G06F 3/0482* | (2013.01) |
| *G06F 3/0484* | (2022.01) |
| *G05B 13/02* | (2006.01) |
| *G06F 111/20* | (2020.01) |
| *G06F 3/0481* | (2022.01) |

(52) U.S. Cl.
CPC ........ *G06F 3/0484* (2013.01); *G06F 3/04817* (2013.01); *G06F 9/451* (2018.02); *G06F 16/242* (2019.01); *G06F 16/248* (2019.01); *G06F 30/13* (2020.01); *G06F 40/30* (2020.01); *G05B 2219/23008* (2013.01); *G05B 2219/25011* (2013.01); *G06F 3/0481* (2013.01); *G06F 2111/20* (2020.01)

(58) Field of Classification Search
CPC ..... G05B 13/0265; G05B 15/02; G06F 40/35; G06F 3/0481; G06F 3/0484; G06F 9/451; G06F 2111/20; G06F 8/38; G06F 40/30; G06F 16/242; G06F 16/248; G06F 3/0482; G06F 30/13; G06F 3/04817
See application file for complete search history.

(56) References Cited

U.S. PATENT DOCUMENTS

| | | | |
|---|---|---|---|
| 8,751,487 | B2 | 6/2014 | Byrne et al. |
| 8,990,127 | B2 | 3/2015 | Taylor |
| 9,811,249 | B2 | 11/2017 | Chen et al. |
| 9,813,880 | B2 | 11/2017 | Jactat |
| 9,886,478 | B2 | 2/2018 | Mukherjee |
| 10,169,454 | B2 | 1/2019 | Ait-Mokhtar et al. |
| 10,169,486 | B2 | 1/2019 | Park et al. |
| 10,171,586 | B2 | 1/2019 | Shaashua et al. |
| 10,425,244 | B2 * | 9/2019 | Rao .................. G06Q 30/0276 |
| 2006/0052884 | A1 | 3/2006 | Staples et al. |
| 2007/0055757 | A1 | 3/2007 | Mairs et al. |
| 2007/0156677 | A1 * | 7/2007 | Szabo ................ G06F 16/2457 |
| 2008/0168375 | A1 | 7/2008 | Papadimitriou et al. |
| 2009/0307255 | A1 * | 12/2009 | Park ...................... G06Q 10/10 |
| 2010/0251129 | A1 | 9/2010 | Beringer et al. |
| 2010/0262616 | A1 * | 10/2010 | Eskolin ................. G06F 16/51 |
| | | | 707/769 |
| 2011/0008000 | A1 | 1/2011 | Tokushima |
| 2011/0077779 | A1 | 3/2011 | Fuller et al. |
| 2011/0088000 | A1 | 4/2011 | Mackay |
| 2011/0190951 | A1 | 8/2011 | Lee |
| 2011/0218777 | A1 | 9/2011 | Chen et al. |
| 2012/0022698 | A1 | 1/2012 | Mackay |
| 2012/0124452 | A1 | 5/2012 | Parmet et al. |
| 2013/0212129 | A1 | 8/2013 | Lawson et al. |
| 2013/0346943 | A1 | 12/2013 | Bharatia |
| 2014/0078151 | A1 * | 3/2014 | Garr .................... G06F 16/283 |
| | | | 345/440.2 |
| 2014/0325292 | A1 | 10/2014 | Spivey et al. |
| 2015/0019710 | A1 | 1/2015 | Shaashua et al. |
| 2015/0212714 | A1 | 7/2015 | Hua et al. |
| 2015/0331895 | A1 | 11/2015 | Zhang et al. |
| 2016/0154547 | A1 * | 6/2016 | Tokuoka .............. G06F 3/0482 |
| | | | 715/232 |
| 2016/0342152 | A1 | 11/2016 | Bliss et al. |
| 2016/0350364 | A1 | 12/2016 | Anicic et al. |
| 2016/0357828 | A1 | 12/2016 | Tobin et al. |
| 2016/0370258 | A1 | 12/2016 | Perez |
| 2017/0017221 | A1 | 1/2017 | Lamparter et al. |
| 2017/0111210 | A1 | 4/2017 | Chakrobartty et al. |
| 2017/0123397 | A1 | 5/2017 | Billi et al. |
| 2017/0293276 | A1 | 10/2017 | Hubauer et al. |
| 2017/0351957 | A1 | 12/2017 | Lecue et al. |
| 2018/0114140 | A1 | 4/2018 | Chen et al. |
| 2018/0195749 | A1 | 7/2018 | Sinha et al. |
| 2018/0203961 | A1 | 7/2018 | Aisu et al. |
| 2018/0232422 | A1 | 8/2018 | Park et al. |
| 2018/0232423 | A1 | 8/2018 | Park et al. |
| 2018/0232459 | A1 | 8/2018 | Park et al. |
| 2018/0292797 | A1 | 10/2018 | Lamparter et al. |
| 2018/0341234 | A1 * | 11/2018 | Piaskowski ............ G05B 15/02 |
| 2018/0359111 | A1 | 12/2018 | Harvey |
| 2019/0005025 | A1 * | 1/2019 | Malabarba ............ G06F 40/295 |
| 2019/0025786 | A1 | 1/2019 | Park et al. |
| 2019/0026359 | A1 | 1/2019 | Park et al. |
| 2019/0095644 | A1 | 3/2019 | Park et al. |
| 2019/0097904 | A1 | 3/2019 | Park et al. |
| 2019/0158309 | A1 | 5/2019 | Park et al. |
| 2019/0287000 | A1 | 9/2019 | Smith et al. |
| 2019/0295125 | A1 | 9/2019 | Marino et al. |
| 2020/0133252 | A1 | 4/2020 | Zhang et al. |
| 2020/0162354 | A1 | 5/2020 | Drees et al. |

FOREIGN PATENT DOCUMENTS

| | | |
|---|---|---|
| WO | WO-2017/036886 A1 | 3/2017 |
| WO | WO-2019/112581 | 6/2019 |

OTHER PUBLICATIONS

Koh, et al., Scrabble: Transferrable Semi-Automated Semantic Metada Normalization using Intermediate Representation, dated Nov. 7-8, 2018, Shenzen, China, 10 pages.
Balaji et al., "Brick: Towards a Unified Metadata Schema for Buildings," dated Nov. 16-17, 2016, 10 pages.
Malhorta et al. LSTM-based Encoder-Decoder for Multi-sensor Anomaly Detection, Dated Jul. 11, 2016, 5 pages.

* cited by examiner

BUILDING SYSTEM WITH SEMANTIC MODELING BASED SEARCHING

CROSS-REFERENCE TO RELATED PATENT APPLICATION

This application claims the benefit of and priority to U.S. Provisional Patent Application No. 62/791,991 filed Jan. 14, 2019 and U.S. Provisional Patent Application No. 62/769,447 filed Nov. 19, 2018, the entirety of each of these patent applications is incorporated by reference herein.

BACKGROUND

The present disclosure generally relates to building systems of a building. More particularly, the present disclosure relates to information management of building data, control of building equipment, and analytics generation for the building equipment.

In a building, multiple different sub-systems (e.g., environmental control, security, fire suppression, lighting, etc.) may exist. Furthermore, across multiple buildings, the same, or similar systems may also be implemented. Even though the sub-systems in a single building, or across multiple buildings, may be similar there is no efficient mechanism for implementing control applications, defining custom operating logic, generating user interface graphics or visualizations to display building data, and searching through and understanding building information. Software applications for performing building operations may be developed in a time inefficient manner, i.e., similar software may be developed multiple times for each of multiple sub-system implementations and/or for each of multiple different buildings.

SUMMARY

Semantic Building Applications

One implementation of the present disclosure is a building system for implementing building applications. The building system includes one or more memory devices configured to store instructions thereon, that, when executed by one or more processors, cause the one or more processors to receive a static semantic building application, wherein the static semantic building application comprises one or more operations and a first semantic description of the static semantic building application. The instructions cause the one or more processors to determine, based on building information describing a building and the first semantic description of the static semantic building application, one or more implementation details of a particular implementation of the static semantic building application, generate, based on the one or more implementation details, a dynamic semantic building application comprising the one or more operations and a second semantic description of the dynamic semantic building application, and operate the dynamic semantic building application.

In some embodiments, the dynamic semantic building application includes a performance requirement indicating whether performance results of the dynamic semantic building application operating are normal or abnormal. In some embodiments, the instructions cause the one or more processors to identify whether the static semantic building application is available to be implemented based on the building information and generate the dynamic semantic building application in response to a determination that the static semantic building application is available to be implemented. In some embodiments, the instructions cause the one or more processors to generate a resolution to resolve an operating conflict caused by the dynamic semantic building application and a second building application operating and operate the dynamic semantic building application based on the resolution.

In some embodiments, the first semantic description of the static semantic building application describes the static semantic building application with graph including nodes, each node of the nodes describing a characteristic of the static semantic building application, wherein the graph further includes relationships, the relationships relating the nodes to an identifier of the static semantic building application.

In some embodiments, the static semantic building application is at least one of a control application configured to control a piece of building equipment or an analytics application configured to analyze data of the piece of building equipment.

In some embodiments, the static semantic building application is a generic description of the dynamic semantic building application, wherein the dynamic semantic building application is specific implementation of the static semantic building application, wherein the second semantic description of the dynamic semantic building application comprises implementation details to operate the dynamic semantic building application.

In some embodiments, the instructions cause the one or more processors to determine the one or more implementation details of the static semantic building application by performing semantic reasoning with the building information describing the building and the first semantic description of the static semantic building application.

In some embodiments, the first semantic description of the static semantic building application comprises one or more performance criteria, wherein the one or more performance criteria define normal or abnormal behavior of the static semantic building application. In some embodiments, the instructions cause the one or more processors to generate the dynamic semantic building application by causing the second semantic description of the dynamic semantic building application to include the one or more performance criteria. In some embodiments, the instructions cause the one or more processors to receive operational data of the dynamic semantic building application resulting from an operation of the dynamic semantic building application and determine a performance result of the dynamic semantic building application based on the one or more performance criteria and the operational data.

In some embodiments, the one or more implementation details comprise a conflict between a first operation of a building application and a second operation of the dynamic semantic building application. In some embodiments, the instructions cause the one or more processors to generate the dynamic semantic building application by causing the second semantic description of the dynamic semantic building application to include one or more conflict resolution operations resolving the conflict between the first operation of the building application and the second operation of the dynamic semantic building application.

In some embodiments, the one or more implementation details comprise a dependency between a building application and the dynamic semantic building application. In some embodiments, the instructions cause the one or more processors to generate, based on the one or more implementation details, the dynamic semantic building application by causing the second semantic description of the dynamic semantic building application to include one or more dependency operations based on the dependency between the building application and the dynamic semantic building application.

In some embodiments, the dependency between the building application and the dynamic semantic building application indicates at least one of the dynamic semantic building application operates if the building application fails to meet a goal or the dynamic semantic building application receives an output of the building application as an input into the dynamic semantic building application.

In some embodiments, the building information defining the building is a semantic building model comprising a semantic building description of one or more systems of the building. In some embodiments, the instructions cause the one or more processors to determine the one or more implementation details by identifying a system target of the building defined by the semantic building model based on the first semantic description of the static semantic building application and the semantic building description.

In some embodiments, the first semantic description of the static semantic building application comprises a system target criteria. In some embodiments, the instructions cause the one or more processors to identify the system target by determine particular systems of the building meeting the system target criteria.

In some embodiments, the instructions cause the one or more processors to determine one or more second implementation details by identifying a second system target of the building defined by the semantic building model, generate, based on the one or more second implementation details, a second dynamic semantic building application comprising one or more second operations and a third semantic description of the second dynamic semantic building application, and operate the second dynamic semantic building application.

In some embodiments, the instructions cause the one or more processors to operate the dynamic semantic building application to control the system target, wherein the system target is located in the building. In some embodiments, the instructions cause the one or more processors to operate the second dynamic semantic building application to control the second system target, wherein the second system target is located in a second building.

Another implementation of the present disclosure is a method of implementing building applications. The method includes receiving, by a processing circuit, a static semantic building application, wherein the static semantic building application comprises one or more operations and a first semantic description of the static semantic building application and determining, by the processing circuit, based on building information describing a building and the first semantic description of the static semantic building application, one or more implementation details of a particular implementation of the static semantic building application. The method includes generating, by the processing circuit, based on the one or more implementation details, a dynamic semantic building application comprising the one or more operations and a second semantic description of the dynamic semantic building application and operating, by the processing circuit, the dynamic semantic building application.

In some embodiments, the first semantic description of the static semantic building application describes the static semantic building application with graph comprising a plurality of nodes, each node of the plurality of nodes describing a characteristic of the static semantic building application, wherein the graph further comprises a plurality of relationships, the plurality of relationships relating the plurality of nodes to an identifier of the static semantic building application.

In some embodiments, the static semantic building application is a generic description of the dynamic semantic building application, wherein the dynamic semantic building application is specific implementation of the static semantic building application, wherein the second semantic description of the dynamic semantic building application comprises implementation details to operate the dynamic semantic building application.

In some embodiments, determining, by the processing circuit, the one or more implementation details of the static semantic building application comprises performing semantic reasoning with the building information describing the building and the first semantic description of the static semantic building application.

In some embodiments, the first semantic description of the static semantic building application comprises one or more performance criteria, wherein the one or more performance criteria define normal or abnormal behavior of the static semantic building application. In some embodiments, generating, by the processing circuit, the dynamic semantic building application comprises causing the second semantic description of the dynamic semantic building application to include the one or more performance criteria. In some embodiments, the method further includes receiving, by the processing circuit, operational data of the dynamic semantic building application resulting from an operation of the dynamic semantic building application and determining, by the processing circuit, a performance result of the dynamic semantic building application based on the one or more performance criteria and the operational data.

In some embodiments, the building information defining the building is a semantic building model comprising a semantic building description of one or more systems of the building. In some embodiments, determining, by the processing circuit, the one or more implementation details comprises identifying a system target of the building defined by the semantic building model based on the first semantic description of the static semantic building application and the semantic building description.

Another implementation of the present disclosure is a building system for implementing building applications. The building system includes one or more memory devices configured to store instructions thereon and one or more processors configured to execute the instructions to receive a static semantic building application, wherein the static semantic building application comprises one or more operations and a first semantic description of the static semantic building application. The one or more processors are configured to execute the instructions to receive a semantic building model comprising a semantic building description of one or more systems of the building, determine, based on the semantic building description and the first semantic description of the static semantic building application, one or more implementation details of a particular implementation of the static semantic building application, wherein determining the one or more implementation details comprises identifying a system target of the building defined by the semantic building model based on the first semantic description of the static semantic building application and the semantic building description, generate, based on the one or more implementation details, a dynamic semantic building application comprising the one or more operations and a second semantic description of the dynamic semantic building application, and operate the dynamic semantic building application.

In some embodiments, the building system is at least one of a local system located within one or more physical buildings or a remote processing system located outside the one or more physical buildings.

Custom Logic Generation

Another implementation of the present disclosure is a building system for implementing user defined logic. The building system includes one or more memory devices configured to store instructions thereon, that, when executed by one or more processors, cause the one or more processors to receive user input from a user device, the user input providing a natural language description of a building logic application for a piece of building equipment, retrieve a semantic logic application comprising a semantic description of the building logic application based on the natural language description and a semantic building model comprising a semantic building description of the piece of building equipment, generate a custom logic application based on the semantic logic application, the natural language description, and the semantic building model, and operate the custom logic application.

In some embodiments, the instructions cause the one or more processors to identify a conflict between the custom logic application and a second logic application occurring when the custom logic application and the second logic application operate, generate a resolution operation to resolve the conflict, and operate the custom logic application based on the resolution operation.

In some embodiments, the instructions cause the one or more processors to generate a user interface including an indication of the custom logic application and cause the user device to display the user interface.

In some embodiments, the building logic application is at least one of a control application configured to control the piece of building equipment or a fault detection application configured to detect a fault associated with the piece of building equipment.

In some embodiments, the semantic description of the semantic logic application describes the semantic logic application with a first graph including a first plurality of nodes, each node of the first plurality of nodes describing a first characteristic of the semantic logic application, wherein the first graph further includes a first plurality of relationships, the first plurality of relationships relating the first plurality of nodes to an identifier of the semantic logic application. In some embodiments, the semantic building description of the semantic building model describes the piece of building equipment with second graph comprising a second plurality of nodes, each node of the second plurality of nodes describing a second characteristic of the piece of building equipment, wherein the second graph further comprises a second plurality of relationships, the second plurality of relationships relating the second plurality of nodes to the piece of building equipment.

In some embodiments, the instructions cause the one or more processors to generate an update to the semantic building model, where the update comprises an indication of the custom logic application.

In some embodiments, the instructions cause the one or more processors to generate a second custom logic application based on a second semantic logic application, second user input, and the indication of the custom logic application of the semantic building model.

In some embodiments, the instructions cause the one or more processors to generate one or more logic inputs describing the building logic application by analyzing the natural language description. In some embodiments, the instructions cause the one or more processors to retrieve the semantic logic application based on the one or more logic inputs. In some embodiments, the instructions cause the one or more processors to generate the custom logic application based on the one or more logic inputs.

In some embodiments, the one or more logic inputs include a logic purpose describing a purpose of the building logic application, wherein the purpose is at least one of fault detection or equipment control, a logic condition, wherein the logic condition describes one or more conditions to check with an input, and a logic action to perform in response to the logic condition being a particular state.

In some embodiments, the instructions cause the one or more processors to retrieve the semantic logic application by selecting the semantic logic application from a plurality of different semantic logic applications based on the natural language description.

In some embodiments, the instructions cause the one or more processors to retrieve the semantic logic application from the plurality of different semantic logic applications and generate the custom logic application by performing semantic reasoning with the natural language description.

In some embodiments, the natural language description includes an indication of an action to perform, a conditional requirement for performing the action, and a purpose of the building logic application in a natural language form. In some embodiments, the instructions cause the one or more processors to select the semantic logic application from the plurality of different semantic logic applications based on the natural language description by identifying, based on a particular semantic description of each of the plurality of different semantic logic applications, the semantic logic application, wherein the semantic description of the semantic logic application indicates the action to perform, the conditional requirement for performing the action, the purpose of the building logic application.

Another implementation of the present disclosure is a method of implementing user defined logic. The method includes receiving, by a processing circuit, user input from a user device, the user input providing a natural language description of a building logic application for a piece of building equipment, retrieving, by the processing circuit, a semantic logic application comprising a semantic description of the building logic application based on the natural language description and a semantic building model comprising a semantic building description of the piece of building equipment, generating, by the processing circuit, a custom logic application based on the semantic logic application, the natural language description, and the semantic building model, and operating, by the processing circuit, the custom logic application.

In some embodiments, the semantic description of the semantic logic application describes the semantic logic application with a first graph including a first plurality of nodes, each node of the first plurality of nodes describing a first characteristic of the semantic logic application, wherein the first graph further comprises a first plurality of relationships, the first plurality of relationships relating the first plurality of nodes to an identifier of the semantic logic application. In some embodiments, the semantic building description of the semantic building model describes the piece of building equipment with second graph comprising a second plurality of nodes, each node of the second plurality of nodes describing a second characteristic of the piece of building equipment, wherein the second graph further comprises a second plurality of relationships, the second plurality of relationships relating the second plurality of nodes to the piece of building equipment.

In some embodiments, the method further includes generating, by the processing circuit, one or more logic inputs describing the building logic application by analyzing the natural language description. In some embodiments, retrieving, by the processing circuit, the semantic logic application is based on the one or more logic inputs. In some embodiments, generating, by the processing circuit, the custom logic application is based on the one or more logic inputs.

In some embodiments, the one or more logic inputs include a logic purpose describing a purpose of the building logic application, wherein the purpose is at least one of fault detection or equipment control, a logic condition, wherein the logic condition describes one or more conditions to check with an input, and a logic action to perform in response to the logic condition being a particular state.

In some embodiments, retrieving, by the processing circuit, the semantic logic application comprises selecting, by the processing circuit, the semantic logic application from a plurality of different semantic logic applications based on the natural language description.

In some embodiments, retrieving, by the processing circuit, the semantic logic application from the plurality of different semantic logic applications and generating, by the processing circuit, the custom logic application includes performing semantic reasoning with the natural language description. In some embodiments, the semantic reasoning is performed with a machine readable description which may be independent of, or derived from, the natural language description.

In some embodiments, the natural language description includes an indication of an action to perform, a conditional requirement for performing the action, and a purpose of the building logic application in a natural language form. In some embodiments, selecting, by the processing circuit, the semantic logic application from the plurality of different semantic logic applications based on the natural language description comprises identifying, based on a particular semantic description of each of the plurality of different semantic logic applications, the semantic logic application, wherein the semantic description of the semantic logic application indicates the action to perform, the conditional requirement for performing the action, the purpose of the building logic application.

Another implementation of the present disclosure is a system for implementing user defined logic. The system includes one or more memory devices configured to store instructions thereon. The system includes one or more processors configured to execute the instructions to receive user input from a user device, the user input providing a natural language description of a logic application for a piece of equipment, retrieve a semantic logic application comprising a semantic description of the logic application based on the natural language description and a semantic model comprising a semantic building description of the piece of building equipment by selecting the semantic logic application from a plurality of different semantic logic applications based on the natural language description, generate a custom logic application based on the semantic logic application, the natural language description, and the semantic model, and operate the custom logic application.

In some embodiments, the one or more processors execute the instructions to retrieve the semantic logic application from the plurality of different semantic logic applications and generate the custom logic application by performing semantic reasoning with the natural language description.

In some embodiments, the natural language description includes an indication of an action to perform, a conditional requirement for performing the action, and a purpose of the logic application in a natural language form. In some embodiments, the one or more processors execute the instructions to select the semantic logic application from the plurality of different semantic logic applications based on the natural language description comprises identifying, based on a particular semantic description of each of the plurality of different semantic logic applications, the semantic logic application, wherein the semantic description of the semantic logic application indicates the action to perform, the conditional requirement for performing the action, the purpose of the logic application.

In some embodiments, the system is at least one of a local system located within one or more physical buildings or a remote processing system located outside the one or more physical buildings.

User Interface Generation Based on Semantic Models

One implementation of the present disclosure is a building interface system for generating a custom user interface. The building interface system includes one or more memory devices configured to store instructions thereon, the instructions causing one or more processors to receive user input defining one or more graphical requirements from a user device. The instructions cause the one or more processors to retrieve a semantic building system model based on the one or more graphical requirements, wherein the semantic building system model comprises semantic information describing a building system, retrieve one or more graphic templates based on the semantic building system model and the one or more graphical requirements, the one or more graphic templates providing a generic description of one or more user interface elements, generate the custom user interface based on the one or more graphic templates and the semantic building system model, and cause the user device to display the custom user interface.

In some embodiments, the instructions cause the one or more processors to determine whether the user input has not been received, retrieve one or more default graphic templates in response to a determination that the user input has not been received, and generate a user interface based on the one or more default graphic templates and the semantic building system model.

In some embodiments, the one or more graphics templates are master templates for multiple implementations. In some embodiments, the instructions cause the one or more processors to generate multiple custom user interfaces based on one or more templates and multiple semantic building models, wherein each of the plurality of custom interfaces is generated based on one of the semantic building models.

In some embodiments, the instructions cause the one or more processors to retrieve the semantic building system model by determining an identify of the building system based on the one or more graphical requirements of the custom user interface and selecting the semantic building system model from a plurality of other semantic building system models based on the identity of the building system.

In some embodiments, the instructions cause the one or more processors to receive one or more modifications to the custom user interface and update the custom user interface based on the one or more modifications.

In some embodiments, the one or more graphic templates comprise a first template defining user interface elements for a particular type of building system, wherein the building system is the particular type of building system, wherein the semantic information comprises a node indicating the building system is the particular type of building system.

In some embodiments, the instructions cause the one or more processors to receive historical user input defining feedback on previous custom user interfaces. In some embodiments, the instructions cause the one or more processors to generate the custom user interface further based on the historical user input.

In some embodiments, the one or more graphical requirements include an indication of a purpose of the custom user interface, wherein the indication of the purpose is at least one of a first indication of fault detection diagnostics, a second indication of system monitoring, or a third indication system visualization.

In some embodiments, the semantic information of the semantic building system model describes the building system with a graph comprising a plurality of nodes, each node of the plurality of nodes describing a characteristic of the building system, wherein the graph further comprises a plurality of relationships, the plurality of relationships relating the plurality of nodes to an identifier of the building system.

In some embodiments, the instructions cause the one or more processors to generate the custom user interface based on the one or more graphic templates and the semantic building system model based on a first characteristic of the building system by identifying the first characteristic based on a first relationship between the identifier of the building system and a first node representing the first characteristic of the building system.

In some embodiments, the one or more memory devices store a plurality of templates comprising the one or more graphic templates, wherein the plurality of templates are predefined reusable templates.

In some embodiments, the instructions cause the one or more processors to receive second user input defining one or more second graphical requirements of a second custom user interface, retrieve a second semantic building system model comprising second semantic information describing a second building system, retrieve the one or more graphic templates based on the second semantic building system model and the one or more second graphical requirements, and generate the second custom user interface based on the one or more graphic templates and the second semantic building system model.

In some embodiments, the instructions cause the one or more processors to retrieve a second semantic building system model comprising second semantic information describing a second building system different than the building system. In some embodiments, wherein the instructions cause the one or more processors to retrieve the one or more graphic templates further based on the second building system. In some embodiments, the instructions cause the one or more processors to generate the custom user interface further based on the second semantic building system model.

In some embodiments, the custom user interface include interface information for the building system and the second building system.

In some embodiments, the building system and the second building system are at least one of a fire suppression system, a security system, a lighting system, or an environmental control system.

Another implementation of the present disclosure is a method of generating a custom user interface. The method includes receiving, by a processing circuit, user input defining one or more graphical requirements from a user device, retrieving, by the processing circuit, a semantic building system model based on the one or more graphical requirements, wherein the semantic building system model comprises semantic information describing a building system, and retrieving, by the processing circuit, one or more graphic templates based on the semantic building system model and the one or more graphical requirements, the one or more graphic templates providing a generic description of one or more user interface elements. The method includes generating, by the processing circuit, the custom user interface based on the one or more graphic templates and the semantic building system model and causing, by the processing circuit, the user device to display the custom user interface.

In some embodiments, the method includes retrieving, by the processing circuit, the semantic building system model includes determining, by the processing circuit, an identify of the building system based on the one or more graphical requirements of the custom user interface and selecting, by the processing circuit, the semantic building system model from a plurality of other semantic building system models based on the identity of the building system.

In some embodiments, the one or more graphic templates include a first template defining user interface elements for a particular type of building system, wherein the building system is the particular type of building system, wherein the semantic information comprises a node indicating the building system is the particular type of building system.

In some embodiments, the method includes receiving, by the processing circuit, historical user input defining feedback on previous custom user interfaces. In some embodiments, generating, by the processing circuit, the custom user interface is based on the historical user input.

In some embodiments, the semantic information of the semantic building system model describes the building system with a graph comprising a plurality of nodes, each node of the plurality of nodes describing a characteristic of the building system, wherein the graph further comprises a plurality of relationships, the plurality of relationships relating the plurality of nodes to an identifier of the building system.

In some embodiments, generating, by the processing circuit, the custom user interface based on the one or more graphic templates and the semantic building system model is based on a first characteristic of the building system by identifying the first characteristic based on a first relationship between the identifier of the building system and a first node representing the first characteristic of the building system.

Another implementation of the present disclosure is a system for generating a custom user interface. The system includes one or more memory devices configured to store instructions thereon and one or more processors configured to execute the instructions to receive user input defining one or more graphical requirements from a user device. The one or more processors are configured to execute the instructions to retrieve a semantic building system model based on the one or more graphical requirements, wherein the semantic building system model comprises semantic information describing a building system, wherein the semantic information of the semantic building system model describes the building system with a graph comprising a plurality of nodes, each node of the plurality of nodes describing a characteristic of the building system, wherein the graph further comprises a plurality of relationships, the plurality of relationships relating the plurality of nodes to an identifier of the building system. The one or more processors are configured to execute the instructions to retrieve one or more graphic templates based on the semantic building system model and the one or more graphical requirements, the one or more graphic templates providing a generic description of one or more user interface elements, generate the custom user interface based on the one or more graphic templates and the semantic building system model based on a first characteristic of the building system by identifying the first characteristic based on a first relationship between the identifier of the building system and a first node representing the first characteristic of the building system, and cause the user device to display the custom user interface.

In some embodiments, the system is at least one of a local system located within one or more physical building or a remote processing system located outside the one or more physical buildings.

Building Semantic Model Searching

Another implementation of the present disclosure is a building system for searching a semantic building model. The building system includes one or more memory devices configured to store instructions thereon, wherein the instructions, when executed by one or more processors, cause the one or more processors to cause a user interface of a user device to display a plurality of nodes of the semantic building model and a plurality of relationships between the plurality of nodes of the semantic building model. The instructions cause the one or more processors to receive a search input from the user device, generate a search result based on the search input, wherein the search result comprises an indication of a portion of nodes of the plurality of nodes and a portion of relationships of the plurality of relationships, and cause the user interface to display the portion of nodes of the plurality of nodes and the portion of relationships of the plurality of relationships.

In some embodiments, the instructions cause the one or more processors to receive a selection via the user device, wherein the selection is at least one of a selection of one or more of the portion of nodes, a selection of one or more relationships of the portion of relationships, or a subgraph of a graph defined by the portion of nodes and the portion of relationships and generate and execute an application based on an application definition and the selection.

In some embodiments, the instructions cause the one or more processors to receive historical user input indicating feedback of a user of previous search results at a first point in time, the user input indicating preferred search results and store the historical user input. In some embodiments, the instructions cause the one or more processors to generate the search result further based on a learning model and the historical user input, wherein the search result is generated at a second point in time after the first point in time and is based on preferred search results.

In some embodiments, the search input is a natural language input defined by a user of the user device. In some embodiments, the instructions cause the one or more processors to generate a query based on the natural language input and generate the search result by generating the indication of the portion of nodes of the plurality of nodes by querying the semantic building model with the query.

In some embodiments, the search input includes a first indication of a first node of the plurality of nodes. In some embodiments, the instructions cause the one or more processors to generate the search result by identifying, based on the first node, the portion of nodes by identifying a plurality of first relationships between the first node and the portion of nodes of the plurality of nodes.

In some embodiments, the search input further includes a particular indication of a node type. In some embodiments, the instructions cause the one or more processors to generate the search result by identifying, based on the particular indication of the node type, the portion of nodes by identifying that the portion of nodes are the node type.

In some embodiments, the search input includes a first indication of a first node type, a second indication of a second node type, and a relationship indication of a relationship type relating the first node type and the second node type. In some embodiments, the instructions cause the one or more processors to determine whether the plurality of nodes includes one or more first nodes of the first node type and one or more second nodes of the second node type, determine whether the one or more first nodes are related to the one or more second nodes by one or more relationships of the plurality of relationships of the relationship type, and cause the portion of nodes of the plurality of nodes to include the one or more first nodes and the one or more second nodes and cause the portion of relationships of the plurality of relationships to include the one or more relationships in response to a determination that the plurality of nodes include the one or more first nodes of the first node type and the one or more second nodes of the second node type and the one or more first nodes are related to the one or more second nodes by the one or more relationships of the plurality of relationships of the relationship type.

In some embodiments, the search input is a shape drawn by a user on the user interface, wherein the instructions cause the one or more processors to generate the search result based on the shape.

In some embodiments, the instructions cause the one or more processors to determine whether the portion of nodes of the plurality of nodes displayed by the user interface are graphically within the shape drawn by the user. In some embodiments, the instructions cause the one or more processors to generate the search result to include the portion of nodes in response to a determination that the portion of nodes are graphically within the shape drawn by the user.

In some embodiments, the instructions cause the one or more processors to receive historical user input indicating feedback of a user of previous search results. In some embodiments, the instructions cause the one or more processors to generate the search result further based on a learning model and the historical user input.

In some embodiments, the instructions cause the one or more processors to receive, one or more interactions with the user interface causing the user interface to display one or more other nodes of the plurality of nodes and one or more other relationships of the plurality of relationships and update the historical user input to include the one or more interactions, the one or more other nodes, the one or more other relationships, and the search input.

Another implementation of the present disclosure is a method of searching a semantic building model. The method includes causing, by a processing circuit, a user interface of a user device to display a plurality of nodes of the semantic building model and a plurality of relationships between the plurality of nodes of the semantic building model, receiving, by the processing circuit, a search input from the user device, generating, by the processing circuit, a search result based on the search input, wherein the search result comprises an indication of a portion of nodes of the plurality of nodes and a portion of relationships of the plurality of relationships, and causing, by the processing circuit, the user interface to display the portion of nodes of the plurality of nodes and the portion of relationships of the plurality of relationships.

In some embodiments, the search input is a natural language input defined by a user of the user device. In some embodiments, the method further includes generating, by the processing circuit, a query based on the natural language input and generating, by the processing circuit, the search result by generating the indication of the portion of nodes of the plurality of nodes by querying the semantic building model with the query.

In some embodiments, the search input includes a first indication of a first node of the plurality of nodes. In some embodiments, generating, by the processing circuit, the search result comprises identifying, based on the first node, the portion of nodes by identifying a plurality of first relationships between the first node and the portion of nodes of the plurality of nodes.

In some embodiments, the search input further includes a particular indication of a node type. In some embodiments, generating, by the processing circuit, the search result comprises identifying, based on the particular indication of the node type, the portion of nodes by identifying that the portion of nodes are the node type.

In some embodiments, the search input includes a first indication of a first node type, a second indication of a second node type, and a relationship indication of a relationship type relating the first node type and the second node type. In some embodiments, the method further includes determining, by the processing circuit, whether the plurality of nodes includes one or more first nodes of the first node type and one or more second nodes of the second node type, determining, by the processing circuit, whether the one or more first nodes are related to the one or more second nodes by one or more relationships of the plurality of relationships of the relationship type, and causing, by the processing circuit, the portion of nodes of the plurality of nodes to include the one or more first nodes and the one or more second nodes and cause the portion of relationships of the plurality of relationships to include the one or more relationships in response to a determination that the plurality of nodes include the one or more first nodes of the first node type and the one or more second nodes of the second node type and the one or more first nodes are related to the one or more second nodes by the one or more relationships of the plurality of relationships of the relationship type.

In some embodiments, the search input is a shape drawn by a user on the user interface, wherein the method further comprises generating, by the processing circuit, the search result based on the shape.

In some embodiments, determining, by the processing circuit, whether the portion of nodes of the plurality of nodes displayed by the user interface are graphically within the shape drawn by the user. In some embodiments, generating, by the processing circuit, the search result comprises causing the search result to include the portion of nodes in response to a determination that the portion of nodes are graphically within the shape drawn by the user.

In some embodiments, the method further includes receiving, by the processing circuit, historical user input indicating feedback of a user of previous search results. In some embodiments, generating, by the processing circuit, the search result is based on a learning model and the historical user input.

In some embodiments, the method further includes receiving, by the processing circuit, one or more interactions with the user interface causing the user interface to display one or more other nodes of the plurality of nodes and one or more other relationships of the plurality of relationships and updating, by the processing circuit, the historical user input to include the one or more interactions, the one or more other nodes, the one or more other relationships, and the search input.

Another implementation of the present disclosure is a building system for searching a semantic building model. The building system includes one or more memory devices configured to store instructions and the semantic building model, wherein the semantic building model comprises a plurality of nodes and a plurality of relationships between the plurality of nodes and one or more processors configured to execute the instructions to cause a user interface of a user device to display the plurality of nodes of the semantic building model and the plurality of relationships between the plurality of nodes of the semantic building model. The one or more processors are configured to execute instructions to receive a search input from the user device, wherein the search input is a natural language input defined by a user of the user device, generate a search result based on the search input, wherein the search result comprises an indication of a portion of nodes of the plurality of nodes and a portion of relationships of the plurality of relationships, and cause the user interface to display the portion of nodes of the plurality of nodes and the portion of relationships of the plurality of relationships.

In some embodiments, the search input includes a first indication of a first node type, a second indication of a second node type, and a relationship indication of a relationship type relating the first node type and the second node type. In some embodiments, the one or more processors configured to execute the instructions to determine whether the plurality of nodes includes one or more first nodes of the first node type and one or more second nodes of the second node type, determine whether the one or more first nodes are related to the one or more second nodes by one or more relationships of the plurality of relationships of the relationship type, and cause the portion of nodes of the plurality of nodes to include the one or more first nodes and the one or more second nodes and cause the portion of relationships of the plurality of relationships to include the one or more relationships in response to a determination that the plurality of nodes include the one or more first nodes of the first node type and the one or more second nodes of the second node type and the one or more first nodes are related to the one or more second nodes by the one or more relationships of the plurality of relationships of the relationship type. The building system is at least one of a local system located within a physical building or a remote processing system located outside the physical building.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
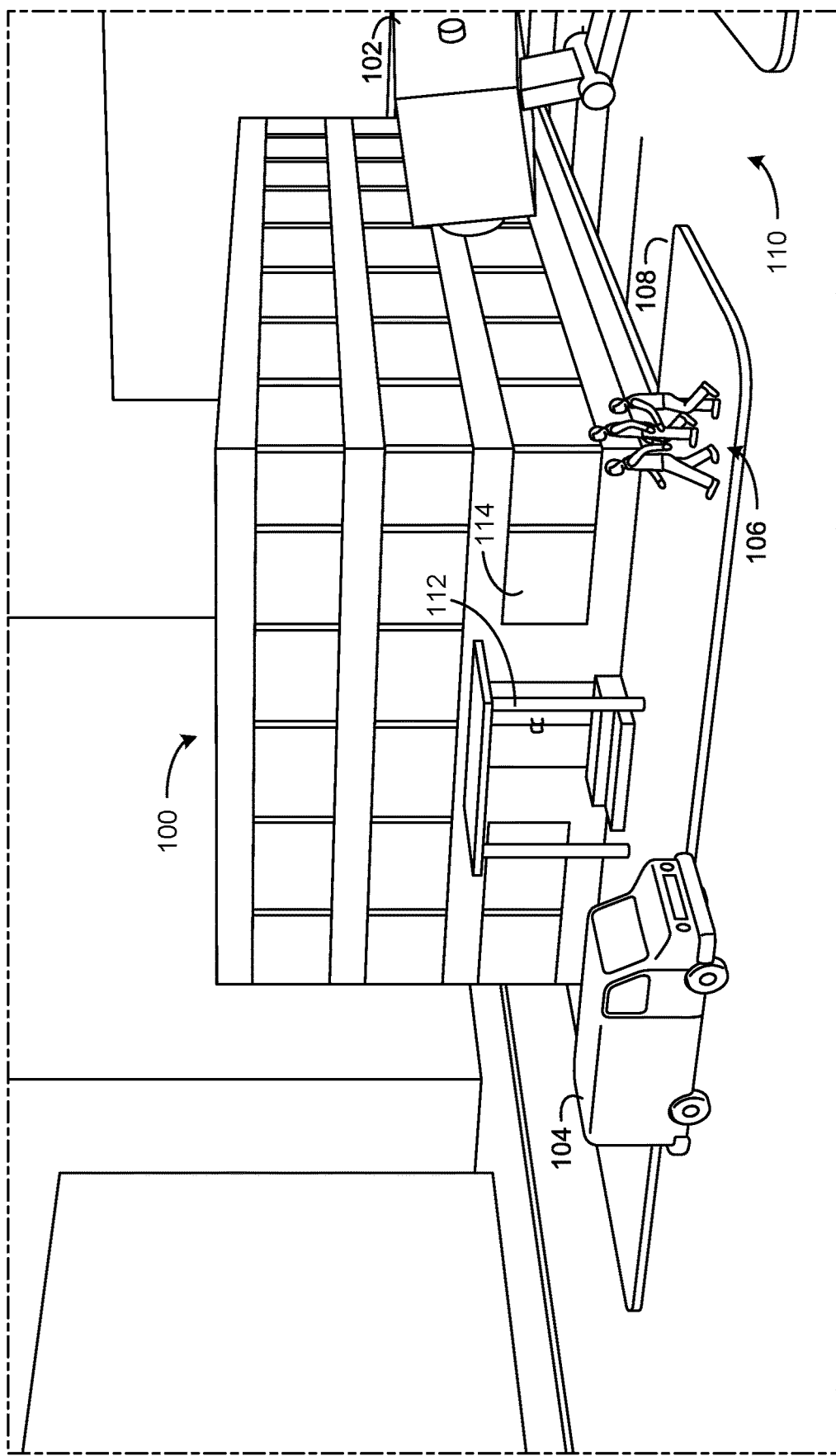
FIG. 1 is a perspective view schematic drawing of a building with building systems, according to an exemplary embodiment.

Referring generally to the FIGURES, systems and methods for semantic modeling in building systems are shown and described, according to various exemplary embodiments. A semantic model can be a conceptual data model which includes semantic information, e.g., relational logic. In some embodiments, a building system can generate and manage semantic building models which represent building information and utilize the semantic building models to implement control operations in a building, analyze data collected in the building, etc. The semantic building models can define physical building systems, for example, heating, ventilation, and air conditioning (HVAC) systems, security systems, lighting systems, fire suppression systems, etc. Furthermore, the semantic building models can define building applications. For example, control applications configured to operate the building systems, fault analysis applications configured to identify faults in the building systems, analytics applications configured to generate analytics for the building systems, etc.

The semantic building model can be defined by a semantic model framework, e.g., the Resource Description Framework (RDF), the Web Ontology Language (OWL), RDF/OWL, RDF Schema (RDFS), Smart Appliances REFerence (SAREF) ontology, etc. In some embodiments, a semantic building model can include multiple nodes and relationships in a graph format. The nodes can represent physical building components, e.g., buildings, systems, equipment, people, etc. and semantic information defining relationships between the buildings, systems, equipment, and people, e.g., an indication that one building component is located within another component, an indication that a first building component controls a second building component, etc. Furthermore, the nodes can represent building applications, e.g., the input to a building application, an output to a building application, a set of operations to perform on the input to generate the output, fault detection thresholds, etc.

Semantic Building Applications

Buildings are a major energy consumer. In some countries, buildings contribute to approximately 40% of energy use. Advanced control applications (e.g., distributed control, optimal control, adaptive control, artificial intelligence (AI) based control) can significantly reduce energy consumption of buildings (e.g., between 10-30% of total energy consumption in buildings). Furthermore, the control applications can improve occupant comfort, improve employee productivity, improve indoor air quality, reduce carbon emissions, etc.

In some cases, implementing energy savings control applications can be difficult in view of the expertise and configuration time required to deploy the control applications. For example, an individual implementing a control application may need to manually look different components in the building systems and/or the interconnections between the systems to understand how to implement the control applications. Furthermore, the individual may need to review control-related requirements of the building system to determine if a particular control application is applicable for the building system.

In order to efficiently implement building applications in a building, in some embodiments, a building system is configured to model pieces of control applications in a semantic framework, i.e., a semantic building control model. Based on inferencing techniques, the building system is configured to relate the control application to semantic building models and/or external ontologies (SSO) so that the control application can fully describe itself (e.g., describe itself in a complete manner providing appropriate equipment targets, operational results, inputs, outputs, etc.), which the building system can be configured to utilize to identify target systems to run the control application on. In this regard, the building system can automatically deploy the control applications on particular systems without requiring substantial manual intervention.

Furthermore, the semantic model, in some embodiments, is used by the building system to describe the expected behavior of the building application e.g., appropriate performance metric values identifying the performance of the building application. The building system is configured to use the semantic model of the building application to verify that that the building application is successfully initiated and behaving as expected. A user can predefine the building application in a semantic manner identify application requirements for the control application. For example, the requirements may indicate what systems an application is applicable for (e.g., applicable for systems with fan-coil units connected to air-cooled chillers for laboratory rooms, applicable for systems with two room temperature sensors with certain precision levels), etc. The control application can also include an indication of the expected performance and performance metrics to be used in identifying whether the application is behaving as expected. For example, the performance metric could be maximum water flow deviation and the expected behavior may be that the maximum water flow deviation within a particular range (e.g., within 30% of a particular value).

This building system is configured to deploy independent, portable building applications, in some embodiments. The building system can be configured to identify dependency between multiple different building applications, identify connections between the building applications, and/or automatically resolve conflicts between multiple building applications. For example, an application to optimize supply-fan operation and an application to optimize the coiling coils could conflict with each other although they control two different components. The building system can be configured to identify the conflict (e.g., a temperature control application may conflict with a supervisory temperature setpoint control application) and modify one or both of the control applications to resolve the conflict, e.g., identify a proper sequence of execution for the control applications that resolves the conflict. In some embodiments, the building system can configure the first running application to take precedence over any other subsequent application (a first come, first operation scheme). In some embodiments, the building system can configure the second application to run if the first application fails to meet a performance goal.

Custom Logic Generation

As mentioned, buildings are one of the major energy consumers worldwide, contributing around 40% to the energy use in some countries. In some embodiments, rule-based control applications can improve the operation of existing equipment, reduce energy waste, detect and diagnose faults to increase equipment life, and/or improve user comfort. The rule-based control applications may require an expert programmer who understands the logic and the system against which the control algorithms are written. Therefore, an end user (e.g., building operator, facility manager, and occupant) may be hesitant to code and write such applications. If a developer writes the code, there is product development release cycle, which causes a delay in meeting the demand of the end user.

In some embodiments, a building system can be configured to allow a user to write control applications by providing natural language descriptions of the control application (e.g., typed or spoken keywords). The input can be provided in a literal sense, e.g., "create a trigger for all temperatures deviated from its set point by five degrees Fahrenheit in each room of my building." Based on semantic modeling of a building, the building system can be configured to find all temperature sensors in each room of the building (not hallway or AHU since the request specified room), find set points for each room, create a difference criterion with a five degree Fahrenheit threshold, and/or create a list of binary points indicating the rooms that violate the criteria. This will also allow a user to create control rule-sets on the building system and gradually build upon predefined rule-sets.

Based on semantic models and ontologies for generic rule-based logics, along with inferencing and validation tools, the building system is configured to enable development of custom control applications with no need of proficient programmers or experts to provide explicit code descriptions of the applications. Because of this approach, the control algorithms can be easily ported to different systems or reused in a larger logic application without having multiple instances of code for the logic.

User Interface Generation Based on Semantic Models

In some embodiments, graphical user interfaces generated by a building system aid field technicians, building owners, facility managers, and/or occupants in understanding the operation of a building. Availability of intuitive, informative, and automatically generated graphical user interfaces can improve the process to configure a site, reduce equipment installation time, reduce commissioning time, reduce maintenance time, aid in debugging issues, identify opportunities to save energy, and/or improve comfort for occupants (e.g., identifying applicable retrofits). However, it may be a time consuming process to build graphical user interfaces in existing building systems and the flexibility of the graphical interfaces may be limited.

A semantic building model which defines a building and its systems (which can include indications of multiple different of subsystems within the building model), their connections with the other systems, and associations with sensors and/or software entities can be used to implement an automatic generation of graphics by the building system. This can be a modular approach allowing the building system reuse of components and graphics for different purposes.

For example, graphic files for small components such as coils, valves, dampers, empty VAV boxes, etc. can be generated and loaded into the building system. The building system can be configured to adapt the graphics files for different buildings or pieces of equipment. In this regard, as new components or subsystems are manufactured, there is no need to redesign the graphics for all the systems that contain the new components. Moreover, this also enables the building system to generate graphics on the fly and assigning the location of relevant points and data on the graphics.

In the case of maintenance or retrofit graphical user interface, the building system can identify that hardware and/or sensor points may be pertinent and cause the graphical user interface to include the points. In another case, for an occupancy tracking user interface, the hardware and/or sensor points may not be relevant and thus the building system may not include them in the occupancy tracking user interface. As another example, a graphical user interface focused on debugging a fan in an AHU (e.g., to determine why it is not turning on during optimal start and/or stop periods) can be generated by the building system and the building system may not include the same sensor point data in the maintenance user interface and instead include historical fan data of the AHU.

Constraints from the subsystems building semantic models can be automatically utilized by the building system to determine how to modify graphics, e.g., to determine whether or not to connect different substance resources graphics e.g., air, water, steam, etc. In this manner, a user can create custom graphic templates which can be modified to achieve a variety of implemented graphical user interfaces, e.g., faulty sensor graphics page for the entire system consisting of chiller, boiler, AHU, VAV, in a consolidated fashion. Furthermore, the graphical user interfaces can include data of multiple heterogeneous systems (fire systems, security systems, lighting systems, HVAC systems). The building system can be configured to generate a graphical user interface that combines together graphics of the systems to provide a uniform consistent experience to an end user.

Building Semantic Model Searching

In some embodiments, the building system can be configured to implement a search mechanism to identify and filter a semantic building model such that a subset of the semantic building model is provided to a user for review. In some embodiments, the search mechanism can be configured to filter data of the semantic building model so that the end-user can obtain the desired data for a particular application they are interested in. The user may wish to understand components of a building to implement applications, e.g., supervisory control algorithms, fault detection and diagnostics applications, an application to apply bulk alarms, a data trending application, a data analytics application for monitoring and visualization, etc. The building system can be configured to allow for the domain knowledge (of buildings systems) to be considered when performing searches. Furthermore, because of database implementation constraints, a solution designed for one product targeted toward a specific market may not be economically and technically feasible for another product.

The building system can be configured to utilize domain knowledge, rule-sets, and/or machine learning algorithms to help the user to retrieve the desired end-result in a quick and efficient manner without requiring detailed or extensive inputs from a user. In some embodiments, the machine learning algorithms used by the building system can be total weighted least squares, clustering algorithms, etc. In some embodiments, the building system can include a mechanism to update the weights and/or tuning parameters of the machine learning algorithms (e.g., learning models) based historical selections made by the user.

In this regard, a user can be able to start with viewing an entire graph representation of the semantic model and provide keywords to the building system. For example, a user will be able to specify that the user is interested in "room temperatures of all the clean rooms served by single zone AHUs". Based on the keywords, the building system can be configured to narrow down the entire graph representation to a subset of the graph representation that the user is interested in viewing. In some embodiments, the building system is configured to receive input from the user in the form of a free drawn line around building systems of the graph representation. Based on the free form line, the building system can be configured to determine subcomponents, points, controllers, etc. in an area defined by the line. The identified information can be presented by the building system to the user. Once the results have been narrowed down, the user may be able to drag either one component alone or a subsystem with constraints on the component. This provides an immediate indication and a visual confirmation of the sub-graph that is being considered based on combined concepts which the building system can be configured to utilize as feedback to update and train the machine learning algorithms.

Building with Building Systems

Referring now to FIG. 1, a building 100 with a security camera 102 and a parking lot 110 is shown, according to an exemplary embodiment. The building 100 is a multi-story commercial building surrounded by or near the parking lot 110 but can be any type of building in some embodiments. The building 100 can be a school, a hospital, a store, a place of business, a residence, an apartment complex, a hotel, an office building, etc. The building 100 may be associated with the parking lot 110.

Both the building 100 and the parking lot 110 are at least partially in the field of view of the security camera 102. In some embodiments, multiple security cameras 102 may be used to capture the entire building 100 and parking lot 110 not in (or in to create multiple angles of overlapping or the same field of view) the field of view of a single security camera 102. The parking lot 110 can be used by one or more vehicles 104 where the vehicles 104 can be either stationary or moving (e.g. delivery vehicles). The building 100 and parking lot 110 can be further used by one or more pedestrians 106 who can traverse the parking lot 110 and/or enter and/or exit the building 100. The building 100 may be further surrounded or partially surrounded by a sidewalk 108 to facilitate the foot traffic of one or more pedestrians 106, facilitate deliveries, etc. In other embodiments, the building 100 may be one of many buildings belonging to a single industrial park, shopping mall, or commercial park having a common parking lot and security camera 102. In another embodiment, the building 100 may be a residential building or multiple residential buildings that share a common roadway or parking lot.

The building 100 is shown to include a door 112 and multiple windows 114. An access control system can be implemented within the building 100 to secure these potential entrance ways of the building 100. For example, badge readers can be positioned outside the door 112 to restrict access to the building 100. The pedestrians 106 can each be associated with access badges that they can utilize with the access control system to gain access to the building 100 through the door 112. Furthermore, other interior doors within the building 100 can include access readers. In some embodiments, the doors are secured through biometric information, e.g., facial recognition, fingerprint scanners, etc. The access control system can generate events, e.g., an indication that a particular user or particular badge has interacted with the door. Furthermore, if the door 112 is forced open, the access control system, via door sensor, can detect the door forced open (DFO) event.

The windows 114 can be secured by the access control system via burglar alarm sensors. These sensors can be configured to measure vibrations associated with the window 114. If vibration patterns or levels of vibrations are sensed by the sensors of the window 114, a burglar alarm can be generated by the access control system for the window 114.

The building 100 can further include HVAC systems. For example, waterside systems, airside systems, building management systems, and/or various other HVAC systems can be included within the building 100. For example, equipment such as chillers, boilers, rooftop units, air handler units, thermostats, sensors, actuators, dampers, valves, and other equipment can be implemented within the building 100 to control the environmental conditions of the building 100. Examples of building equipment that can be implemented within the building 100 can be found in U.S. patent application Ser. No. 16/048,052 filed Jul. 27, 2018, the entirety of which is incorporated by reference herein.

Figure 2:
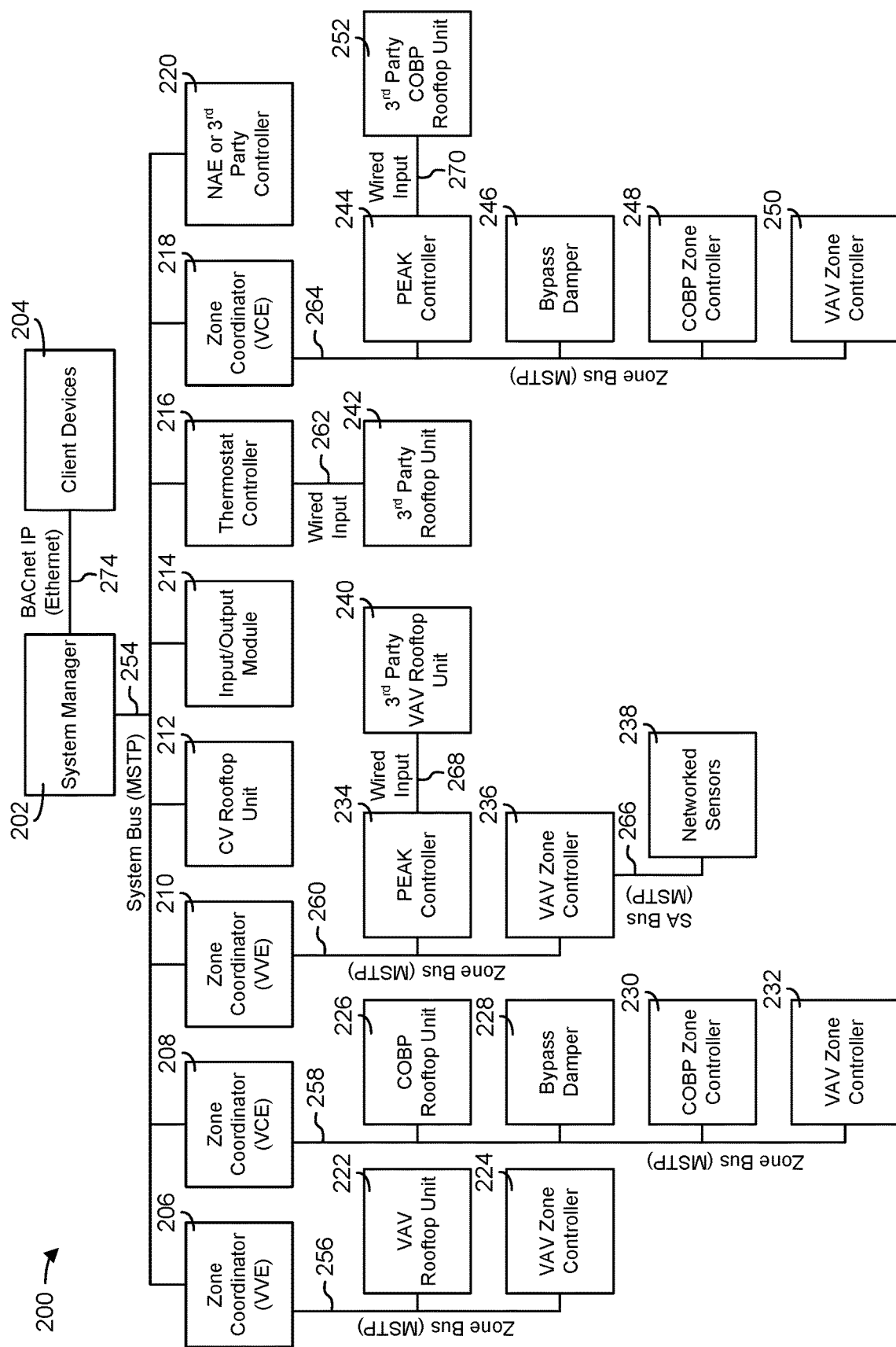
FIG. 2 is a block diagram of a BMS which can be used to monitor and control the building of FIG. 1, according to an exemplary embodiment.

Referring now to FIG. 2, a block diagram of a building management system (BMS) 200 is shown, according to some embodiments. BMS 200 can be used to monitor and control the devices of an HVAC system, a waterside system, an airside system, building subsystems 428, as well as other types of BMS devices (e.g., lighting equipment, security equipment, etc.) and/or HVAC equipment.

BMS 200 provides a system architecture that facilitates automatic equipment discovery and equipment model distribution. Equipment discovery can occur on multiple levels of BMS 200 across multiple different communications busses (e.g., a system bus 254, zone buses 256-260 and 264, sensor/actuator bus 266, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 200 can begin interacting with the new device (e.g., sending control signals, using data from the device) without user interaction.

Some devices in BMS 200 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 200 store their own equipment models. Other devices in BMS 200 have equipment models stored externally (e.g., within other devices). For example, a zone coordinator 208 can store the equipment model for a bypass damper 228. In some embodiments, zone coordinator 208 automatically creates the equipment model for bypass damper 228 or other devices on zone bus 258. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 2, BMS 200 is shown to include a system manager 202; several zone coordinators 206, 208, 210 and 218; and several zone controllers 224, 230, 232, 236, 248, and 250. System manager 202 can monitor data points in BMS 200 and report monitored variables to various monitoring and/or control applications. System manager 202 can communicate with client devices 204 (e.g., user devices, desktop computers, laptop computers, mobile devices, etc.) via a data communications link 274 (e.g., BACnet IP, Ethernet, wired or wireless communications, etc.). System manager 202 can provide a user interface to client devices 204 via data communications link 274. The user interface may allow users to monitor and/or control BMS 200 via client devices 204.

In some embodiments, system manager 202 is connected with zone coordinators 206-210 and 218 via a system bus 254. System manager 202 can be configured to communicate with zone coordinators 206-210 and 218 via system bus 254 using a master-slave token passing (MSTP) protocol or any other communications protocol. System bus 254 can also connect system manager 202 with other devices such as a constant volume (CV) rooftop unit (RTU) 212, an input/output module (IOM) 214, a thermostat controller 216 (e.g., a TEC2000 series thermostat controller), and a network automation engine (NAE) or third-party controller 220. RTU 212 can be configured to communicate directly with system manager 202 and can be connected directly to system bus 254. Other RTUs can communicate with system manager 202 via an intermediate device. For example, a wired input 262 can connect a third-party RTU 242 to thermostat controller 216, which connects to system bus 254.

System manager 202 can provide a user interface for any device containing an equipment model. Devices such as zone coordinators 206-210 and 218 and thermostat controller 216 can provide their equipment models to system manager 202 via system bus 254. In some embodiments, system manager 202 automatically creates equipment models for connected devices that do not contain an equipment model (e.g., IOM 214, third party controller 220, etc.). For example, system manager 202 can create an equipment model for any device that responds to a device tree request. The equipment models created by system manager 202 can be stored within system manager 202. System manager 202 can then provide a user interface for devices that do not contain their own equipment models using the equipment models created by system manager 202. In some embodiments, system manager 202 stores a view definition for each type of equipment connected via system bus 254 and uses the stored view definition to generate a user interface for the equipment.

Each zone coordinator 206-210 and 218 can be connected with one or more of zone controllers 224, 230-232, 236, and 248-250 via zone buses 256, 258, 260, and 264. Zone coordinators 206-210 and 218 can communicate with zone controllers 224, 230-232, 236, and 248-250 via zone busses 256-260 and 264 using a MSTP protocol or any other communications protocol. Zone busses 256-260 and 264 can also connect zone coordinators 206-210 and 218 with other types of devices such as variable air volume (VAV) RTUs 222 and 240, changeover bypass (COBP) RTUs 226 and 252, bypass dampers 228 and 246, and PEAK controllers 234 and 244.

Zone coordinators 206-210 and 218 can be configured to monitor and command various zoning systems. In some embodiments, each zone coordinator 206-210 and 218 monitors and commands a separate zoning system and is connected to the zoning system via a separate zone bus. For example, zone coordinator 206 can be connected to VAV RTU 222 and zone controller 224 via zone bus 256. Zone coordinator 208 can be connected to COBP RTU 226, bypass damper 228, COBP zone controller 230, and VAV zone controller 232 via zone bus 258. Zone coordinator 210 can be connected to PEAK controller 234 and VAV zone controller 236 via zone bus 260. Zone coordinator 218 can be connected to PEAK controller 244, bypass damper 246, COBP zone controller 248, and VAV zone controller 250 via zone bus 264.

A single model of zone coordinator 206-210 and 218 can be configured to handle multiple different types of zoning systems (e.g., a VAV zoning system, a COBP zoning system, etc.). Each zoning system can include a RTU, one or more zone controllers, and/or a bypass damper. For example, zone coordinators 206 and 210 are shown as Verasys VAV engines (VVEs) connected to VAV RTUs 222 and 240, respectively.

Zone coordinator 206 is connected directly to VAV RTU 222 via zone bus 256, whereas zone coordinator 210 is connected to a third-party VAV RTU 240 via a wired input 268 provided to PEAK controller 234. Zone coordinators 208 and 218 are shown as Verasys COBP engines (VCEs) connected to COBP RTUs 226 and 252, respectively. Zone coordinator 208 is connected directly to COBP RTU 226 via zone bus 258, whereas zone coordinator 218 is connected to a third-party COBP RTU 252 via a wired input 270 provided to PEAK controller 244.

Zone controllers 224, 230-232, 236, and 248-250 can communicate with individual BMS devices (e.g., sensors, actuators, etc.) via sensor/actuator (SA) busses. For example, VAV zone controller 236 is shown connected to networked sensors 238 via SA bus 266. Zone controller 236 can communicate with networked sensors 238 using a MSTP protocol or any other communications protocol. Although only one SA bus 266 is shown in FIG. 2, it should be understood that each zone controller 224, 230-232, 236, and 248-250 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 224, 230-232, 236, and 248-250 can be configured to monitor and control a different building zone. Zone controllers 224, 230-232, 236, and 248-250 can use the inputs and outputs provided via their SA busses to monitor and control various building zones. For example, a zone controller 236 can use a temperature input received from networked sensors 238 via SA bus 266 (e.g., a measured temperature of a building zone) as feedback in a temperature control algorithm. Zone controllers 224, 230-232, 236, and 248-250 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Semantic Building Modeling

Figure 3:
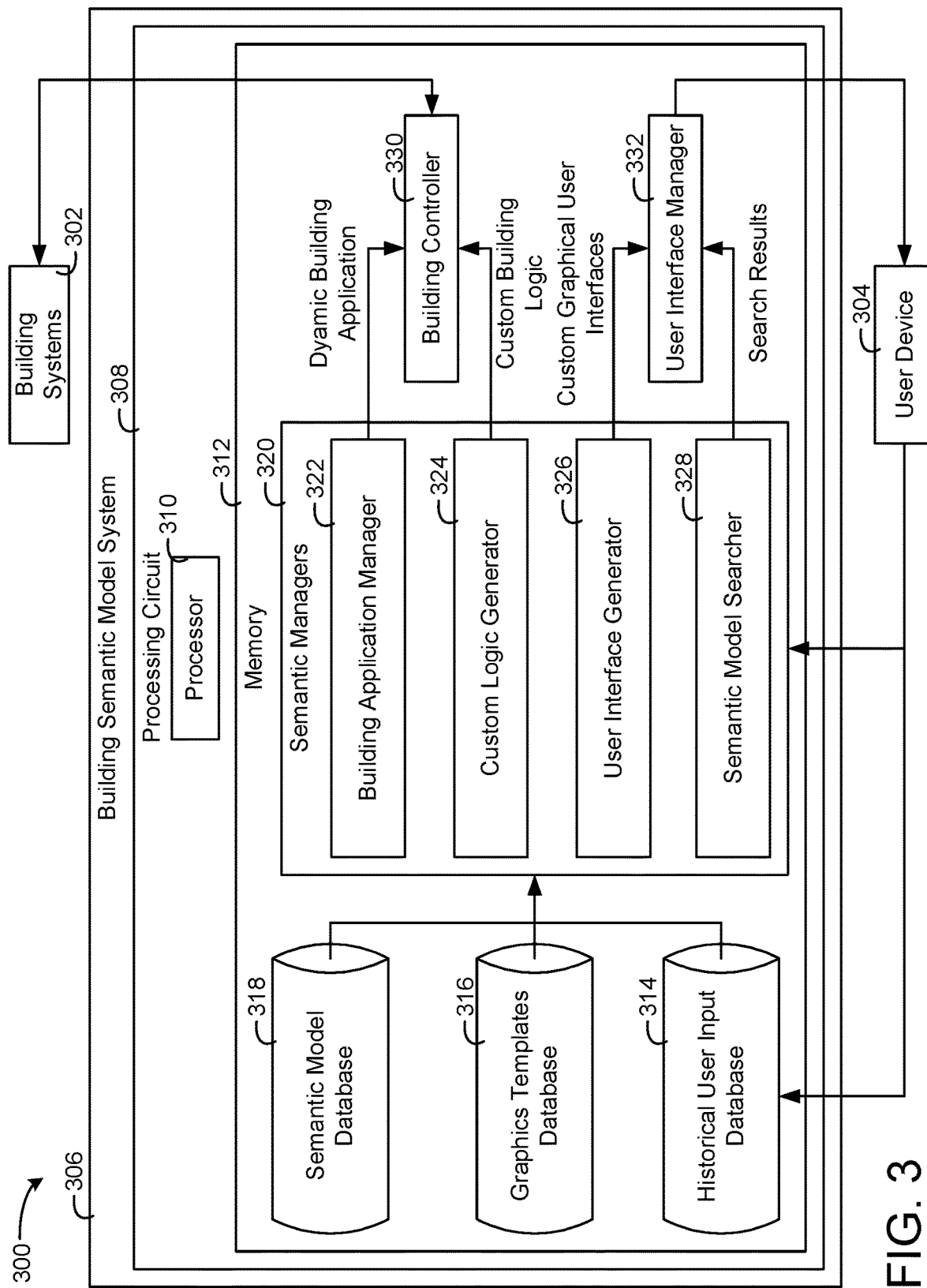
FIG. 3 is a building semantic model system that can be implemented in the building of FIG. 1, the building semantic model system including a building application manager, a custom logic generator, a user interface generator, and a semantic model searcher, according to an exemplary embodiment.

Referring now to FIG. 3, a system 300 is shown including building systems 302, a user device 304, and a building semantic model system 306, according to an exemplary embodiment. The building semantic model system 306 can be a system configured to implement building applications in one or multiple buildings via semantic building and application models, generate custom application logic based on user input and via the semantic building and application models, generate user interfaces via the semantic building and application models, and/or manage searching of the semantic building and application models. The building semantic model system 306 can be implemented for a particular building or for multiple buildings (e.g., the building 100 as described with reference to FIG. 1. Furthermore, the building systems 302 of the system 300 can be the same as, or similar to the systems described in FIG. 1 and FIG. 2. The user device 304 may be the same as or similar to the client devices 204 as described with reference to FIG. 2.

The building semantic model system 306 includes a processing circuit 308 including a processor 310 and a memory 312. The processor 310 can be general purpose or specific purpose processors, application specific integrated circuits (ASICs), one or more field programmable gate arrays (FPGAs), a group of processing components, or other suitable processing components. The processor 310 may be configured to execute computer code and/or instructions stored in the memory 312 or received from other computer readable media (e.g., CDROM, network storage, a remote server, etc.).

The memory 312 can include one or more devices (e.g., memory units, memory devices, storage devices, etc.) for storing data and/or computer code for completing and/or facilitating the various processes described in the present disclosure. The memory 312 can include random access memory (RAM), read-only memory (ROM), hard drive storage, temporary storage, non-volatile memory, flash memory, optical memory, or any other suitable memory for storing software objects and/or computer instructions. The memory 312 can include database components, object code components, script components, or any other type of information structure for supporting the various activities and information structures described in the present disclosure. The memory 312 can be communicably connected to the processor(s) 310 via the processing circuit 308 and can include computer code for executing (e.g., by the processor 310) one or more processes described herein.

In some embodiments, the building semantic model system 306 is implemented on one or multiple servers. In some embodiments, the building semantic model 306 is implemented locally within a building or premises and/or is implemented remotely. In some embodiments, the building semantic model system 306 is implemented in a cloud computing system e.g., Amazon EC2, Microsoft Azure, and/or any other cloud computing system. In some embodiments, the components (e.g., the building application manager 322, the custom logic generator 324, the user interface generator 326, and/or the semantic model searcher 328) of the building semantic model system 306 are services executed on various computing and/or server devices in a consolidated or distributed manner. The components can be configured to communicate via various networks (e.g., the Internet, Wi-Fi, a local area network (LAN), a wide area network (WAN), a metropolitan area network (MAN), Bluetooth, Zigbee, CAN, Bacnet, etc.). For example, each computing device and/or server can include multiple database storage systems, memory devices, and/or processors (e.g., similar to the memory 312 and/or the processor 310).

In some embodiments, the building semantic model system 306 is located within one or across multiple buildings (e.g., the building 100 of FIG. 1). In this regard, the building semantic model system 306 may be configured to serve the one or multiple buildings and the various sub-systems (e.g., the building systems 302) of the one or multiple buildings. In some embodiments, the building semantic model system 306 is remote from the one or multiple buildings. For example, the building semantic model system 306 may be hosted remotely and can be configured to receive data from the sub-systems of the one or multiple buildings via a network and/or communicate information (e.g., building applications, search results, user interfaces) to the one or multiple buildings or the user device 304.

The building semantic model system 306 (e.g., the memory 312) includes data storage and/or services, e.g., databases 314-318, semantic managers 320, building controller 330, and user interface manager 332. The databases 314-318 include a semantic model database 318. The databases 314-318 can be Oracle, MySQL, Microsoft SQL Server, PostgreSQL, DB2, and/or any other database or storage mechanism for storing data.

The semantic model database 318 can be configured to store one or more semantic models defining the physical construction of a building and/or systems of the building or buildings and/or control applications for operating the building or buildings. The semantic models can be defined based on the semantic modeling frameworks of the Resource Description Framework (RDF), the Web Ontology Language (OWL), RDF/OWL, RDF Schema (RDFS), Smart Appliances REFerence (SAREF) ontology, etc.

The semantic model database 318 can include one or more semantic building models defining the equipment, systems, spaces, areas, etc. and their relationships. For example, the semantic model can indicate that a building includes multiple different systems, each of the systems including multiple components located in various spaces of the building. In some embodiments, the semantic models define building applications for the building which indicate how the application should operate, what inputs the application should receive, what outputs the application should generate, the appropriate ranges of values for the output, etc.

In some embodiments, the semantic building models may include information in triples, i.e., semantic relationships between subjects (nodes), predicates (relationships), and objects (other nodes). An exemplary triple may be "Building 1 (the subject) has a (the predicate) air handler unit (the object)". Other exemplary triples may be "Temperature trend application (the subject) has a (the predicate) temperature input (the object)" and/or "temperature trend application (the subject) generates a (the predicate) temperature trend (the object)." In some embodiments, the semantic information of the semantic building models may be in the form of quadruples or any other semantic logical definition.

An ontology can be used to define the nodes and relationships. The ontology can provide logical statements representing relationships and language for defining various nodes. Based on the definitions of the ontology, particular instances of the logical statements and/or nodes defined by the ontology can be implemented. In some embodiments, the ontology is OWL. In some embodiments, the ontology is the BRICK ontology which is described in *Brick: Towards a Unified Metadata Schema For Buildings by Balaji* et al, the entirety of which is incorporated by reference herein. The ontology may define what terms are used to define the nodes and/or relationships. In some example, the ontology may be a building specific ontology. The nodes for the building system can be building equipment names, space, zone, building, floor, equipment, VAV, AHU, security panel, camera, light fixture, etc. Furthermore, the relationships can further be defined in the ontology. The relationships may be building specific relationships, e.g., controls, has, is part of, is located in, etc. The ontology may further define control applications. For example, the nodes of a semantically defined control applications can be, e.g., input, output, expected performance, performance metric, etc. The relationships can be "generates," "receives," "is verified with," etc. In some embodiments, the ontology can be any defined ontology, e.g., Haystack, Ashrae, and/or a proprietary ontology. In some embodiments, the ontology can capture a model, desired behaviors, properties, and/or attributes of various entities.

The databases 314-318 can include various interfaces for the semantic managers 320 to interact with the databases 314-318. The interfaces can be various application programming interfaces (APIs) configured to facilitate reading from and/or writing to the databases 314-318. In this regard, the semantic managers 320 can be configured to query information from the database 314-318 by generating queries in a particular query language (e.g., SPARQL, RDQL, XSPARQL, SQL, etc.) which the interfaces of the databases 314-318 can interpret.

The graphics templates database 316 can include various user interface graphics templates defining one or multiple different graphical user interface layouts and/or graphical elements for the graphical user interfaces. In some embodiments, the templates indicate an entire layout for a graphical user interface in a templatized manner. For example, what information, and/or locations for the information within the graphical user interface, can be defined by various templates. For example, for a bank, the user interface template may include prominent display of security data of security systems in a user interface (e.g., in the center of the display) with air quality information displayed in a less prominent location within the building (e.g., on the bottom of the display). However, for a residential home, a template may exist which prioritizes air quality information and lighting information over security information.

In some embodiments, the graphics templates of the graphics template database 316 include graphic displays for particular data points of particular pieces of equipment. For example, a particular trend graph may exist for temperature data points. The template can be applicable for any temperature sensor, thermostat, or controller that collects and aggregates temperature data. Instead of defining a template for each device, a single template may exist that can be applied to each device.

The historical user input database 314 can include input data received from the user device 304. For example, data collected pertaining to a user interacting with searching through building components of a building semantic model (e.g., as illustrated in FIGS. 13-18), user definitions of graphical interfaces, etc. can be included within the historical user input database 314. The semantic managers 320 can be configured to retrieve the historical user input database 314 to generate new user interfaces and/or update searching mechanisms performed by the semantic managers 320 to adapt and improve the interfaces and/or searching over time.

The semantic managers 320 include a building application manager 322, a custom logic generator 324, a user interface generator 326, and a semantic model searcher 328. The building application manager 322 can be configured to utilize the semantic models of the semantic model database 318 to generate dynamic building applications which can be implemented by a building controller 330. The building application manager 322 can be configured to self-configure and/or self-deploy various semantically defined building applications to lower or eliminate the amount of time required for a user to implement building applications.

For example, based on a semantic building model defining a physical building and a static semantic building application defining a building application, the building application manager 322 can be configured to generate a dynamic building application which is a particular implementation of the static semantic building application. The building application manager 322 can be configured to use the information of the semantic building model and the static semantic building application to identify targets (e.g., target equipment and/or target subsystems) for implementing the static semantic building application. Furthermore, various customizations and modifications can be made to the particular instance of the dynamic semantic building application.

Various linkages and/or dependencies between the dynamic building application and other building applications can be identified by the building application manager 322 and utilized in implementing the building application. Furthermore, when one building application conflicts with the operation of the dynamic building application, the building application manager 322 can make modifications to either building application so that both applications can operate without error.

The custom logic generator 324 can be configured to generate custom building logic based on input received from the user device 304 which specifies the operation of the building logic but does not provide a concise operational definition of the logic. For example, the input may be spoken or typed words defining an application. The semantic model database 318 can include various different types of control applications defined in a semantic web. The different control applications can be templates and thus, based on the user input, the custom logic generator 324 can select one of the control applications, and update the control application with the data of the user input.

For example, if a user indicates, "generate an alarm if temperature in the lobby falls below 60 degrees Fahrenheit." The custom logic generator 324 can search the semantic model database 318 that generates an alarm based on a variable falling below a threshold. The custom logic generator 324 can be configured to set input data of the template to temperature data of the lobby (e.g., based on a semantic building model defining the lobby) and set the threshold of the template to be 60 degrees Fahrenheit (e.g., based on the user input). The custom logic can be run by the building controller 330 to generate an alarm whenever the temperature of the lobby falls below 60 degrees Fahrenheit.

As another example, if the user indicates, "if the temperature in the lobby of all the buildings in the site falls below 60 degrees Fahrenheit, generate an alarm," the custom logic generator 324 can generate logic to monitor the appropriate temperatures. For example, the custom logic generator 324 can first identify what buildings are referenced by the user input (e.g., the user may use the name of each building individually, supply the name of the site, the user may be associated with a particular site, etc.). If the user provides the name of the site (e.g., Campus A) the custom logic generator 324 can identify all buildings with lobbies associated with the particular site based on the semantic information of a semantic building model.

The semantic building model may include a node for the site and nodes for each of the buildings of the site which can be related to the site via respective relationships. Some or all of the buildings may also be associated with lobbies which can also be represented by nodes and related to the respective building nodes via relationships. The custom logic generator 324 can identify buildings associated with the site via the relationships between building nodes and the site node. The custom logic generator 324 can further identify which of the buildings are associated with a lobby. Each building node can be associated with a space node via a relationship. The space node can be related to a "Lobby" type node via another relationship. The custom logic generator 324 can identify the buildings associated with lobbies by identifying which building nodes are related to the site nodes via relationships and also which building nodes are related to a space node via another relationship where the space is related to a "Lobby" type node via another relationship.

For each of the identified buildings, the custom logic generator 324 can implement the alarm requested by the user. In some embodiments, the variable supplied in the user request, "lobby temperature," can be identified for each of the buildings. For example, each lobby can be related to a zone temperature node via a relationship. The custom logic generator 324 can generate a custom logic application configured to monitor a value of the zone temperature node and generate an alarm if the value falls below 60 degrees Fahrenheit. In some embodiments, the custom logic generator 324 generates a particular query that, when querying the building model, retrieves the value of the zone temperature node. The custom logic application can include the query and can be configured to query the model periodically according to the generated query to retrieve the value and compare the value to the threshold of 60 degrees Fahrenheit.

The user interface generator 326 can be configured to generate custom graphical user interfaces based on user input, the graphics templates database 316, and the semantic models of the semantic model database 318. Furthermore, the user interface generator 326 can be configured to utilize the historical user input of the historical user input database 314 to generate the custom graphical user interfaces. For example, the user interface generator 326 can be configured to identify, based on the user input, what type of graphics template is appropriate. For example, the user input may specify that the user would like to view security and lighting data together in a single interface. In this regard, the user interface generator 326 can be configured to select an appropriate interface template. Furthermore, based on the actual construction of the building and equipment of the building defined in a semantic building model of the semantic model database 318, the user interface generator 326 can generate the custom graphical user interface.

For example, a user may define, via their input, that they wish to generate a custom graphical user interface that displays a security feed of every camera in every conference room of a building. The user interface generator 326 can be configured to select a user interface template from the graphics templates database 316 that defines a user interface with one or multiple video feeds. The user interface generator 326 can analyze a building semantic model to identify which conference rooms include security cameras and cause the user interface to include the video feeds. However, if the number of security cameras in conference rooms change, as reflected in the semantic building model, the user interface generator 326 can be configured to automatically update the custom graphical user interfaces to reflect new video feeds or less video feeds.

The semantic model searcher 328 can be configured to perform searching of semantic models of the semantic model database 318 based on search requests received from the user device 304. In some embodiments, the user input can be defined in a natural language. For example, the search request can be typed or alternatively spoken. The search request may be "Please show me security cameras that are not functioning" or "Show me VAV boxes in Building 1." The semantic model searcher 328 can be configured to generate a query based on the text input and query the semantic model database 318 to identify the information requested by the user. In some embodiments, the generation of the queries is generated based upon and/or machine learning. Based on historical user data, e.g., data of the historical user input database 1110, the semantic model searcher 328 can learn from user requests and improve the information presented to a user by analyzing how a user interacts with a display screen after viewing search results.

For example, if a user inputs, "Air regulating equipment of building 1," the semantic model searcher 328 may generate a query that retrieves all information for building 1 including both VAV boxes and AHUs. However, if the user interacts with the screen to view only the VAV boxes instead of the AHUs, or view the VAV boxes more prominently, the semantic model searcher 328 can learn that "air regulating equipment" should be interpreted as VAV boxes and not AHUs. Therefore, future queries can be adjusted.

The building controller 330 can be configured to implement control and/or analysis of the building systems 302 with the dynamic building application generated by the building application manager 322 and/or the custom logic generator 324. The building controller 330 can be configured to perform setting configuration updates which can be deployed to the buildings systems 302 to update operation of the building systems 302. In some embodiments, the building controller 330 performs control operates e.g., proportional, integral, derivative (PID) control, model predictive control, etc.

In some embodiments, the building controller 330 retrieves any semantic model, preconfigured and stored in the semantic model database 318, generated by the semantic managers 320, and/or updated by the semantic managers 320, and utilizes the semantic models to perform control and/or analysis of the building systems 302. In some embodiments, the building controller 330 utilizes the semantic models of the semantic model database 318 to understand data relationships, for example, the building controller 330 can identify that a particular VAV box manages a zone. A temperature sensor in the zone can measure temperature within the zone. The building controller 330, can identify, based on the semantic models of the semantic model database 318 that the VAV and the sensor are related and that a control application (e.g., which may be defined based on a semantic model) should be used to control the operational parameters for the zone and/or VAV based on temperature measurements of the sensor.

Furthermore, in some embodiments, the building controller 330 can receive data from the building systems 302 and analyze the building data based on the semantic models. For example, the semantic models may define a fault detection application for parameters of the building systems 302. In this regard, based on the collected data and the fault detection application, the building controller 330 can determine whether faults have occurred in the building systems 302.

The user interface manager 332 can be configured to manage user interfaces and cause the user device 304 to display the user interfaces. In some embodiments, the user interfaces managed by the user interface manager 332 are the user interfaces of FIGS. 13-18. In some embodiments, the user interface manager 332 receives inputs from the user device 304 interacting with the user interfaces managed by the user interface manager 332. In this regard, the user interface manager 332 can respond to the interactions by performing page navigations, displaying requested data, etc. In some embodiments, the user device 304 generates search requests via the user interfaces managed by the user interface manager 332 and the user interface manager 332 can display the result of the search performed by the semantic model searcher 328 with the search requests. In some embodiments, the interface displayed by the user interface manager 322 can be generated by the user interface generator 326 such that the user interface generator 326 identifies components and/or connections between the components of a particular building system. The user interface generator 326 can be configured to use the components and/or connections to generate a visual representation of the system indication where collected data (e.g., ambient condition measurements, control settings, etc.) should be displayed in the interface.

Semantic Building Applications

Figure 4:
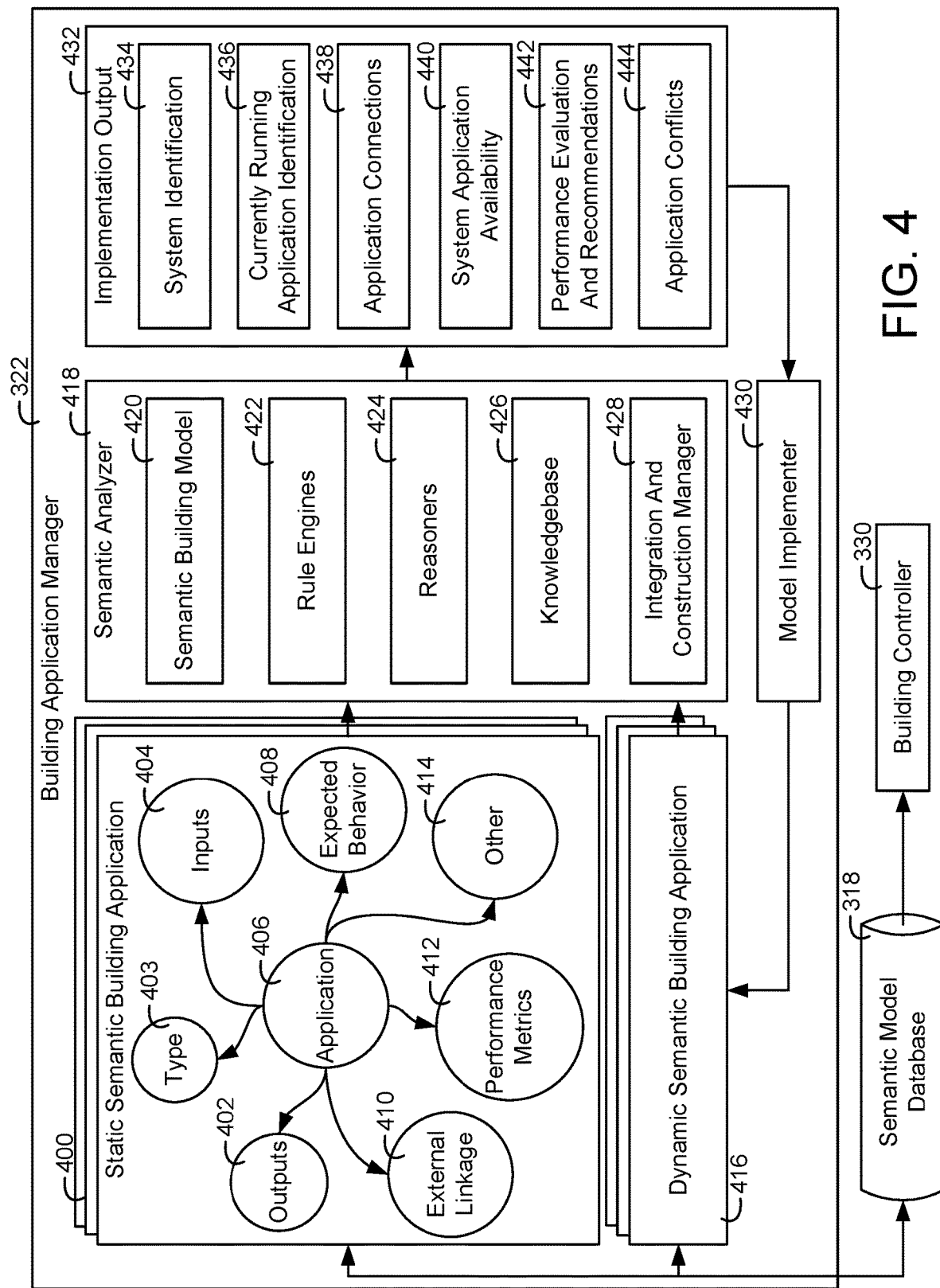
FIG. 4 is a block diagram of the building application manager configured to specify a building application in a form of semantic model and use the building semantic model to enable plug-and-play of the building application, according to an exemplary embodiment.

Referring now to FIG. 4, the building application manager 332 is shown in greater detail, according to an exemplary embodiment. The building application manager 332 can be configured to implement a mechanism for self-configuring and self-deploying of building applications to implement plug-in-play building applications. The building application manager 332 is configured to receive semantic models from the semantic model database 318, in some embodiments. The building application manager 332 is configured to receive a static semantic building application 400 from the semantic model database 318. The static semantic building application 400 can be a control application for controlling a parameter or environmental condition of a building and/or may be an analysis application configured to monitor parameters and/or generate metrics. The static semantic building application 400 can be static, i.e., it may not change and may be a generic description of a building application, i.e., it may not include specific implementation details.

The static semantic building application 400 can be defined by a developer and stored within the semantic model database 318. Rather than being specific to particular implemented equipment, the static semantic building application 400 can be generic, e.g., the static semantic building application 400 could be a camera control application configured to control pan, tilt, zoom (PTZ) cameras of a building. Rather than being specific to a particular PTZ camera, the application can be generic such that it can be applied to any PTZ camera.

The static semantic building application 400 includes multiple different nodes and relationship between the nodes. The nodes can include an application node 406. The application node 406 may include a name or a value identifier indicating a particular instantiation of the static semantic building application 400. The model implementer 430 can assign the application node 406 upon implementing the static semantic building application 400 as the dynamic semantic building application 416. Furthermore, the application node 406 can define sequences of operations to generate the outputs 402 based on the inputs 404. The sequences of operations can be operational code, control models, etc. In some embodiments, the sequences of code are not stored directly within the application 400 but are linked to the application 400 and are stored in a code database. The application node 406 can be linked to various other nodes defining the application 400 in greater detail, i.e., the nodes 402-404 and 408-412.

The type 403 can be related to the application node 406 and can define what type of application the static semantic building application 400 is. For example, the type may indicate "Pressure Reset," "Future Occupancy Projection," "Temperature Control," etc. and can define the application 400. The outputs 402 can be the data outputs of the application 400. For example, for a temperature control application, the outputs 402 could be setpoint, heating stage or cooling stage activations, damper positions, etc. Similarly, the inputs 404 can represent the input into the application 400, for example, measurements (e.g., temperature, pressure, humidity, etc.), static equipment parameters (chiller size, damper range, etc.), etc.

The expected behavior 408 can indicate the result of operating the application 400. For example, the expected behavior 408 may indicate nominal ranges for the outputs 402, nominal ranges of the performance metrics 412, etc. For example, for a building application controlling water flow, the expected behavior 408 may indicate that the max water flow deviation must be within 30% of a target water flow. The performance metrics 412 can be values generated by the application 400 to represent the performance of the application 400. For example, for an energy savings application, the performance metrics 412 may indicate a percentage of energy saved. For an occupancy prediction application, the performance metrics 412 can indicate how accurate the predictions for the application 400 are.

The external linkage 410 may indicate other applications that the application 400 is linked to. For example, an energy savings application may be linked to a temperature control application such that the energy savings application feeds the temperature control application a temperature setpoint that the setpoint control application uses to control temperature. The other node 414 indicates any other number of nodes that can be included in the application 400. For example, the node 414 could indicate requirements for implementing the application 400, e.g., the application can only be run for a system with fan-coil units connected to air-cooling chillers for a laboratory room. Furthermore, the criteria may be that the application 400 only runs with sensors of particular precision levels or that a room that the application 400 is implemented for must have two different room temperature sensors with particular precision levels. Based on such criteria, the semantic analyzer 418 can identify particular target systems for implementing the application 400 on where the target systems meet the criteria specified by the nodes 402-414 of the application 400.

The building application manager 322 includes a semantic analyzer 418 configured to generate an implementation output 432. The semantic analyzer 418 can analyze the static semantic building application 400, a semantic building model 420, and/or other semantic building applications running in a building to generate the implementation output 432. The implementation output 432 may define a particular implementation of the static semantic building application 400. Based on the implementation output 432, the model implementer 430 can generate a dynamic semantic building application 416. The dynamic semantic building application 416 can be a particular instantiation of the static semantic building application 400.

In this regard, one or multiple of the dynamic semantic building applications 416 can be generated based on the static semantic building application 400. Furthermore, the static semantic building application 400 could be implemented multiple times within a building or across various different buildings. This can speed up the time to develop building applications for buildings.

The semantic analyzer 418 includes a semantic building model 420. The semantic building model 420 can define systems of a building in a semantic model. The semantic building model 420 can provide the semantic analyzer 418 with an understanding of the physical construction of a building and/or the systems that operate the building. Based on the semantic building model 420 and the static semantic building application 400, the semantic analyzer 418 can identify appropriate target systems and/or devices to run the static semantic building application 400 on (e.g., generate an instantiation of the static semantic building application 400).

The semantic analyzer 418 can be configured to perform reasoning and/or inference to generate the implementation output 432. In some embodiments, the semantic analyzer 418 includes one or multiple rule engines 422. The rule engines 422 can include one or multiple different rules for applying the static semantic building application 400. For example, the rules may define that pressure resets applications apply to air handler units or that temperature regulation applications pertain to devices that control setpoint temperatures. In this regard, the semantic analyzer 418 can analyze the semantic building model 420 to identify appropriate target systems according to the rule engines 422 to implement the static building application 400 on.

The reasoners 424 can be semantic reasons configured to reason an output or consequence of performing a particular action from a set of facts and/or axioms. In some embodiments, the reasoners 424 include jcel, Pellet, Prova, RACER, RDF Sharp, and/or any other type of semantic reasoner. The facts can be information stored within the knowledgebase 426. The information may be information of a building (e.g., size, type, age, types of systems, etc.) and/or information of systems of the building (e.g., equipment types, equipment points, etc.). In some embodiments, the facts can be the information of the semantic building model 420 and/or the static semantic building application 400. Furthermore, the axioms utilized by the reasoners 424 can be the same as and/or similar to the rules of the rule engines 422.

The semantic analyzer 418 includes an integration and construction manager 428, in some embodiments. The integration and construction manager 428 can be configured to identify the appropriate method for instantiating an application. For example, the integration and construction manager 428 can be configured to identify that one or multiple dynamic semantic building applications 416 are related and need to execute in a particular order, otherwise, the applications interfere and conflict with each other.

The implementation output 432 can define a particular instantiation of the static semantic building application 400. The implementation output 432 can include a system identification 434. The semantic analyzer 418 can identify one or multiple systems that the static semantic building application 400 should be instantiated for. These targets can be generated as the system identification 434.

The currently running application identification 436 can be an identification of any other application currently running for the identified systems indicated by the system identification 434. The semantic analyzer 418 can identify the currently running applications and generate the currently running application identification 436. For example, a zone controller may have a control application for controlling temperature. However, if the static semantic building application 400 is an air quality application, the model implementer 430 may require an understanding of the temperature control application in order to implement the air quality application.

The application connections 438 may indicate how applications should be connected for operation. In some embodiments, multiple applications should be connected such that the output of one application feeds an input of another application. In some embodiments, the connections indication particular schedules for the applications to run in. For example, an air quality control application may require an input which indicates projected air quality data. Another application, can be configured to generate the projected air quality data. The application connections 438 may indicate that the output of the application generating the projected air quality data should be an input to the air quality control application. As another example, one application may be an energy savings application configured to control temperature of a building in an energy efficient manner. Another application may be a comfort application configured to operate temperature of a building to a comfortable temperature without taking into account energy usage. The applications can be linked such that during occupancy times, the comfort application is used but during non-occupancy times, the energy savings application is run.

The system application availability 440 can indicate whether the identified systems for running the static semantic building application 400 are available to operate based on the static semantic building application 400. For example, a system may currently be offline or otherwise inoperable. In such a circumstance, the system application availability 440 may indicate that the system is unavailable to run the static semantic building application 400.

The performance evaluation and recommendations 442 may indicate how the static semantic building application 400 should operate. The semantic analyzer 418 can generate the performance evaluation and recommendations 443 based on the expected behavior 408 of the static semantic building application 400 and/or knowledge of the target system. For example, the expected behavior 408 may provide an indication of an average temperate of a temperature control application should reach a setpoint in a particular length of time. However, based on information of the target system, e.g., the type of system, the semantic analyzer 418 can be configured to tune the length of time to be applicable for the target system.

The implementation output 432 may further define application conflicts 444. The application conflicts 444 may indicate which applications conflict with each other and are not immediately compatible to be operated on the same equipment. For example, a building application to optimize the operation of a supply fan and a building application configured to optimize cooling coils may conflict with each other although they operate different pieces of equipment. In some embodiments, the application conflicts can further define a particular configuration of the dynamic semantic building application 416 that resolve the conflicts. For example, if the semantic analyzer 418 identifies a conflict of two applications, the semantic analyzer 418 can determine appropriate resolutions to the conflicts, e.g., that the applications run in particular orders and/or at particular times.

For example, a first control application of a first zone may control temperature of a first zone. A second control application of a second zone may control temperature of the second zone. However, when the first and second zones may be neighboring zones such that changes to one zone affect the other zone. In this regard, the two applications may conflict. However, the applications can be linked together by the application connections 438 such that the applications run together to provide particular amounts of error in the zone such that the average error of both zones is minimized, resolving the control conflict. This resolution can be an extra constraint placed on the dynamic semantic building application 416 and can be represented as another node within the semantic description of the dynamic semantic building application 416.

As another example, a zone temperature control application may conflict with a supervisory temperature control application. The semantic analyzer 418 can identify such a conflict by analyzing a currently implemented control application (e.g., the application 416) to identify that the supervisory control application that controls temperature and may determine that the application 400 also controls temperature. The model implementer 430 may resolve the conflict between the two control applications by causing the zone control application to operate to a temperature setpoint set by the supervisory control application in order to resolve the conflict between the two applications.

Another resolution to the application conflicts 444 may be to run a first application and determine whether the first application is successful and then subsequently run a second application if the first application is not successful. For example, if the supervisory control application fails to bring a temperature to a setpoint within a predefined amount of time, the zone control application can be configured by the model implementer 430 to only run if the supervisory control application fails to bring the temperature to the setpoint within the predefined amount of time.

Based on the implementation output 432, the model implementer 430 can be configured to generate the dynamic semantic building application 416. The model implementer 430 can consider each of the outputs of the implementation output 432 and generate the application which they define. The building controller 330 can retrieve the dynamic semantic building application 416 from the semantic model database 318 and cause the application to be run.

In some embodiments, the model implementer 430 determines whether to implement the application 400 on a first come, first implemented basis. For example, the currently running application identification 436 indicates that there already is an application running to control a particular parameter, the model implementer 430 can be configured to determine not to implement the application 400. However, if the application ceases to run or is deleted, the model implementer 430 can implement the application 400.

In some embodiments, the application 416 is similar to the application 400, i.e., it includes a semantic description in a graph form, but the application 416 includes specific implementation details, i.e., the nodes of the application 416 are specific to its implementation while the nodes of the application 400 are generic. In some embodiments, the building controller 330 can utilize the description of the application 416 to identify whether the application is running properly. For example, expected behavior 408 and/or performance metrics 412 may be included within the application 416 and therefore, the building controller 330 can determine whether the application 416 has been initiated properly and/or is behaving as expected. If the application 416 is not behaving as expected, the manager 322 can remove the application 416 and/or reconfigure the application 416 with new parameters.

Figure 5:
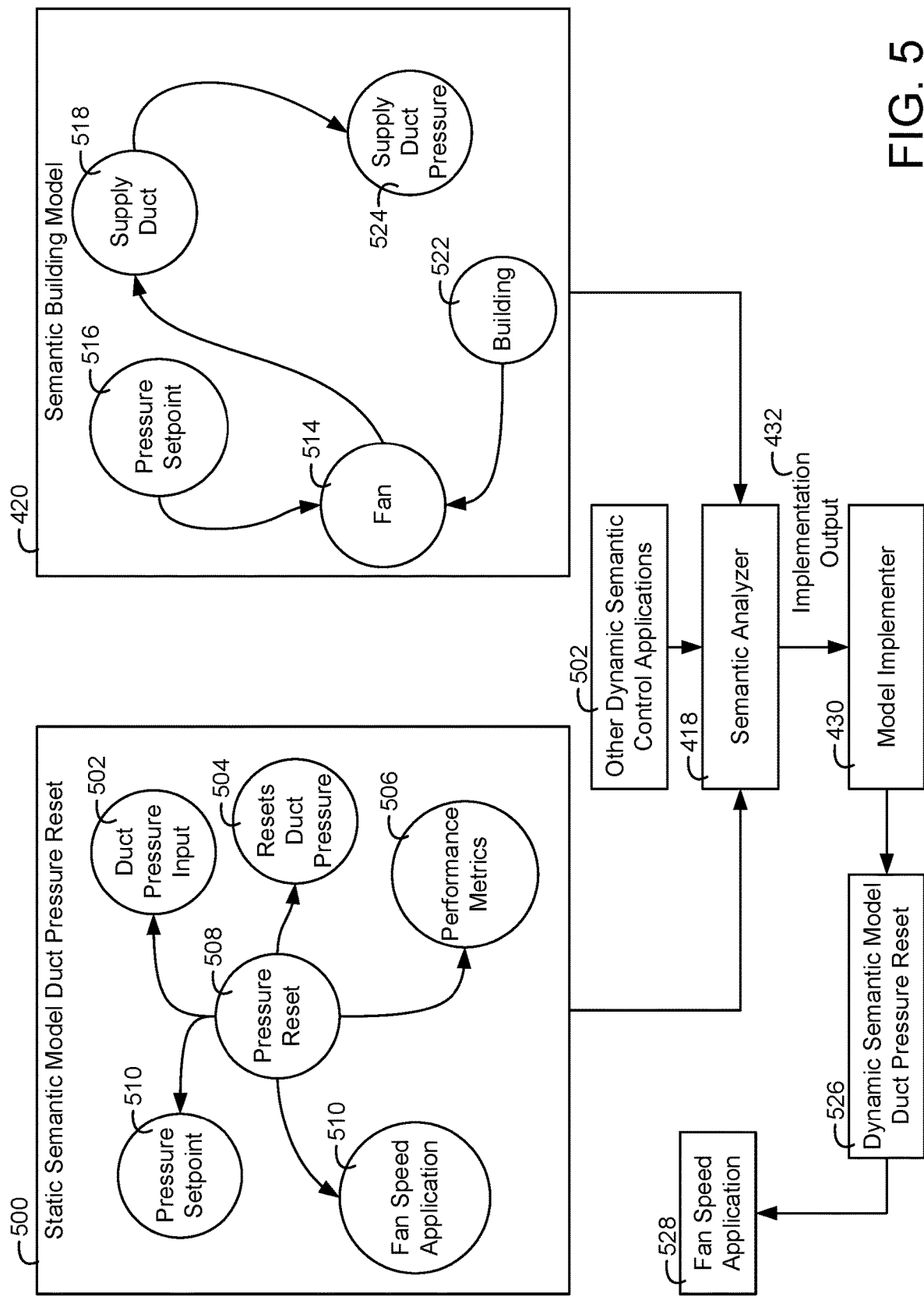
FIG. 5 is a block diagram of components of the building application manager of FIG. 4 implementing a dynamic semantic control application based on a static semantic control application and a semantic building model, according to an exemplary embodiment.

Referring now to FIG. 5, components of the building application manager 322 are shown generating dynamic semantic building application from a static model and a building model, according to an exemplary embodiment. FIG. 5 includes the semantic analyzer 418 and the model implementer 430 as discussed in greater detail in FIG. 5. The semantic analyzer 418 receives a particular semantic model representing a building application, a static semantic model duct pressure reset 500. The duct pressure reset 500 may define an application for resetting a duct pressure. The reset 500 can include an output, pressure setpoint 501, an input, duct pressure input 502, a description, resets duct pressure 504, performance metrics 506, and a related application, fan speed application 510.

The semantic building model 420 is shown to include nodes indicating a building 522, a fan 514, a pressure setpoint 516, a supply duct 518, a return duct 520, a supply duct pressure 524, and a return duct pressure 524. The semantic building model 420 can indicate that the fan 514 is operated based on a pressure setpoint 516. The fan 514 can operate a supply duct 518 which has a particular supply duct pressure 524.

Based on the static semantic model duct pressure rest 500, the semantic building model 420, and/or the other dynamic semantic control application (reset 502), the semantic analyzer 418 can generate the implementation output 432 defining the dynamic semantic model duct pressure reset 526 and its linkage to a fan control application 528. The semantic analyzer 418 can identify the fan 514 and/or the supply duct 518 as a target for the reset 500 by identifying that the reset 500 includes an input duct pressure 502 and a pressure setpoint 501 which correspond to nodes used to control the pressure of the model 420, i.e., pressure setpoint 516 can correspond to pressure setpoint 501 and the duct pressure input 502 can correspond to the supply duct pressure 524. Similarly, the semantic analyzer 418 could include rules that indicate that any application with a "resets duct pressure" description (description 504) is used to control a fan that operates a supply duct (e.g., the fan 514 and the supply duct 518).

Furthermore, the implementation output 432 may indicate that the dynamic semantic model duct pressure reset 526 should be connected to the fan control application 528. The implementation output 432 can identify that an application relationship is required for the dynamic semantic model duct pressure reset 526 since the reset 500 includes a related application, the fan speed application 510. In response to identifying the related application, the semantic analyzer 418 can identify an already existing fan control application for the fan 514 and/or generate a new fan control application if one does not already exist. In some embodiments, the reset 526 provides the pressure setpoint to the fan control application 528 so that the fan control application 528 can identify an appropriate fan speed based on the pressure setpoint.

Figure 6:
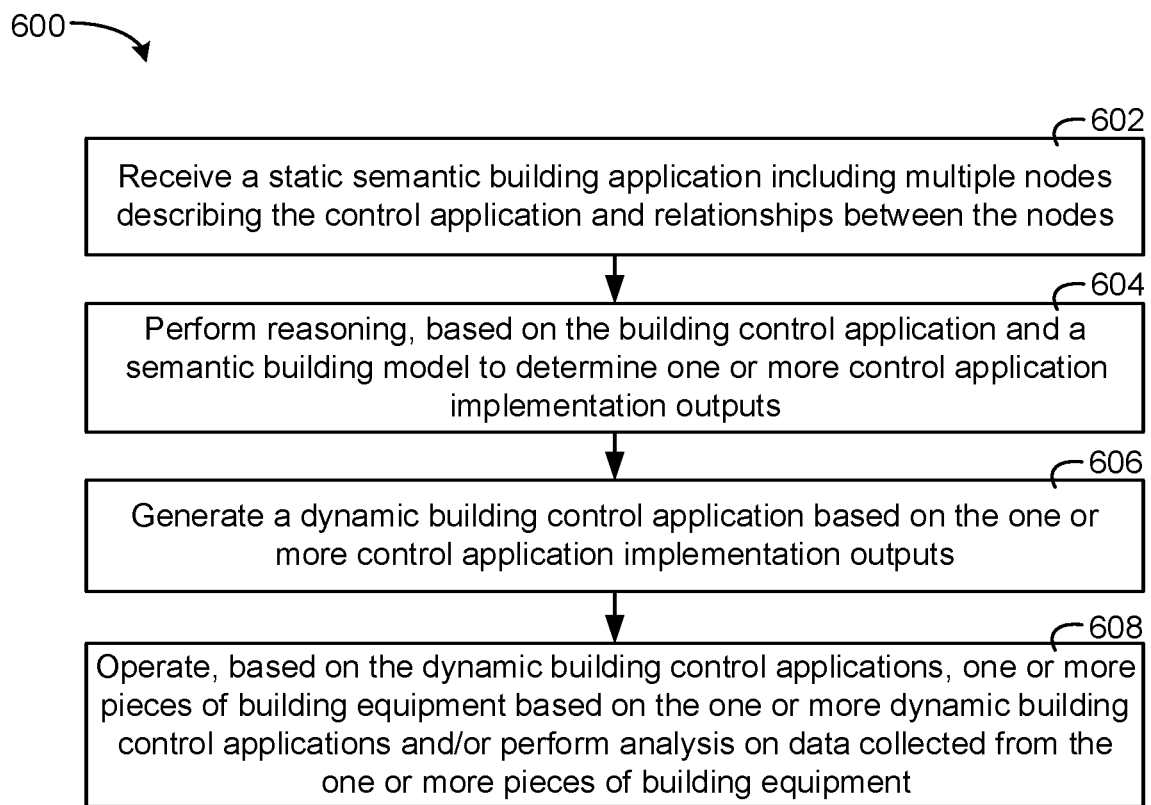
FIG. 6 is a flow diagram of a process of implementing the dynamic semantic control application with the static semantic control application and the semantic building model that can be performed by the building application manager of FIG. 4, according to an exemplary embodiment.

Referring now to FIG. 6, a process 600 for generating dynamic semantic building applications based on static semantic building applications is shown, according to an exemplary embodiment. In some embodiments, the building application manager 322 is configured to perform the process 600. In some embodiments, the building application manager 322 utilizes the semantic model database 318 and the modes stored therein to perform the process 600. The processing circuit 308 and/or any other computing device described herein, can be configured to perform the process 600.

In step 602, the building application manager 322 receives a static semantic building control application including multiple nodes describing the control application and relationships between the nodes. For example, the building application manger 322 can retrieve the static semantic building application 400 from the semantic model database 318. The building application manager 322 can retrieve the application 400 periodically to determine whether the application 400 needs to be implemented and/or in response to receiving a user request indicating to implement any application or the application 400 specifically. In some embodiments, any time a new static model is defined by a user, the manager 322 receives or retrieves the model to determine whether or where the application should be implemented.

In step 604, the building application manager 322 can perform reasoning on the static semantic building application and building information, e.g., a semantic building model, to determine one or more control application implementation outputs defining a particular implementation of the static semantic building application. For example, various rulesets and/or reasoning algorithms can be configured to identify what systems that application 400 could be implemented on, what conflicts the application 400 would have with other applications and what the appropriate resolution to those conflicts would be, what links to other applications, etc. In some embodiments, the building application manager 322 uses the semantic building model 420 as a knowledgebase to perform the reasoning using the nodes of the semantic building model 420 to identify what systems the application 400 could be implemented on.

In step 606, based on the one or more control application implementation outputs, the building application manager 322 can generate a dynamic building control application. The dynamic building control application can be an instantiation of the static semantic building application where the dynamic semantic building application is customized according to the control application implementation outputs. The dynamic semantic building control application can be the dynamic semantic building application 416. Based on the application 416, in step 608, the building controller 330 can operate the building systems 302 and/or analyze data collected from the building systems 302.

Custom Logic Generation

Figure 7:
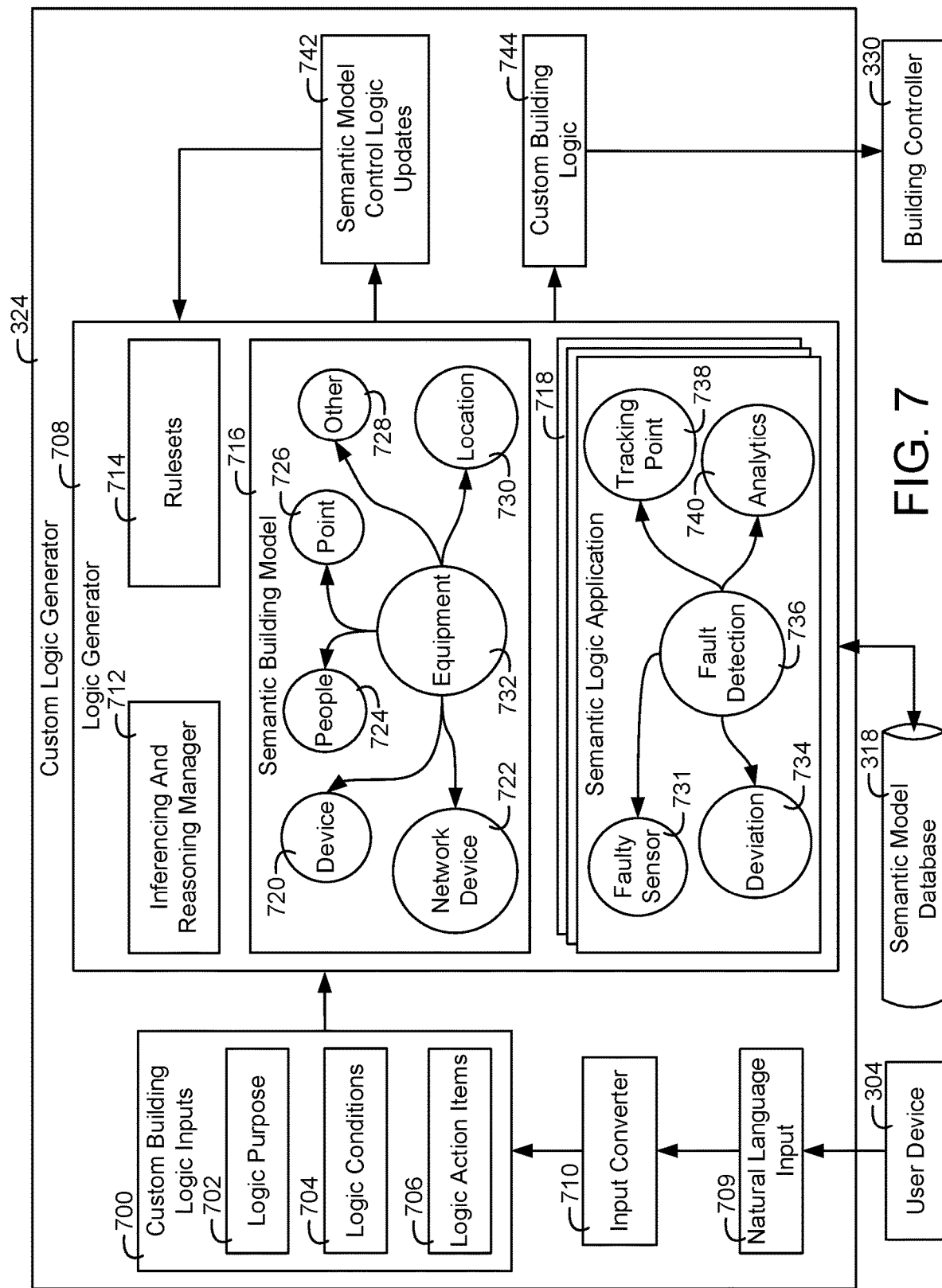
FIG. 7 is a block diagram of the custom logic generator of the building semantic model system of FIG. 3 in greater detail configured to receive input from a user device and generate custom building logic based on the input, according to an exemplary embodiment.

Referring now to FIG. 7, the custom logic generator 324 is shown in greater detail, according to an exemplary embodiment. The custom logic generator 324 can be configured to develop and/or implement rule based logic, e.g., rule-based fault detection, rule-based diagnostic generation, and/or rule-based supervisory control. In some embodiments, the custom logic generator 324 is configured to generate the rule-based logic without requiring programming and/or domain expert knowledge. For example, the custom logic generator 324 can be configured to receive definitions of logic in a natural language instead of in a code description.

The custom logic generator 324 includes a logic generator 708 is configured to receive custom building logic inputs 700 defined by the user device 304 and generate custom building logic 744 that can be executed by the building controller 330. The user device 304, via input from a user, can provide the custom building logic inputs 700 to the logic generator 708. The custom building logic inputs 700 may describe a logic application that the user wishes to operate. However, the inputs 700 may be defined in text instead of code, i.e., in keywords and/or phrases in a natural language. The inputs 700 include logic purpose 702, logic conditions 704, and logic action items 706.

The semantic logic application 718 can be defined with a semantic description. The application 718 can include multiple nodes and relationships between the nodes. The nodes can be a fault detection node 736. The node 736 can identify that the purpose of the application 718 is to detect a fault. Similarly, the node 736 could be "Point Control" to identify that the purpose of the application 718 is to control a particular point. The node faulty sensor 731 may indicate the result of the application 718, the identification of whether a particular sensor is faulty or not. The tracking point 738 may indicate the point which the application 718 tracks to determine whether there is a fault. For example, the tracking point could be a temperature measurement, a valve position, etc. The deviation 734 may indicate a value for a threshold. If the tracking point 738 exceeds or falls below the threshold, the fault detection node 736 can indicate that a sensor is faulty. The analytics 740 may indicate the logic to compare the tracking point 738 against the deviation 734. For example, the analytics 740 may indicate that the tracking point 738 should be within a deviation indicated by the deviation 734 from a setpoint or that the tracking point 783 should always be greater than a particular threshold.

In some embodiments, the logic purpose 702, the logic conditions 704, and the logic action items 706 are based on the natural language input 709. For example, custom logic generator 324 can include an input converter 710 that can be configured to generate the custom building logic inputs 700 based on the natural language input 709. In some embodiments, the logic purpose 702, the logic conditions 704, and the logic action items 706 are selected by the user from an available set of logic purposes and operations and action items.

As an example, the natural language input 709 may be "Create an alarm trigger for all temperatures deviating from a respective temperature setpoint by five degrees Fahrenheit in each room of building 10." The input converter 710 can determine, based on the input 709, that the logic purpose 702 of the logic is fault detection by identifying the words "alarm trigger." The input converter 710 can identify the logic conditions 704 by analyzing the rules of the natural language input 709. For example, the logic conditions 704 may be to compare a particular value to a threshold, e.g., comparing temperature error between a measured temperature and a setpoint of each room of a particular building to the threshold identified in the natural language input 709. The logic action items 706 may be the operations performed in response to the logic conditions 704 occurring. For example, if logic action items 706 may be to generate an alarm trigger in response to the logic condition 704 being true.

The logic generator 708 includes inferencing and reasoning manager 712 and rulesets 714. The inferencing and reasoning manager 712 can be the same as, or similar to, the reasoners 424 as described with reference to FIG. 4 and can be configure to generate the custom building logic 744 based on the custom building logic inputs 700. The inferencing and reasoning manager 712 can be configured to implement jcel, Pellet, Prova, RACER, RDF Sharp, and/or any other type of semantic reasoning. In some embodiments, the logic generator 708 generates the custom building logic 744 according to rules of the rulesets 714 which may be user specific definitions of rules to apply to generate the custom building logic 744. In some embodiments, the inferencing and reasoning manager 712 can include custom rules and/or rulesets. For example, the inferencing and reasoning manager 712 can include custom rule templates to which the user can provide implementation details in order to implement custom reasoning and/or inference.

The logic generator 708 is configured, in some embodiments, to receive and/or retrieve a semantic building model 716 and/or a semantic logic application 718 from the semantic model database 318. For example, the semantic building model 716 may be the same as or similar to the semantic building model 420 as described with reference to FIGS. 4-5. The semantic logic application 718 can be the same as, or similar to, the static semantic building application 400. In some embodiments, the semantic building model 716 provides a semantic description of a particular building or buildings. The semantic logic application 718 provides a semantic description of a logic application, e.g., a logic application to identify a fault or condition and/or a logic application to control a parameter of a building.

The model 716 includes multiple nodes 720-732 and relationships between the nodes. In FIG. 7, nodes 720-730 provide characteristics of equipment 732 in a semantic framework. The equipment 732 may be a node identifying the particular equipment, e.g., a sensor, an actuator, an AHU, etc. The equipment 732 may include a name of the equipment identifying the equipment, e.g., Actuator 7, Sensor A, etc. The network device 722 may represent a network device that the equipment utilizes to communicate via. The device 720 may represent a device of the equipment 732, for an example, the device 720 could be a damper when the equipment 732 is a VAV box.

People 724 may indicate users that are associated with the equipment while point 726 may represent a particular data point. For example, when the equipment is a humidity sensor, the point 726 may represent a measured humidity. As another example, when the equipment 732 is a VAV box, the point 726 may represent a control point, e.g., a pressure setpoint and/or a damper position. Location 730 may represent the location of the equipment, e.g., what room, building, state, or country the equipment 732 is located. There may be any number of nodes related to the equipment 732, these nodes are represented by node other 728.

The logic generator 708 is, in some embodiments, configured to generate the custom building logic 744 based on the custom building logic inputs 700. The logic generator 708 can analyze the custom building logic inputs 700 to identify which of multiple different semantic logic applications 718 to select a logic application. For example, if the logic purpose 702 is fault detection, the logic generator 708 may select only from semantic logic applications 718 appropriate for fault detection. Similarly, if the logic purpose 702 is for parameter control, the logic generator 708 may select only from semantic logic applications 718 that implement parameter control.

Furthermore, based on the logic conditions 704, the logic generator 708 can select from the semantic logic applications 718. For example, if the logic condition 704 is to compare sensor readings to thresholds, the logic generator 708 is configured to select an application 718 appropriate for comparing sensor measurements to a threshold. Furthermore, the logic generator 708 can be configured to analyze the logic action items 706 to select an application. For example, if the logic action item 706 is to generate an alarm in response to detecting a sensor measurement exceeding a threshold, the logic generator 708 may select a template the generates alarms for sensors where a sensor measurement exceeds the threshold. Similarly, if the logic action item 706 indicates that a particular point is updated according to a control algorithm in response to the sensor measurement exceeding a threshold, the logic generator 708 can select a logic application 718 that operates a parameter based on a threshold comparison for a sensor.

The logic generator 708 can ingest information into the selected logic application 718 and generate the custom building logic 744 based on the application 718 ingested with the data. For example, if the logic conditions 704 indicate a specific value for a threshold comparison, the application 718 can be updated to include the specific threshold. Similarly, if the input to the threshold comparison is a data point of a particular piece of building equipment the logic generator 708 can identify the data point in the model 716 and update the input of the application 718 to include the data point of the model 716 as an input.

The custom building logic 744 generated by the logic generator 708 can be code generated according to the analyze of the logic generator 708 of the custom building logic inputs 700. The custom building logic 744 is, in some embodiments, the application 718 in semantic form describing the logic to be performed with implementation data ingested into it by the logic generator 708. The building controller 330 can be configured to implement the custom building logic 744 by using the custom building logic 744 to control the building systems 302 and/or perform fault analysis of the building systems 302. Furthermore, the logic generator 708 can generate semantic model control logic updates 742. The logic updates 742 may provide an ingestion of the custom building logic 744 into the semantic building model 716 so that the logic generator 708 can track what building logic 744 is currently running. In some embodiments, the building controller 330 runs the custom building logic 744 from the semantic building model 716 where the custom building logic 744 is ingested. In some embodiments, multiple custom building logics can be combined together to create larger and/or more complicated operations. For example, a first logic application could generate an alarm. A second logic application could be connected to the first logic application (e.g., the output of the first logic is an input to the second logic) such that a particular control command is implemented in response to the alarm occurring.

In some embodiments, the updates 742 create new points for the model 716 based on points of the custom building logic 744. For example, an alarm condition may be a new point for a sensor or device in the model 716. Alternatively, a control output of the logic 744 may be added as a new node to the model 716.

In some embodiments, the custom building logic 744 includes one or multiple operations that resolve conflicts with other operating logic and/or building applications. For example, one application may generate an alarm if a monitored equipment setting exceeds a predefined amount. However, another application may perform a system test causing the setting to exceed the predefined amount intentionally. A resolution can be generated indicating an exception where the logic 744 does not generate an alarm when the system test application is executing. The conflicts and resolutions for the logic 744 can be the same and/or similar to the conflicts and resolutions generated by the building application manger 322 between building applications.

Furthermore, in some embodiments, the user interface manager 322 can be configured to generate a visual representation of the custom building logic 744. In some embodiments, the logic 744 may the same as and/or similar to the graphical nodes and relationships illustrated in the applications 718 in FIG. 7 but with incorporated implementation details. For example, a user interface could include a name of the logic 744 and an indication of the input nodes, the output nodes, etc. of the logic 744.

Figure 8:
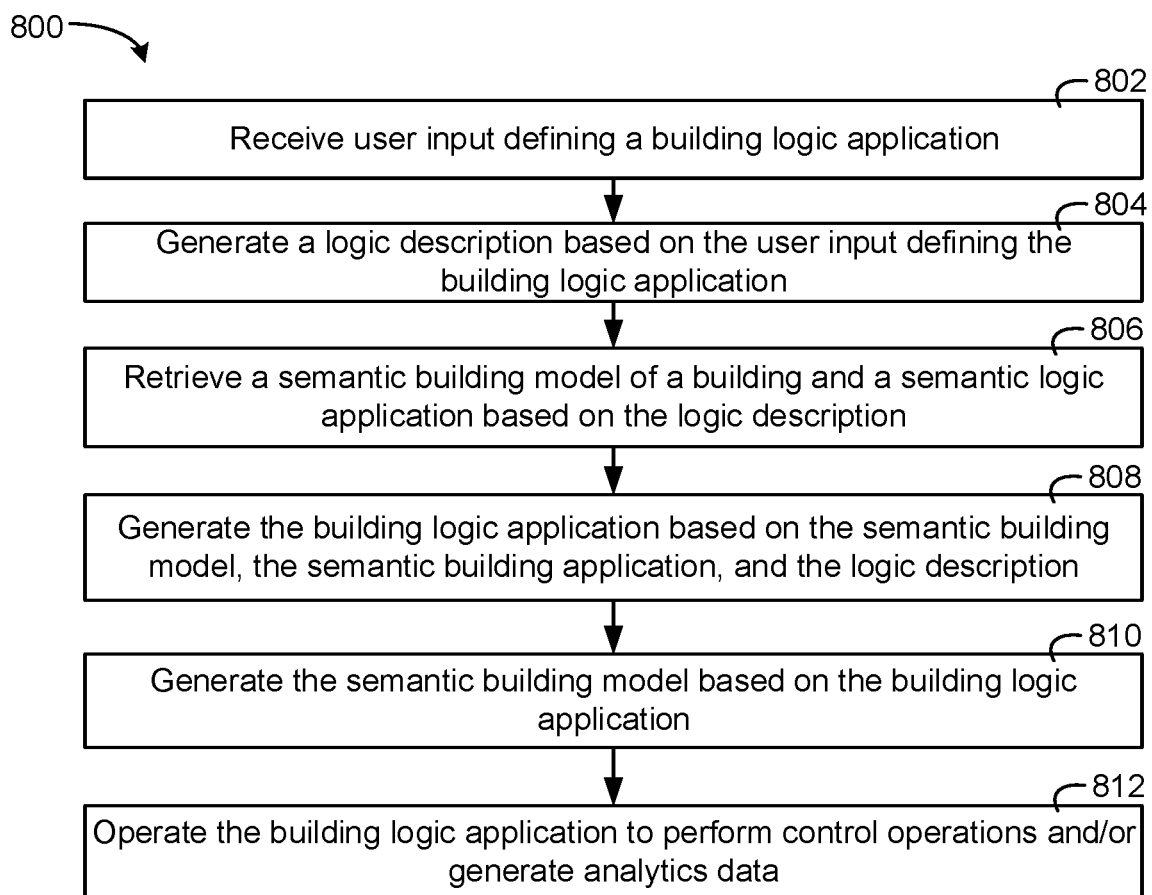
FIG. 8 is a flow diagram of a process of receiving input from a user device and generating custom building logic based on the input that can be performed by the custom logic generator of FIG. 3, according to an exemplary embodiment.

Referring now to FIG. 8, a process 800 for generating building logic based on text input providing by a user, according to an exemplary embodiment. In some embodiments, the custom logic generator 324 is configured to perform the process 800. In some embodiments, the custom logic generator 324 utilizes the semantic model database 318 and the models stored therein to perform the process 800. The processing circuit 308 and/or any other computing device described herein, can be configured to perform the process 800.

In step 802, the custom logic generator 324 receives user input defining a building logic application. The input can be the natural language input 709 and can be a text input defining the building logic application in a natural language. In some embodiments, the text input is based on spoken natural language spoken by a user. The input can be literal, e.g., "Turn off lights in Zone A when occupancy has not been detected for thirty minutes." As another example, the input can be, "Generate a fault if network communication is not received from a sensor for one day."

In step 804, the custom logic generator 324 generates logic inputs based on the user input. For example, the custom logic generator 324 can use various natural language processing rules to generate a logical description of the building logic application, e.g., the custom building logic inputs 700. The inputs 700 can describe the purpose of the logic, e.g., to perform control or to perform fault detection (e.g., the logic purpose 702), the conditions of the logic (e.g., the logic conditions), and/or the action to take upon the conditions being true (the logic action items 706).

In step 806, the custom logic generator 324 retrieves a semantic building model providing a semantic description of a building and a semantic logic application providing a semantic description of logic. The custom logic generator 324 can retrieve the semantic logic application from a set of other applications based on the logic inputs. For example, the custom logic generator 324 can analyze a semantic description of each of the semantic logic applications to select one logic application, the applications can be analyzed to determine a logic application appropriate for the inputs 700. For example, if the logic purpose is fault detection, the logic conditions are point comparison to a threshold, and the logic action items 706 is alarm generation, the custom logic generator 324 can analyze the semantic description of the applications to identify an application with nodes representing fault detection, point comparison to a threshold, and alarm generation respectively.

In step 808, the custom logic generator 324 generates the building logic application based on the retrieved building model and semantic logic application of the step 806. In some embodiments, the building logic application is generated by the custom logic generator 324 by creating a new version of the semantic logic application and causing the version to include ingested data from the building model and/or the logic description. For example, if the logic description identifies particular equipment that require the application, the custom logic generator 324 can identify the points for the particular equipment in the semantic building model and cause the building logic application to operate based on those points. Furthermore, for particular numerical inputs by the user, e.g., setpoint values, threshold values, etc., the custom logic generator 324 can cause the building logic application to include thresholds or operational points based on the logic description.

In step 810, the custom logic generator 324 can generate one or more updates to the semantic building model. The updates may be indications of the logic running on particular pieces of equipment (nodes in the semantic building model). The updates can be stored such that future logic implementations can be built on top of each other, e.g., one logic application generates an alarm point while another subsequent application operates equipment based on the alarm point. In step 812, the custom logic generator 324 causes the building logic application to perform control operations and/or generate analytics data according to the particular implementation of the building logic application, i.e., whether the logic application is an analytics application or a control application.

User Interface Generation Based on Semantic Models

Figure 9:
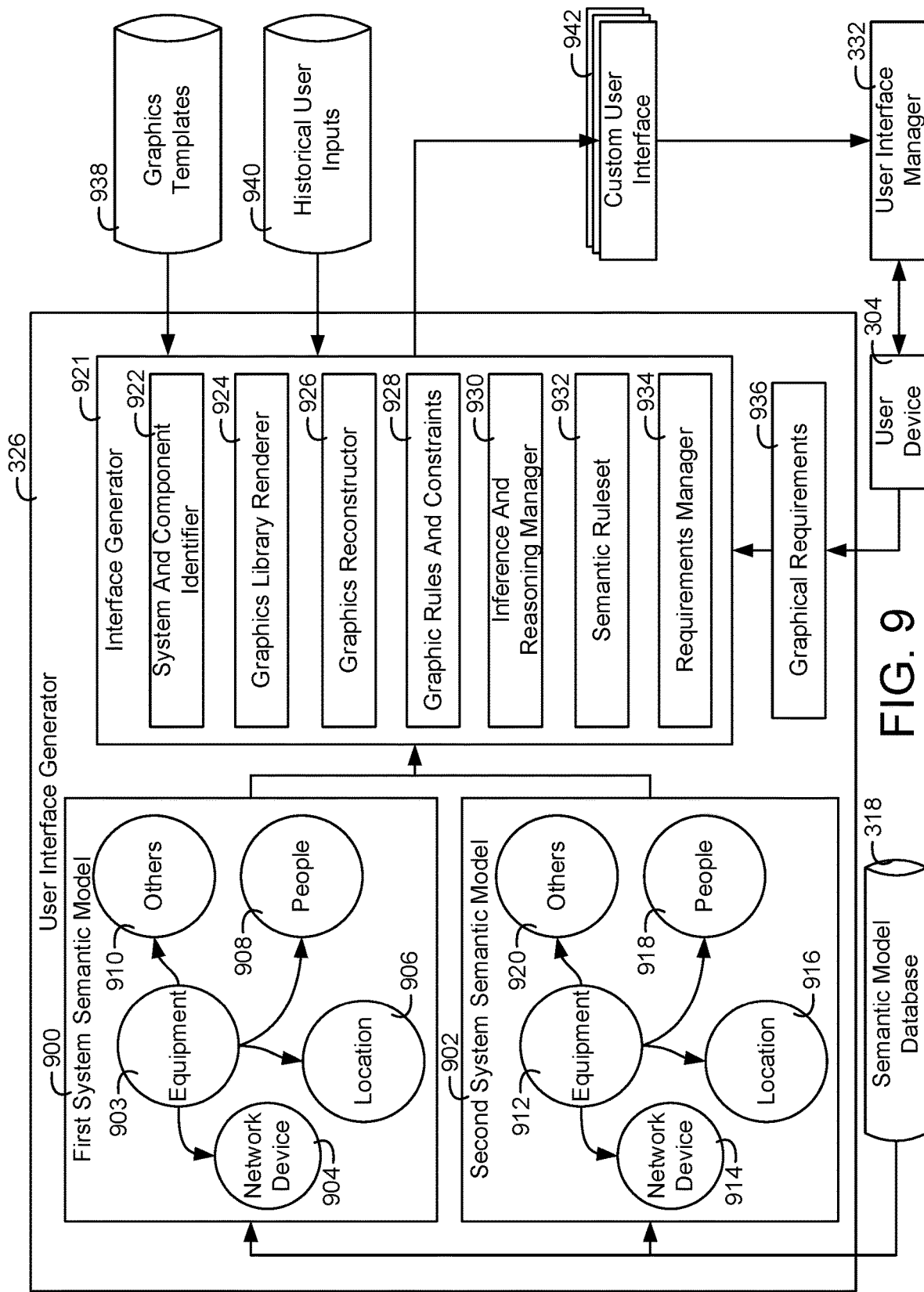
FIG. 9 is a block diagram of the user interface generator of FIG. 3 in greater detail configured to automatically generate custom graphical user interfaces based on one or more semantic building models, according to an exemplary embodiment.

Referring now to FIG. 9, the user interface generator 326 is shown in greater detail, according to an exemplary embodiment. The user interface generator 326 is configured to automatically generate high-fidelity graphics based on semantic models of building systems, the semantic models providing a semantic description of building components and the connections (relationships) between the building components. The user interface generator 326 receive first system semantic model 900 and second semantic model 902. The models 900 and 902 can be stored in the semantic model database 318 and retrieved from the user interface generator 326. The models 900 and/or 902 can be the same as, and/or similar to, the semantic building model 716 as described with reference to FIG. 7 and/or the semantic building model 420 as described with reference to FIGS. 4-5.

In some embodiments, the models 900 and/or 902 are combined within a single building model. For example, first system sematic model 900 may be a first portion of a semantic building model representing a first system of a building represented by the semantic building model. The second system semantic model 902 can be a second portion of the semantic building model representing a second system of the building. In some embodiments, the models 900 and 902 may represent different systems, e.g., the model 900 may represent a VAV and/or an AHU. The model 902 may represent a security camera. Furthermore, the model 900 could represent all heating and/or cooling systems of the building while the model 902 could represent all security systems of the building. The models 900 and/or 902 can represent chillers, AHUs, VAVs, security cameras, access control systems, fire sprinkler systems, and/or any other type of building system.

The model 900 may include nodes 902-910. The nodes 902-910 can be connected together through relationships semantically defining the relationships between the entities of the model 900. For example, equipment 903 may be a node providing an indication of the equipment that the model 900 represents, e.g., "AHU 10," "Zone 2 Camera," etc. The location 906 may represent the location of the equipment 903 and the relationships between the equipment 903 and the location 906 may indicate that the equipment 903 is located within the location 906.

The people 908 may represent people associated with the equipment 903, the relationship between the equipment 903 and the people 908 may provide an indication of the relationship. Types of relationships could be "owns," "provides service for," etc. In this regard, the relationships between the equipment 903 and the people 908 could provide an indication of "Security Camera A is serviced by Security Company Y." The network device 904 may provide an indication of the networking device of the equipment represented by model 900, e.g., a router and/or network switch used to provide communication to the equipment. Others 910 may provide indications of other information of the equipment 903, e.g., parameters of the equipment 903, control algorithms of the equipment 903, network addresses of the equipment 903, etc. The nodes 912-920 and the relationships there-between may be the same as, or similar to, the nodes 902-910 of the model 900.

The interface generator 921 is configured, in some embodiments, to generate a custom user interface 942 based on the models 900 and/or 902 (or any other semantic models). In some embodiments, the models 900 and/or 902 may indicate sensors and/or points and/or sensor data that is tied the custom user interface 942, e.g., indications of points in the templates used to generate the custom user interface 942 can be defined according to the points of the model 900 and/or the model 902.

The interface generator 921 is configured to receive, from the user device 304, graphical requirements 936 defining a user preferred graphical requirement of the custom user interface 942. The generator 921 includes a requirements manager 934 configured to receive the graphical requirements 936 and perform any translation of the graphical requirements 936 (e.g., natural language processing) necessary to implement the custom user interface 942 based on the graphical requirements 936. Examples of graphical requirements may be that the custom user interface 942 is an interface for a bank, a hospital, a commercial office building, etc. Such requirements 936 may be a non-specific description of the custom user interface 942 but may instead define a purpose of the custom user interface 942. For example, if the graphical requirements 936 could indicate that the purpose of the customer user interface 942 is for security monitoring, temperature control, tenant temperature control, etc. The graphical requirements 936 can also be specific requirements, e.g., the requirement may be that the custom user interface 942 include both security camera feeds and zone temperature data, that the custom user interface 942 only provide an indication of indoor security camera feeds, only outdoor security camera feeds, security camera feeds for a user defined set of building zones, etc.

In some embodiments, the graphical requirements 936 provide an indication of the purpose of the custom user interface 942. For example, the purpose may be fault detection diagnostics (FDD), equipment monitoring, and/or graphical visualization of the equipment. In this regard, one or multiple templates of the graphics templates 938 may each be associated with one of the purposes. The input may indicate FDD for a particular AHU, equipment monitoring of the particular AHU, and/or graphical visualization of the AHU. Although the same semantic model for the particular AHU can be used to generate the custom user interface 942, the templates may each provide a unique implementation for a particular type of user interface.

The interface generator 921 receives graphics templates 938. The graphics templates 938 may be equipment specific graphical components defining graphical interface elements describing the operation of particular equipment. For example, one template of the graphics templates 938 may provide an indication of a security camera feed component. Such a component can be applicable for any type of security camera in a building and therefore, the component can be applied to any camera of the building. Likewise, the templates 938 can define specific layouts of components. For example, a tenant user interface may indicate that zone temperature elements should be included along with a lobby camera feed in particular regions within a user interface. Similar layout constructions may exist for any hospitals, office buildings, etc. Therefore, the interface generator 921 is configured to select layout templates based on the graphical requirements 936 (e.g., if the graphical requirements 936 indicate a hospital, the interface generator 921 can retrieve a hospital template layout from the graphics templates 938). In some embodiments, the templates 938 are "master templates" where the templates can be instantiated for one or multiple different buildings and/or subsystems. Such "master templates" can reduce the time required to implement a user interface for a particular building and/or subsystem.

In some embodiments, the graphical requirements 936 may provide a site target indication. For example, the site target could be on the zone, floor, building, and/or city level. In this regard, a custom user interface 942 could be generated for different buildings according to the equipment of each specific building as defined by an associated semantic model for each building. The semantic models for the buildings can be stored by the semantic model database 318.

The user interface generator 326 can receive historical user inputs 940. The historical user inputs 940 can be user inputs defining definitions, modifications, and/or other feedback on the custom user interface 942 and/or any user input. For example, for a particular user interface building from various graphics templates 938, the user could provide an indication that the user interface "applies to all AHUs." In this regard, the interface generator 921 is configured to utilize the historical user inputs 940 to perform reasoning to generate the custom user interface 942.

The user interface generator 326 includes system and component identifier 922. The identifier 922 can be configured to identify which devices, equipment, and/or systems need to be used to generate the custom user interface 942. For example, based on the graphical requirements 936, the identifier 922 can be configured to determine what components are referenced. For example, if the graphical requirements 936 indicates that the custom user interface 942 is for a particular business application that requires zone temperature. The identifier 922 can be configured to search semantic model database 318 to identify systems and/or equipment that indicate zone temperature.

Interface generator 921 includes a graphics library renderer 924. The renderer 924 can be configured to select (or can receive an indication of a selection of) an appropriate graphics template 938 from the graphics templates 938 and render any necessary graphics library for the retrieved template. The library can include any necessary code and/or graphics data necessary for implementing the particular template or templates. In some embodiments, each template is linked to, or otherwise includes, a graphics library that the renderer 924 is configured to render.

Figure 13:
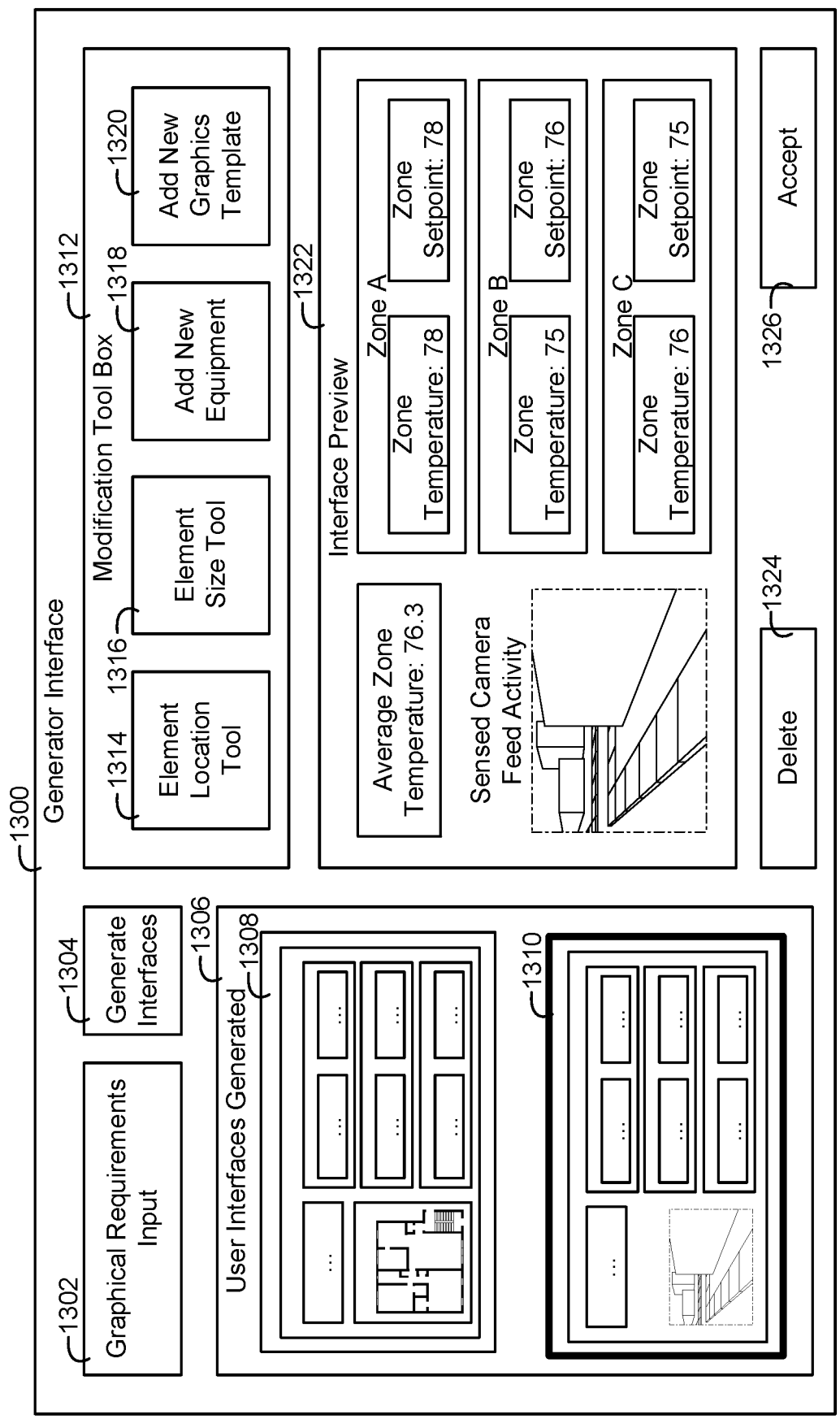
FIG. 13 is a user interface for selecting one of multiple generated user interfaces and making modifications to the user interfaces that can be generated by the user interface generator of FIG. 9, according to an exemplary embodiment.

Graphics reconstructor 926 is configured to generate the user interface 942. In some embodiments, the reconstructor 926 is configured to generate the user interface 942 based on the models 900 and/or 902. For example, based on a selected template from the graphics templates 938 and/or the associated graphics library rendered by the renderer 924, the reconstructor 926 is configured to generate the custom user interface 942. In some embodiments, the graphics templates can be predefined and stored in the graphics library. In some embodiments, a user may create one or multiple templates for user in generating the user interface 942. In some embodiments, the graphics reconstructor 926 can be configured to operate a software application for generating the user interface 942 (e.g., as illustrated by FIG. 13). In some embodiments, the first time the application is run (or the first time a particular user operates the application) the graphics reconstructor 926 can prompt the user for the templates. In some embodiments, the user may provide a visual indication of the templates by dragging and dropping elements, may provide a verbal description of the templates, and/or may provide file locations of the templates to be loaded by the graphics reconstructor 926. In some embodiment, there are a set of default graphics templates that can be utilized if no input is received from the user.

Graphics rules and constraints 928 may define a set of requirements for generating the custom user interface 942. The interface generator 921 is configured to generate the custom user interface 942 in compliance with the graphics rules and constraints 928. In some embodiments, the graphics rules and constraints 928 are predefined by a user (e.g., temperature setpoint for a zone should be generated based on temperature measurements of building zone temperature sensors of an environmental control system and not fire sensors in the same zone that may include temperature sensing equipment). Furthermore, the custom user interface 942 may include visual graphics, e.g., an AHU visual graphical representation feeding air into a VAV visual graphical representation. The graphic rules and constraints 928 can indicate that the graphics can only be connected according to like resources (which can be identified from the models 900 and/or 902). For example, the AHU and VAV can be connected since the AHU provides the resource air while the VAV receives the resource air, i.e., they both rely on the same resource. The resources can be any kind of resource, e.g., air water, steam, electricity, etc.

The interface generator 921 can include inference and reasoning manager 930 and semantic rulesets 932. The inference and reasoning manager 930 can be the same as and/or similar to the reasoners 424 as described with reference to FIG. 4 while the semantic rulesets 932 can the same as, or similar to, the rule engines 422 as described with reference to FIG. 4. The inference and reasoning manger 930 can be configured to perform semantic reasoning based on the models of the semantic model database 318 to select the models 900 and/or 902 based on the graphical requirements 936. The manager 930 can be configured to implement jcel, Pellet, Prova, RACER, RDF Sharp, and/or any other type of semantic reasoning. The interface generator 921 can perform semantic reasoning to select appropriate graphical templates 938 from the graphics templates 938 based on the graphical requirements 936. In some embodiments, the reasoning performed by the interface generator 921 with the inference and reasoning manager 930 and/or the semantic rulesets 932 is adapted overtime based on the historical user inputs 940. The semantic rulesets 932 can include one or more rules defining the generation of the interface 942 from the model 900, the model 902, and/or the graphical requirements 936.

The custom user interface 942 generated by the interface generator 921 can be provided by interface generator 921 to the user interface manager 332. The custom user interface 942 can be provided by the user interface manager 332 to the user device 304 to be displayed on a display of the user device 304. In some embodiments, user interface manager 332 ingests data into the custom user interface 942 collected from the building systems 302 by the building controller 330. In some embodiments, the data ingested into the custom user interface 942 are the results of applications generated by the building application manager 322 and/or the custom logic generator 324. Furthermore, in some embodiments, the interface generator 921 generates multiple user interfaces. The semantic reasoning performed by the interface generator 921 can generate multiple different custom user interfaces 942. In some embodiments, the generator 921 selects a predefined number of the user interfaces and provides them to the user interface manager 332 for review and selection by the user of the user device 304. For example, the interface generator 921 can assign a compliance metric indicating how closely the graphical requirements 936 are met by the generated interface. Any interfaces with a compliance metric above a predefined amount, or a predefined number of the interfaces with the highest compliance metric can be provided to the user for selection.

Figure 10:
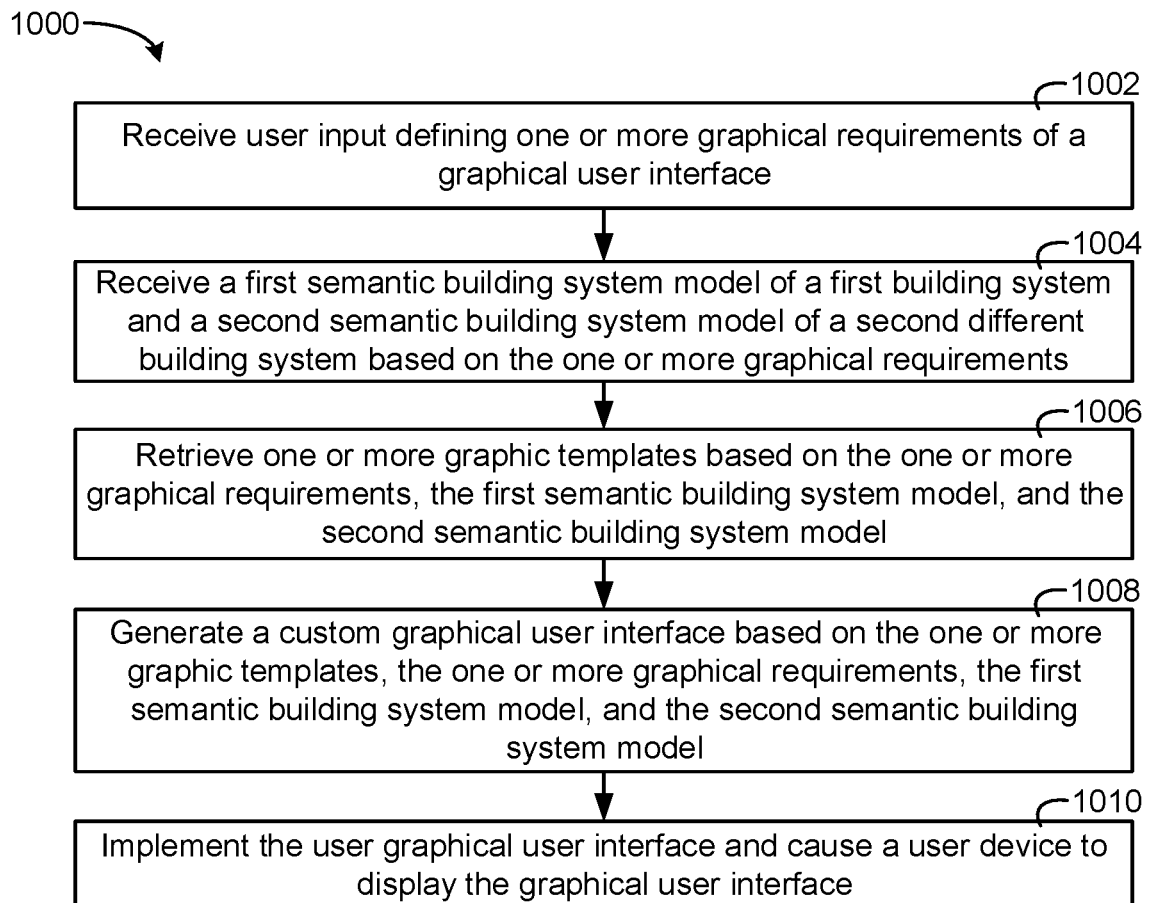
FIG. 10 is a flow diagram of a process of generating the custom graphical user interfaces based on the one or more semantic building models that can be performed by the user interface generator of FIG. 9, according to an exemplary embodiment.

Referring now to FIG. 10, a process 1000 of generating a custom graphical user interface based on semantic building system model is shown, according to an exemplary embodiment. In some embodiments, the user interface generator 326 is configured to perform the process 1000. In some embodiments, the user interface generator 326 utilizes the semantic model database 318 and the modes stored therein to perform the process 1000. The processing circuit 308 and/or any other computing device described herein, can be configured to perform the process 1000.

In step 1002, the user interface generator 326 receives user input defining one or more graphical requirements of the graphical user interface. In some embodiments, the interface generator 921 receives the graphical requirements 936 from the user device 304 in the form of a text input, a set of predefined selectable options, etc. The graphical requirements 936 may define the purpose of the custom graphical user interface, e.g., whether the interface will be used to perform fault analysis, building control, security monitoring, etc.

In step 1004, the user interface generator 326 retrieves a first semantic building system model of a first building system and a second semantic building system model of a second different building system based on the one or more graphical requirements. The models can be selected to fulfill the graphical requirements. For example, if the graphical requirements indicate that the custom user interface should provide an indication of lighting on particular floor, the user interface generator 326 can select a semantic building model of lighting systems for the particular floor.

In some embodiments, the models are the first system semantic model 900 and/or the second system semantic model 902. In some embodiments, any number of different models can be retrieved, e.g., one or multiple. Building the custom user interface based on multiple different building system models allows a custom user interface to be generated to provide a graphical interface for first systems, security systems, lighting systems, and/or HVAC systems integrated into one or multiple different user interfaces.

In step 1006, the user interface generator 326 retrieves one or more graphical templates based on the one or more graphical requirements and the first semantic building system model and the second semantic building system model. For example, the user interface generator 326 can analyze the graphical requirements 936 to identify that the user wishes to view camera feeds of a security system. The first system semantic model 902 may indicate various cameras of a building. In this regard, the user interface generator 326 can identify, based on the cameras, what camera templates of the graphics templates 938 would be applicable for the custom user interface 942. For example, the graphics templates 938 may include a first video feed template for PTZ cameras where the template includes elements (pan, tilt, and zoom) for controlling he camera and another element for viewing the camera feed of the PTZ cameras. A second template may exist for cameras which are static and do not move, i.e., they may only include the camera feed element and not the control elements.

In step 1008, the user interface generator 326 generates the custom graphical user interface based on the one or more graphic templates, the first semantic building system model, and the second semantic building system model. The user interface generator 326 can compile and instantiate the graphics templates according to the construction of the building systems semantically defined by the first and second semantic building models. In step 1010, the generated custom user interface can be implemented and a user device can display the graphical user interface.

Figure 11:
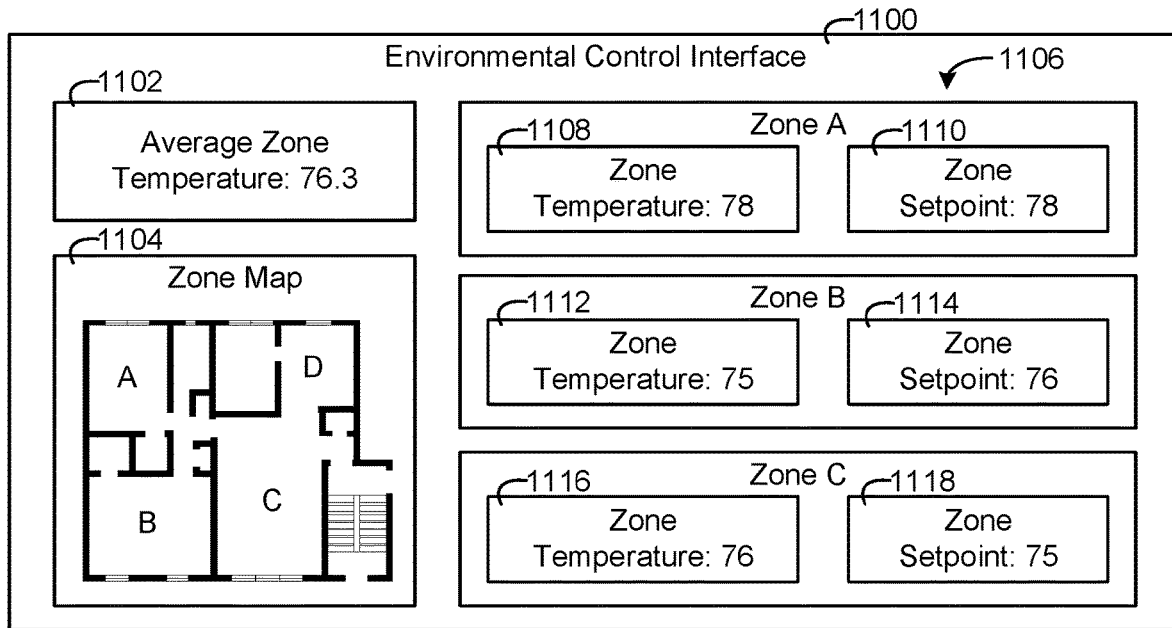
FIG. 11 is a user interface including environmental control components that can be generated by the user interface generator of FIG. 9, according to an exemplary embodiment.
Figure 12A:
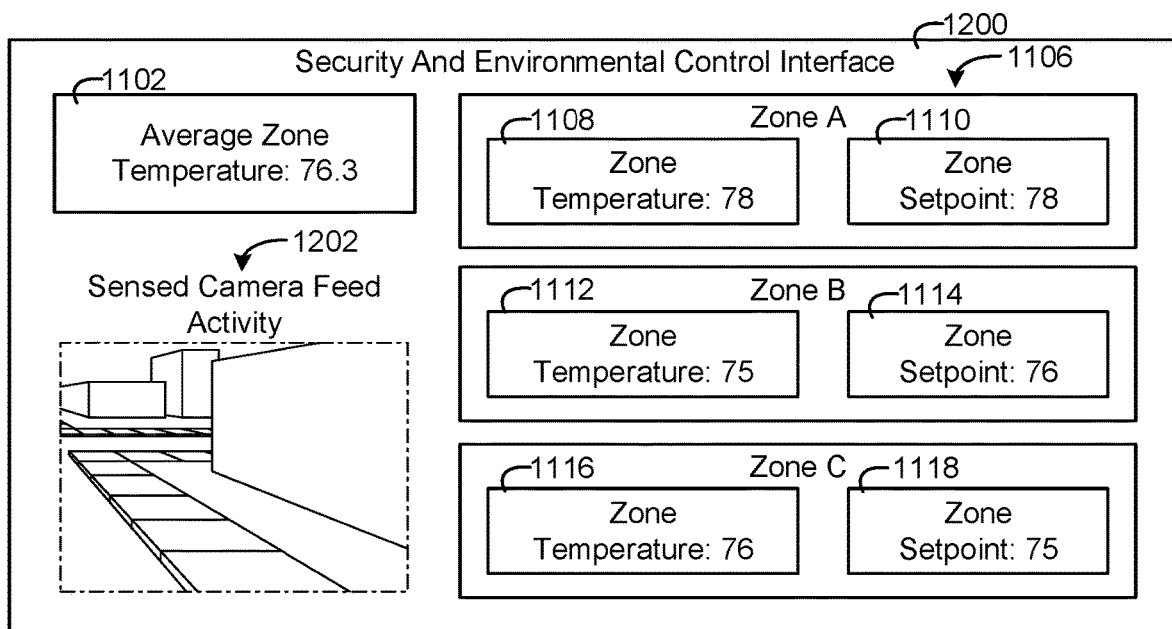
FIG. 12A is a user interface including security video feed components and some of the environmental control components of FIG. 11 that can be generated by the user interface generator of FIG. 9, according to an exemplary embodiment.

Referring now to FIGS. 11-12A, a user interface 1100 including environmental control elements 1106 and a security and environmental control interface 1200 including some of the same components as the interface 110 are shown, according to an exemplary embodiment. The user interface 1100 and/or the interface 1200 can be generated by the user interface generator 326 of FIG. 9, in some embodiments. The interface 1100 can be the custom user interface 942. The environmental control elements 1106 provide an indication of zone temperatures for three zones, Zones A, B, and C via elements 1108, 1112, and/or 1116. Furthermore, setpoints for each of the Zones A, B, and C are provided by the elements 1110, 1114, and 1118. The interface 1100 can provide the user with the ability to control the zone setpoints of multiple zones via a single user interface. Furthermore, the element 1102 can provide a user with an indication of an average zone temperature while the zone map 1104 can provide a user with an indication of a building map indicating where zones for which information is provided by the environmental control elements 1106 are located within the building.

The interface 1100 may be defined generically according to one or multiple different templates of the graphics templates 938. For example, in some embodiments, one graphics template of the graphics templates 938 may indicate a particular layout of other graphics templates for use in a control interface. For example, the templates can be hierarchical, i.e., one template relies upon other templates. For example, the control interface template can reference an average zone element template, an environmental control components template, and a zone map template, each defining the elements 1102, 1106, and 1104 respectively. Another template, e.g., a security and environmental control template, may rely on some of the same templates, and therefore, templates can be reused.

For example, security and environmental control interface 1200 may be defined on a security and environmental control template. The template can reference templates defining the elements 1106 and 1102 which may be the same as the template used to define the interface 1100. However, the security and environmental control template may further reference a template defining a security feed element 1202 which can provide a user with an active security feed where activity has been detected.

Figure 12B:
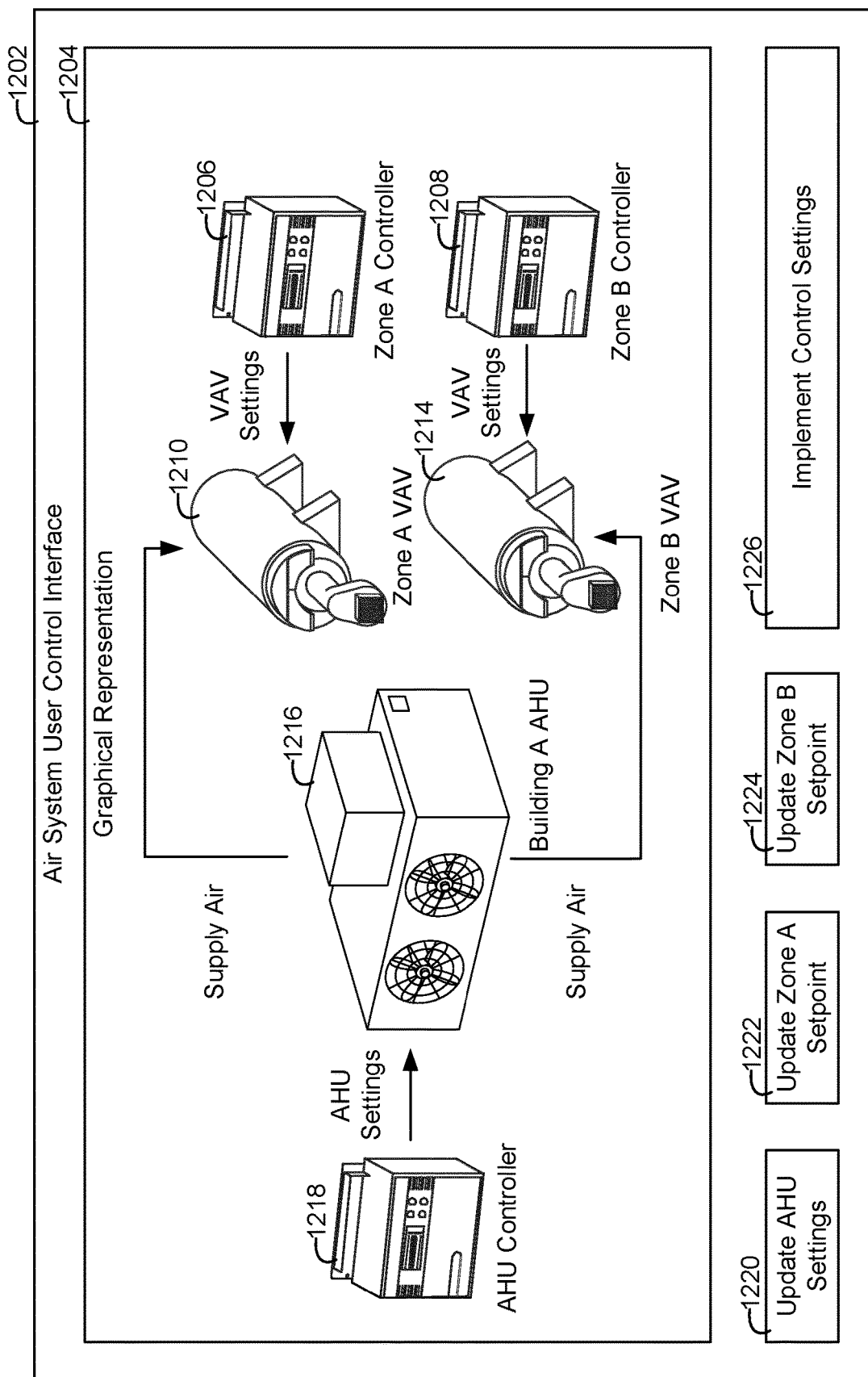
FIG. 12B is a user interface including graphic visualization of equipment of a building that can be generated by the user interface generator of FIG. 9 based on a particular semantic building model, according to an exemplary embodiment.

Referring now to FIG. 12B, an air system control interface 1202 is shown providing a graphical representation of VAVs, AHUs, and controllers of a building, according to an exemplary embodiment. The interface 1202 can include graphical representation 1204 and control elements, the update AHU settings element 1220, the update zone A setpoint element 1222, the update zone B setpoint element 1224, and the implement control settings element 1226. The user interface generator 326 can be configured to generate the interface 12B based on a semantic building model 1228 illustrated in FIG. 12C. In some embodiments, the user interface manager 332 is configured to implement the interface 1202 and cause the user device 304 to display the user interface 1202 in addition to receiving and/or implementing input received from the user device 304 via the user interface 1202.

The graphical representation 1204 can include multiple graphical elements. The graphical elements can be graphic templates for particular pieces of equipment. These graphic templates can be stored as part of the graphics templates 938. For example, there may be a particular "controller" graphical template used to generate the AHU controller element 1218, the zone A controller element 1206, and/or the zone B controller element 1208. Furthermore, an "AHU" graphical template can be used to implement the building A AHU element 1216. There may be a "VAV" template that can be used to implement the zone A VAV element 1210 and/or the zone B VAV element 1214.

In the interface 1202, the AHU controller element 1218 is shown providing control settings to the building A AHU element 1216 indicating to an end user that the AHU controller 1218 element is associated with a physical AHU controller configured to control a physical AHU associated with the building A AHU element 1216. Furthermore, the building A AHU 1216 is shown to provide supply air to the zone A VAV element 1210 and the zone B VAV element 1214 indicating that the physical AHU represented by the building A AHU element 1216 supplies air to physical VAVs represented by the zone A VAV element 1210 and the zone B VAV element 1214. Furthermore, the zone A controller element 1206 and the zone B controller element 1208 are shown providing settings to each of the VAV elements 1210 and 1214 to indicate that the physical VAVs represented by the elements 1210 and 1214 are controlled by physical controllers associated with the controller elements 1206 and 1208.

The elements 1220-1224 can be input elements, slider elements, dial elements, and/or any other element allowing a user to input one or more control settings (e.g., setpoint values, configuration values, etc.). The interface 1202 includes an update AHU settings element 1220. The update AHU settings element 1220 can allow a user to update the control settings that the physical AHU controller represented by the element 1218 uses to control the physical AHU represented by the element 1216. The elements 1222 and 1224 can allow a user to input setting values for the physical controllers represented by the elements 1206 and 1208 to control the physical VAVs represented by the elements 1210 and 1214. In response to a user interacting with the implement control settings element 1226, any inputs received via the elements 1220-1224 can be provided by the user interface manager 332 to the building controller 330. Interacting with the element 1226 can cause the building controller 330 to operate the building systems 302 based on the input settings.

Figure 12C:
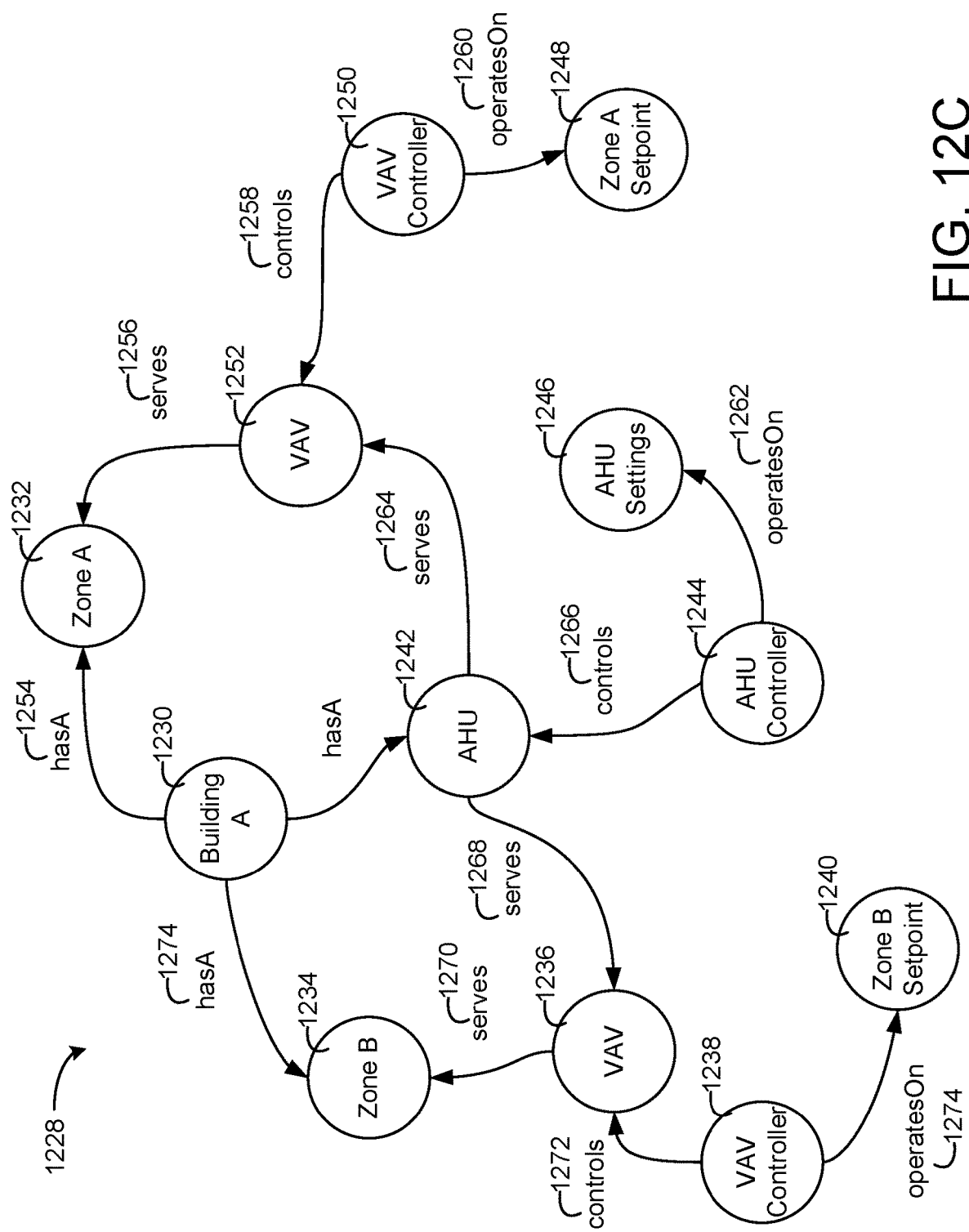
FIG. 12C is a block diagram of the particular semantic building model used to generate the user interface of FIG. 12B by the user interface generator of FIG. 9, according to an exemplary embodiment.

Referring now to FIG. 12C, the semantic building model 1228 is shown, according to an exemplary embodiment. The type and number of the graphical elements of the interface 1202 can be defined based on the nodes of the model 1228. The model 1228 is shown to include a building A node 1230 which is linked to a zone A node 1232 and a zone B node 1234. If the graphical requirements 936 provide an indication to generate a control interface for controlling VAVs of building A, the user interface generator 326 can parse the model 1228 to identify VAVs of the building A based on relationships hasA 1254 and hasA 1274 between the building A node 1230 and the zone A node 1232 and the zone B node 1234 and further based on the relationship between VAV node 1252 and the zone A node 1232, i.e., serves 1256, and further based on the relationship between the VAV node 1236 and the zone B node 1234, i.e., serves 1270.

Based on the identification of the VAV nodes 1236 and 1232, the user interface generator 326 can select a graphical template of a VAV for the VAV nodes 1236 and 1232 (e.g., the template used to generate the elements 1210 and 1214 of the interface 1202). Furthermore, the user interface generator 326 can identify what AHU is controlling the VAV nodes 1236 and 1252. The user interface generator 326 can identify the AHU by identify the relationships between the AHU node 1242 and the VAV nodes 1236 and 1252, i.e., serves 1268 and serves 1264. The user interface generator 326 can be configured to select an AHU graphical template to represent the AHU 1242 i.e., generate the element 1216 of the interface 1202.

Furthermore, the user interface generator 326 can select controller templates for each of the controllers responsible for controlling the physical VAVs represented by the VAV nodes 1236 and 1252 and the AHU represented by the AHU node 1242. The user interface generator 236 can identify the controllers based on the controller nodes and their respective relationships to the VAV and AHU nodes (nodes 1236, 1241, and 1252). More specifically, the user interface generator 326 can identify the relationship controls 1272 between a VAV controller node 1238 and the VAV node 1236. The user interface generator can identify the relationship controls 1266 between the AHU controller node 1244 and the AHU 1242. Furthermore, the user interface generator 326 can identify the relationship controls 1258 between VAV controller node 1250 and VAV node 1252. The identified relationships provides an indication of the controllers that the user interface generator 326 uses to generate the controller elements 1218, 1206, and 1208 of the interface 1202.

Furthermore, the control points which the user interface generator 326 provides within the interface 1202 may be settings of the controllers represented by the nodes 1240, 1246, and/or 1250. The user interface generator 326 can identify the nodes based on relationships between the nodes 1238, 1244, and/or 1250 and control points. For example, a relationship operatesOn 1274 provides an indication to the user interface generator 326 that the VAV controller represented by VAV node 1238 operates the VAV represented by the VAV node 1238 based on the setpoint defined by the zone B setpoint node 1240. Similar relationships 1262 and 1260 provide an indication of the settings nodes 1246 and 1248 that the controllers represented by the AHU controller node 1244 and the VAV controller node 1250 operate based on.

Referring now to FIG. 13, a generator interface 1300 for selecting one of multiple user interfaces generated by the user interface generator of FIG. 9 is shown, according to an exemplary embodiment. In some embodiments, the user interface manager 332 is configured to generate and manage the interface 1300. The interface 1300 may allow a user to review, accept, and/or otherwise modify the custom user interfaces 942 generated by the user interface generator 326 (e.g., by changing adjustable parameters generated by the generator 326). The interface 1300 includes an input element 1302 allowing the user to provide a definition of the graphical requirements 936. A user may type into the element 1302 to define the graphical requirements 936 and/or may be taken to another user interface to define the graphical requirements 936 in response to interacting with the graphical requirements input element 1302. In response to interacting with the generate interfaces element 1304, the interface generator 921 can generate the custom user interfaces 942 based on the graphical requirements 936. The generated user interfaces can be displayed within user interfaces generated element 1306 as interface 1308 and interface 1310.

If a user interacts with one of the interfaces (e.g., the interface 1310 in FIG. 13), an interface preview 1322 of the interface can be displayed by the generator interface 1300 allowing a user to review and modify the interface 1310. The generator interface 1300 includes a modification tool box 1312 including options for selecting tools to adjust the interface 1310. For example, element location tool 1314 may provide the user with the ability to reposition elements of the interface 1310 in response to interacting with the element location tool 1314. Similarly, the element size tool 1316 may provide the user with the ability to change the size of elements in response to an interaction with the element size tool 1316. The add new equipment element 1318 may provide the user with the ability to add graphical elements for new or different elements. The graphics template 1320 may allow a user to provide a new graphical template to the interface 1322 which can be automatically populated by the interface generator 921. Some or all of the modifications by the user can be fed back into the user interface generator 326 as the historical user inputs 940. If the user interacts with the accept button 1326 the interface 1310 can be generated while if the user interacts with the delete button 1324 the interface 1310 can be deleted and removed from consideration.

Building Semantic Model Searching

Figure 14:
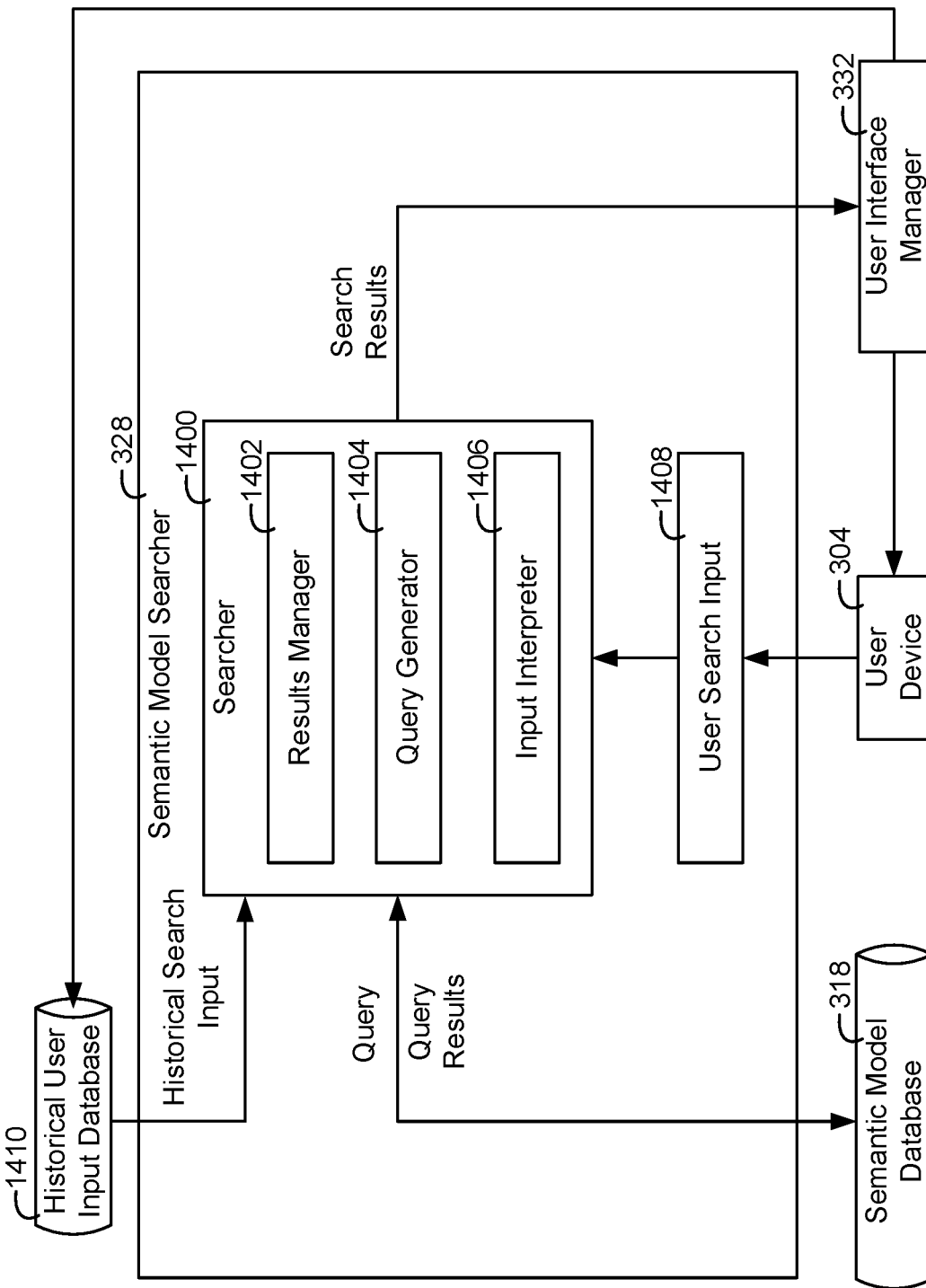
FIG. 14 is a block diagram of the semantic model searcher of the building semantic model system of FIG. 3 configured to receive a user search input and query semantic models to generate a search result, according to an exemplary embodiment.

Referring now to FIG. 14, the semantic model searcher 328 is shown in greater detail, according to an exemplary embodiment. The searcher 328 receives a user search input 1408 from the user device 304. The user search input 1408 can be a natural language text description of a system, device, component, control application, etc. that a user may input via their user device 304. The input 1408 can identify particular nodes (e.g., Building 1, VAV 10, etc.) of a semantic building model or can identify node types (e.g., Building, VAV, AHU, etc.). Furthermore, the input 1408 can identify particular relationship types (e.g., controls, is located in, etc.) The input 1408 can be in a form, or can be interpreted to be in a form, of a semantic triple. For example, "shown me VAVs of building 1" can be translated into the semantic triple "VAVs (subject) is located in (predicate) building 1 (object)." Such a semantic triple can be used to query the semantic model database 318 to identify VAV nodes of type VAV with an association link (is located in) to a particular node, the building 1. In some embodiments, quadruples, hierarchical form, and/or multiple graphs can be utilized in addition or, or instead of, a semantic triple.

The searcher 328 includes a query generator 1404 which is configured to receive the user search input 1408 and generate a query based on the user search input 1408. The query generator 1404 is configured to query the semantic model database 318 with the query and receive query results based the query. Based on the query results, the results manager 1402 generates search results and provides the search results to the user interface manager 332 for display on the user device 304.

Since the user search input 1408 may be in a natural language, for example, could be "Building 1," "Building 1 AHU," "Building 1 AHU Serving VAV," "Room temperatures of all the clean room served by single zone AHUs," etc., the searcher 1400 may include a translator. The searcher 1400 can include input interpreter 1406 configured to parse the user search input 1408 to generate a representation of the user search input 1408. In some embodiments, the representation is a semantic representation of the input 1408 in the form of one or more triples.

The searcher 1400 includes a query generator 1404. The query generator 1404 can be configured to construct a query of the input 1408 and/or based on the analysis of the input 1408 by the interpreter 1406. The query generator 1404 can be configured to generate a query such as a SPARQL query, a RDF query language based query, or any other query language for querying the semantic model database 318. The query generated by the query generator 1404 can be used by the searcher 1400 to query the semantic model database 318 and retrieve the query results. In some embodiments, rather than, or in addition to, generating the query, the searcher 1400 can be configured to use sample string matching to identify the results.

The results manager 1402 can be configured to generate the search results based on the query results. In some embodiments, the user device 304 displays a graph illustrating a particular semantic building model. The search results can cause the graph to zoom in on a portion of the semantic building model based on the query results. For example, if the building illustrates all subsystems of a building, security, fire, AHUs, etc. and the user search input 1408 indicates to display only the security subsystem, the search results can cause the graph to be zoomed into the portion of the graph specified by the user.

The searcher 1400 receives historical user search input from the historical user input database 1410. The searcher 1400 can be configured to utilize the historical search input to generate the query and/or generate the search results. The searcher 1400 can be configured to implement various models, e.g., total weighted least squares, clustering algorithms, neural networks, and/or any other machine learning algorithm that trains a learning model. The searcher 1400 can be configured to update weights and/or tuning parameters of the learning model over time based on the historical user input database 1410. In this regard, the results and/or queries generated by the searcher 1400 can be improved over time as feedback is collected from a user and the preferences of a user are identified via the historical search input.

Figure 15:
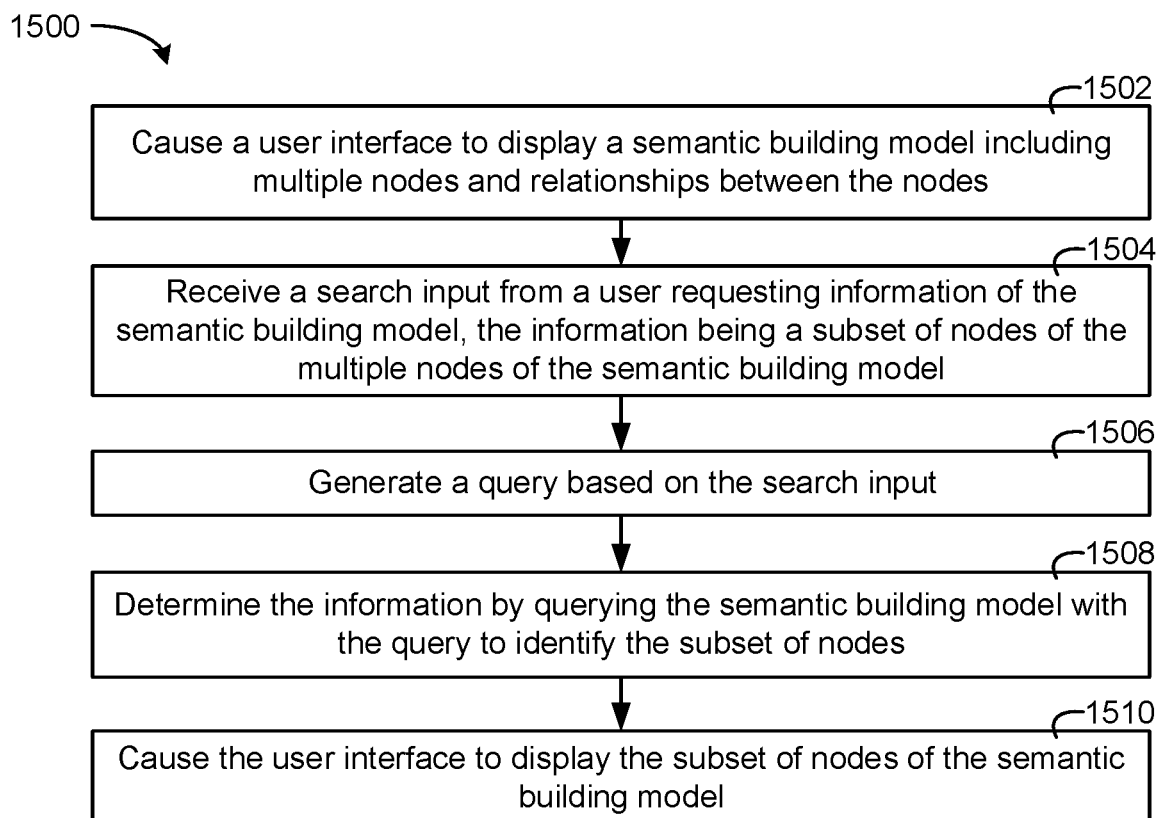
FIG. 15 is a flow diagram of a process of receiving a user search input and querying the semantic models to generate the search result that can be performed by the semantic model searcher of FIG. 3, according to an exemplary embodiment.

Referring now to FIG. 15 a process 1500 of receiving a user search input and querying the semantic models to generate the search result that can be performed by the semantic model searcher 328 is shown, according to an exemplary embodiment. In some embodiments, the semantic model searcher 328 is configured to perform the process 1500. In some embodiments, the semantic model searcher 328 utilizes the semantic model database 318 and the models stored therein to perform the process 1500. The processing circuit 308 and/or any other computing device described herein, can be configured to perform the process 1500.

In step 1502, the semantic model searcher 328 can cause a user interface to display a semantic building model including multiple nodes and relationship between the nodes. In some embodiments, the semantic model searcher 328 causes a user interface of the user device 304 to display the semantic model. The model displayed by the semantic model searcher 328 can be the model 900 and/or the model 902 as described with reference to FIG. 9. In some embodiments, the model displayed by the semantic model searcher 328 is the model 716 as discussed with reference to FIG. 7 and/or the semantic building model 420 as described with reference to FIG. 4.

In step 1504, the semantic model searcher 328 can receive search input from a user. The search input may request information of the semantic building model where the information is a subset of nodes o the multiple nodes of the semantic building mode. For example, the input could be received from the user device 304. In some embodiments, the input could be "Show me equipment in Building 1." If the semantic building model displayed in the step 1502 includes indications of equipment for multiple buildings, the search may be for nodes representing equipment of only a particular building.

In step 1506, based on the input of the step 1504, the semantic model searcher 328 generates a query. The query can be a query appropriate for the semantic building model. In step 1508, the semantic model searcher 328 generates the search result by querying the semantic building model. The result of the query can be an indication of the subset of nodes of the semantic building model. In step 1510, based on the result of the query, the semantic model searcher 328 can cause the user interface to display the subset of nodes.

Figure 16:
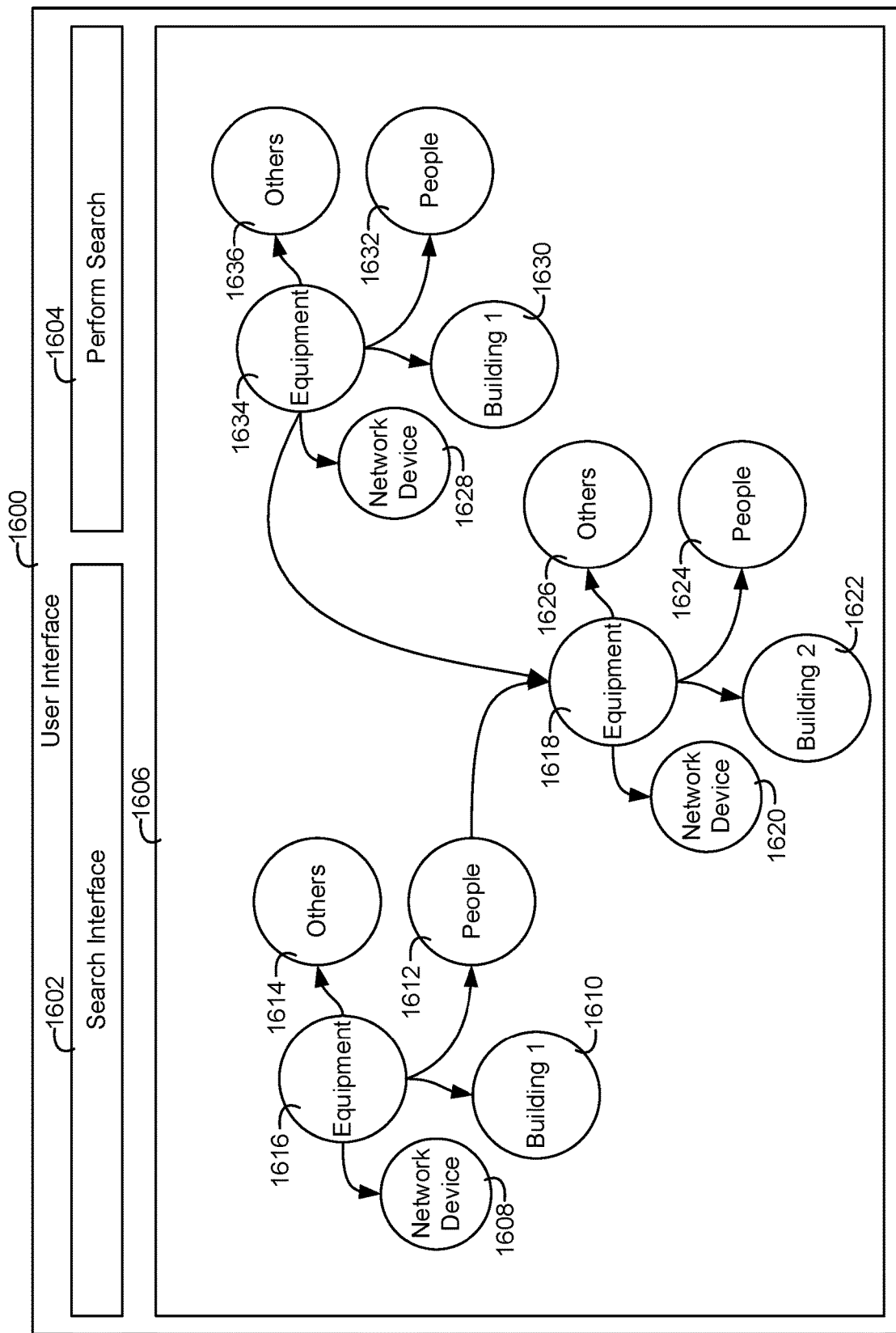
FIG. 16 is a user interface generated by the user interface manager of the building semantic model system of FIG. 3 allowing a user to search through a semantic building model, according to an exemplary embodiment.

Referring now to FIG. 16, a user interface 1600 is shown displaying search results, according to an exemplary embodiment. The user interface 1600 can be generated by the sematic model searcher 328 and/or the user interface manager 332. In some embodiments, the user device 304 causes a user interface to display the user interface 1600 and/or receive input from the user via the user interface 1600. The interface 1600 can include a search interface 1602. The user can type a search query into the search interface 1602. The input into the search interface 1602 can be the user search input 1408 that the semantic model searcher 328 is configured to use to generate search results. In response to interacting with perform search element 1604, the semantic model searcher 328 is configured to generate the search results and/or is configured can cause the search result to be displayed in interface 1606, in some embodiments. The results from searching (e.g., an individual node or combinations of nodes) can be easily dragged from the interface 1600 to another interface for defining (generating and/or executing) specific application (e.g., a building control application for controlling building equipment). For example, a user could search from temperature sensors in a room serving "VAV 1." Based on the temperatures sensors identified in the search, the user could provide the temperature sensors as input to a particular control algorithm for controlling a particular "VAV 1." In some embodiments, the user may select one or multiple nodes of a search result, one or multiple relationships of the search result, and/or a subgraph of the search result (e.g., a selection of both nodes and relationships that are associated with each other). The selection of the user can be used by an application, e.g., the building controller 330 to generate a control or analytics application. For example, the selection may indicate one or more systems to target the deployment an energy optimization algorithm.

The interface 1606 includes multiple different nodes 1608-1636. The nodes can represent particular pieces of equipment (e.g., the equipment node 1616, the equipment 1634, and/or the equipment 1618). The nodes can further represent network devices used for communication by various pieces of equipment (e.g., the nodes 1608, 1628, and/or 1622). The nodes can represent people associated with the equipment (e.g., the nodes 1612, 1632, and/or 1624). The nodes can further represent the location of the equipment (e.g., the nodes 1610, 1630, and/or 1622). Furthermore, the nodes can represent any other characteristic of the equipment, as presented by nodes 1614, 1636, and/or 1626.

The nodes may include relationships between the other nodes to provide an indication of association. For example, the nodes 1608-1614 may all be related to the equipment node 1616 and thus a relationship between each of the nodes 1608-1614 and the equipment node 1616 may exist. Similarly, the nodes 1628-1632 and 1636 can be related to the equipment 1634 by a relationship. Similarly, the nodes 1620-1626 can be related to the node 1618 by relationships. In some embodiments, the nodes can be related to multiple other nodes. For example, people 1612 can have an association with two pieces of equipment, the equipment node 1616 and the equipment 1618 and thus two separate relationships may exist.

Figure 17:
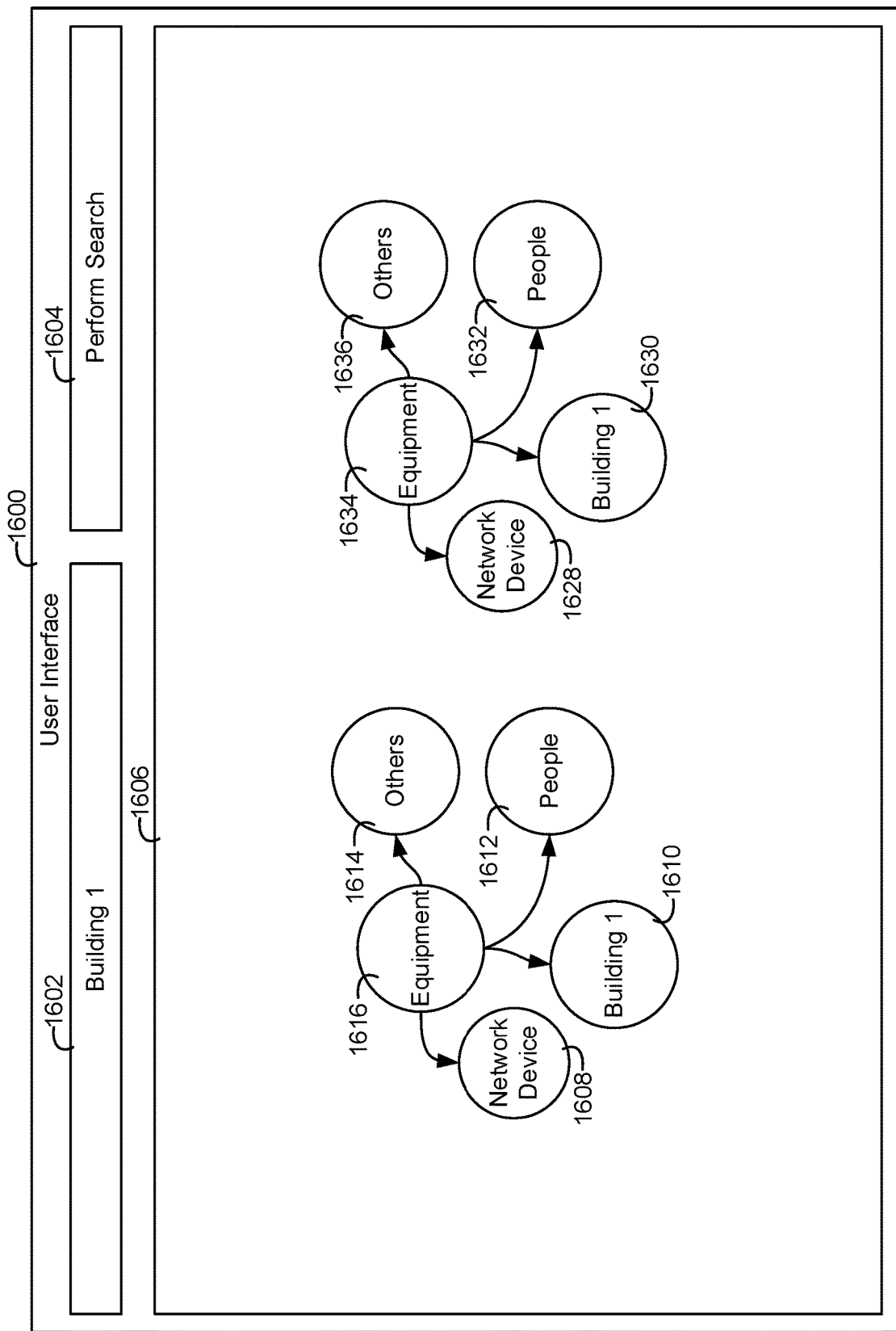
FIG. 17 is the user interface of FIG. 13 where a user searches for information of a particular building, according to an exemplary embodiment.

Referring now to FIG. 17 the user interface 1600 is shown where a search has been entered, according to an exemplary embodiment. The search interface 1602 includes a user search "Building 1." The search may indicate that a user wishes to view information of a particular building, i.e., a particular node referenced by "Building 1". The semantic model searcher 328 can generate a search result reducing the information of FIG. 16. The nodes 1608-1616 and 1628-1636 are either the Building 1 (nodes 1610 and 1630) or are nodes of a particular node with a direct relationship to the Building 1.

Figure 18:
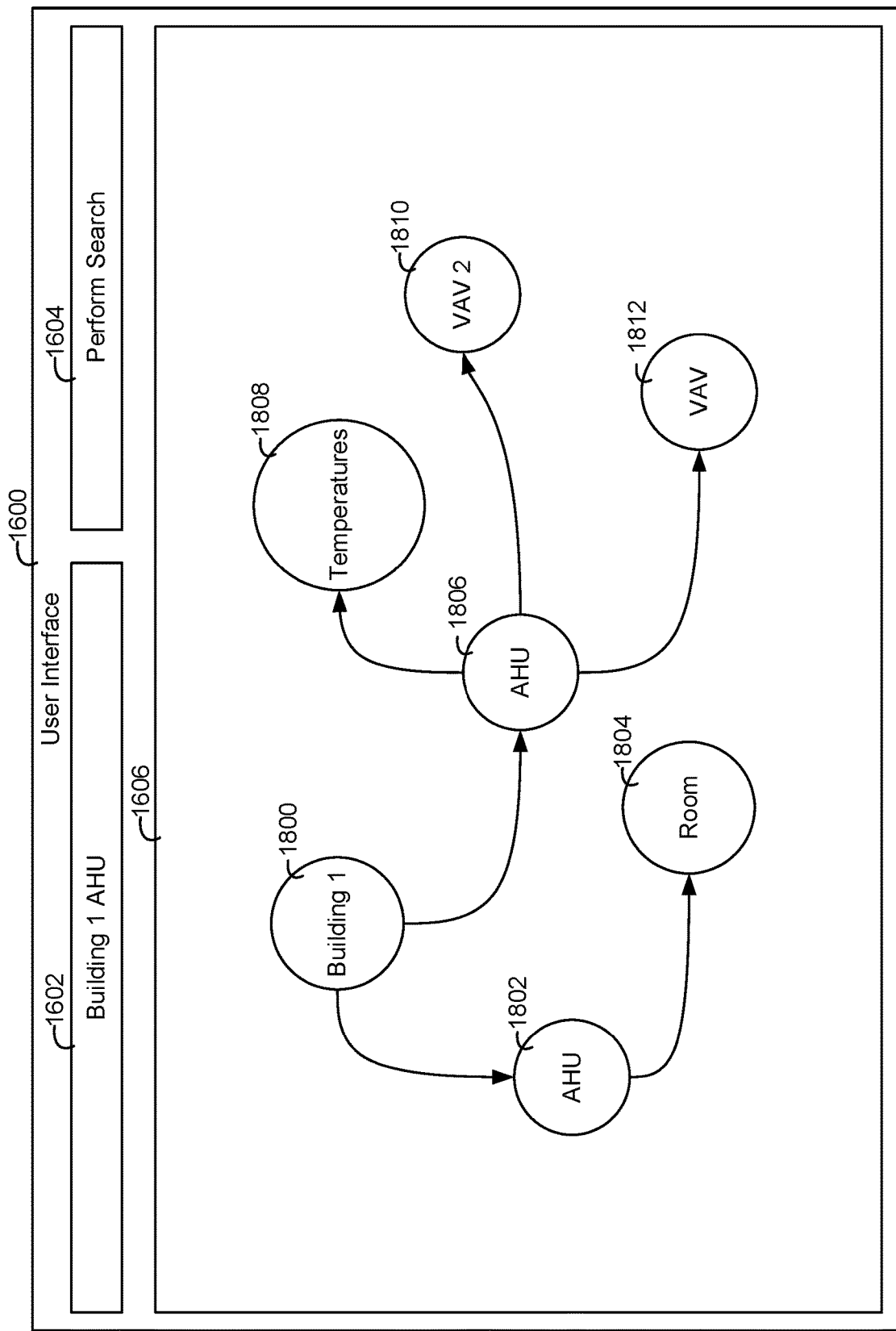
FIG. 18 is the user interface of FIG. 13 where a user searches for information of a particular building component within a particular building, according to an exemplary embodiment.

Referring now to FIG. 18, the user interface 1600 is shown where another exemplary search has been entered by a user, according to an exemplary embodiment. In FIG. 18, the search interface 1602 includes input provided by a user indicating "Building 1 AHU." The semantic model searcher 328 can identify any AHU (any node of type AHU) that is directly linked to the Building 1 (to a particular node representing the Building 1). For example, AHU node 1802 and AHU node 1806 have a direct relationship to node 1800 representing the Building 1. Furthermore, direct related nodes of AHU node 1802 and 1806, i.e., room node 1804 indicating the room which the AHU node 1802 serves, temperatures node 1808 indicating temperatures related to AHU node 1802, and VAVs associated with AHU node 1806, i.e., nodes 1810 and 1812 are displayed as search results in the interface 1606.

Figure 19:
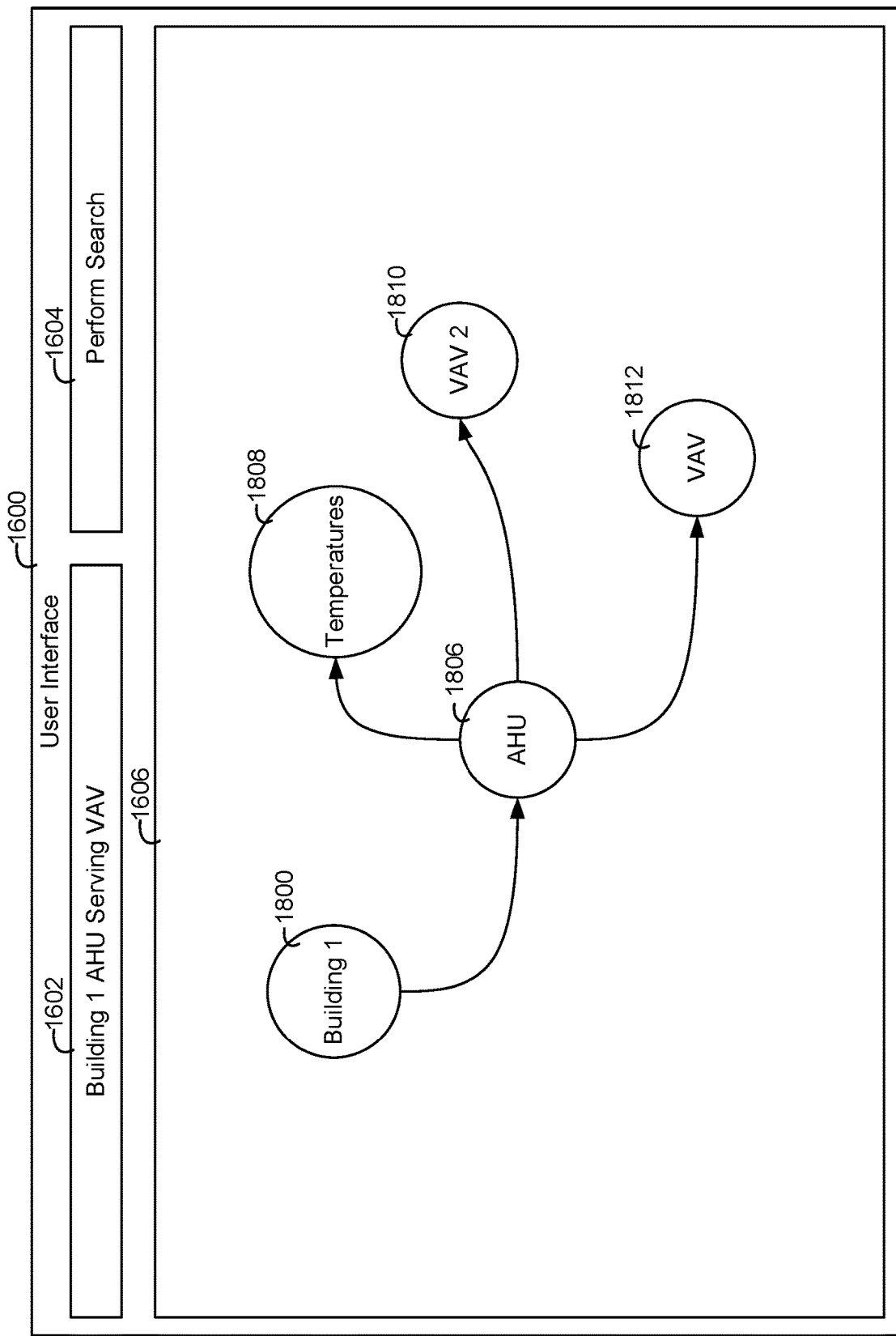
FIG. 19 is the user interface of FIG. 13 where a user searches for information of particular building components associated with other building components located within a particular building, according to an exemplary embodiment.

Referring now to FIG. 19, the user interface 1600 is shown where the nodes of the interface 1600 are narrowed based on a user search according to an exemplary embodiment. In FIG. 19, the search interface 1602 includes a user search, "Building 1 AHU serving VAV." This may indicate to display any AHU node (any node of type AHU) in the Building 1 (that include a particular location relationship type to the Building 1) that provides air to a VAV (e.g., the node of type AHU has a relationship to a node of type VAV). The semantic model searcher 328 can identify direct links between AHUs and the Building 1 narrowing down the result to the AHU node 1806 and AHU node 1802. Furthermore, the semantic model searcher 328 can further parse the resulting nodes 1806 and 1802 to determine which, if any, serve VAVs. Since the AHU node 1806 serves VAV nodes 1812 and 1810, the semantic model searcher 328 can display only the AHU node 1806 and any nodes directly linked to the AHU node 1806, i.e., the node 1800 and the nodes 1808-1812.

Figure 20:
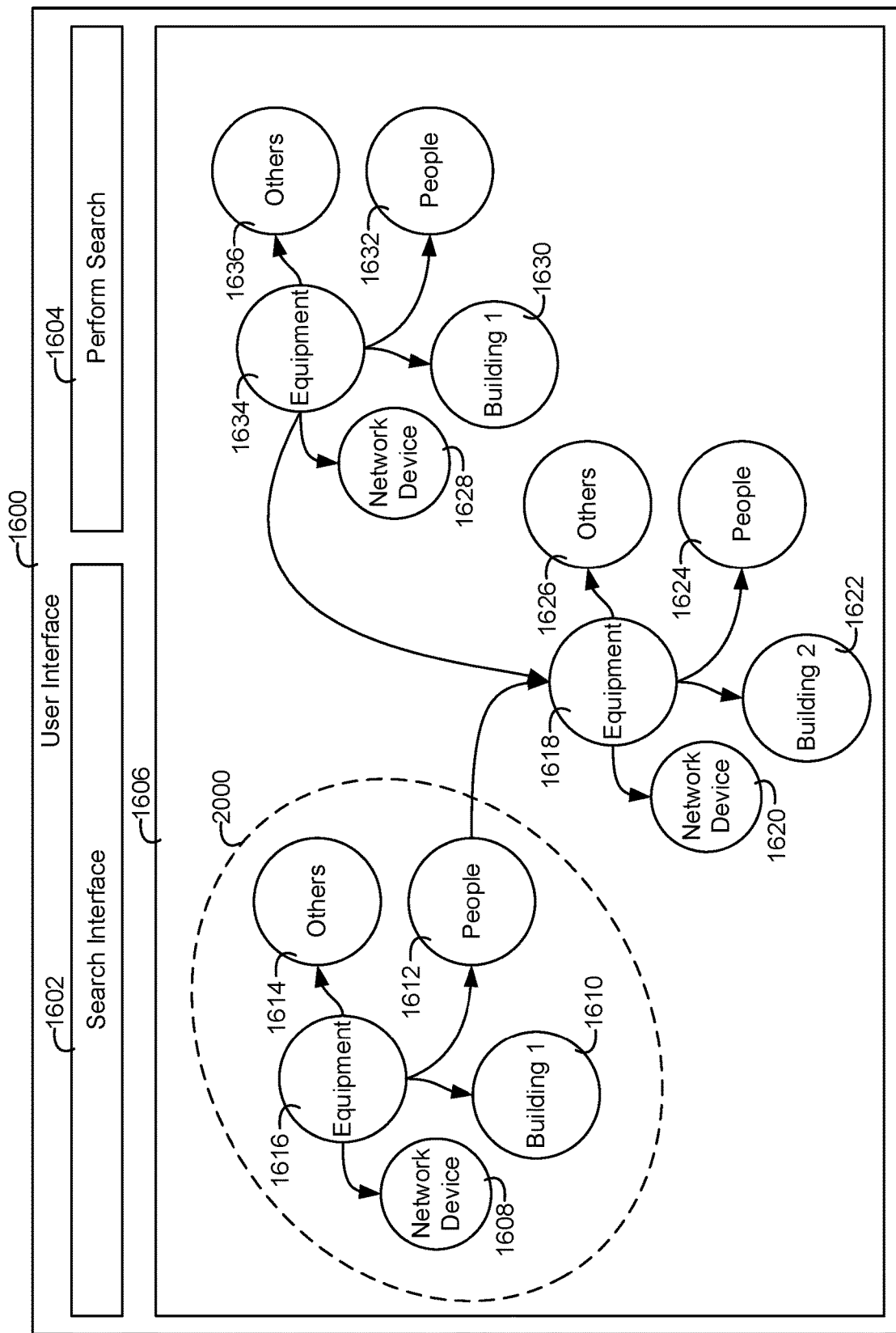
FIG. 20 is the user interface of FIG. 13 where the user provides a graphical input to filter information of the semantic building model where the results or selection can be dragged and dropped into a graphically defined building application, according to an exemplary embodiment.
Figure 21:
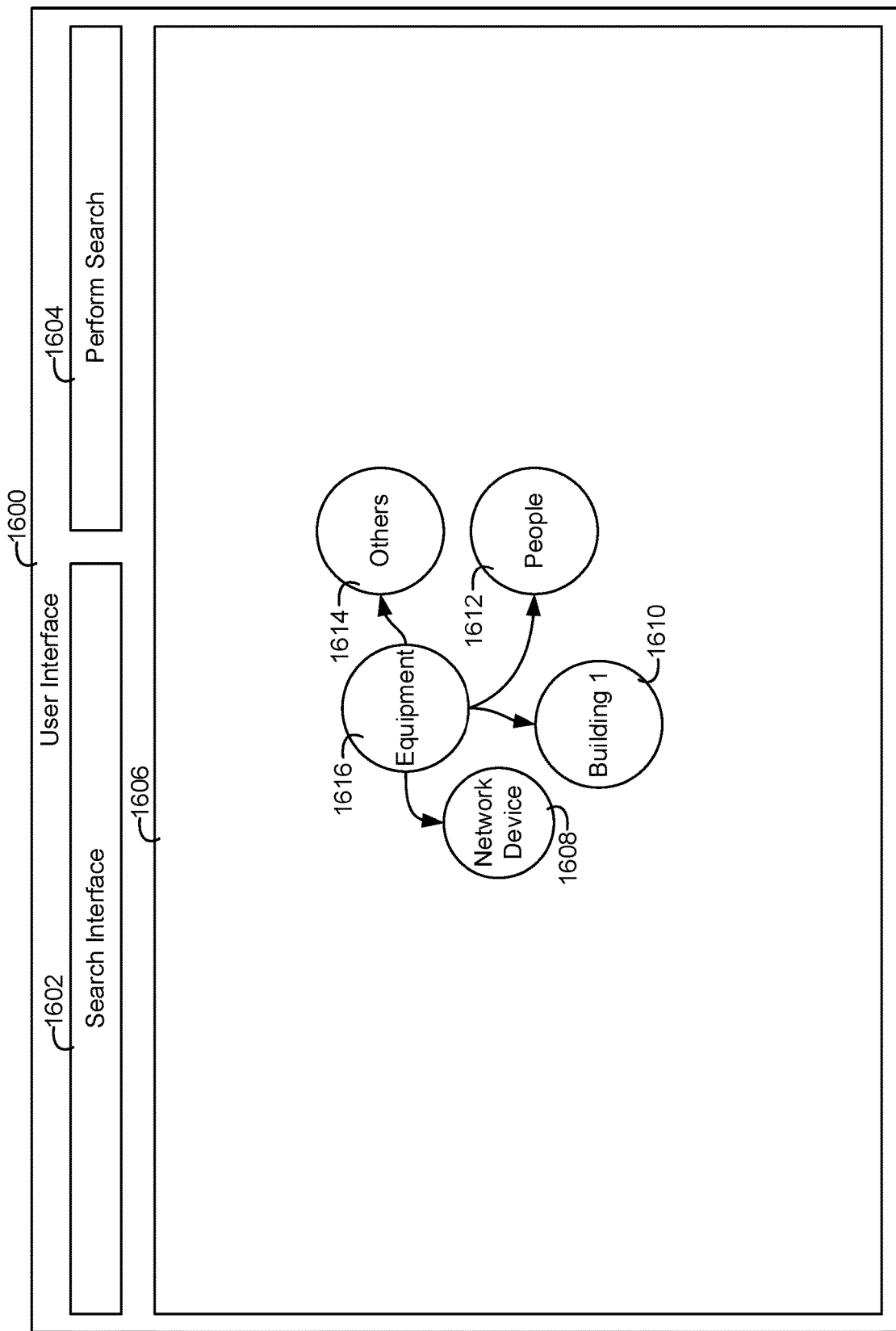
FIG. 21 is the user interface of FIG. 13 where a filtering result of the graphical input of FIG. 17 is displayed to the user, according to an exemplary embodiment.

Referring now to FIGS. 20-21, a graphical search input 200 to the user interface 1600 is shown, according to an exemplary embodiment. The graphical search input 2000 can be drawn by a user via a touch screen. The input 2000 can be a freeform drawn forming a shape. In some embodiments, the input 2000 is a circle or oval. Any node of the nodes 1608-1636 that are within the input 2000 (or are at least a predefined amount of the graphical representation of the nodes 1608-1636 are within the input 2000) can be selected as a search input. The semantic model searcher 328 can display only the nodes within the input 2000 and remove any other node falling outside the input 2000 as shown in the FIG. 21. In some embodiments, the selection of the nodes and/or relationships via the input 200 can be used to generate a control application. For example, the another user interface may provide a system to graphically define control algorithms, the control algorithms can be defined by the user selecting (either individually or via an input similar to the input 200) to generate the control algorithms. For example, the selected node, relationships, or graph portions of the graph of interface 1600 can be selected, dragged, and dropped into a control application definition interface allowing for a control application to be graphically defined.

Figure 22:
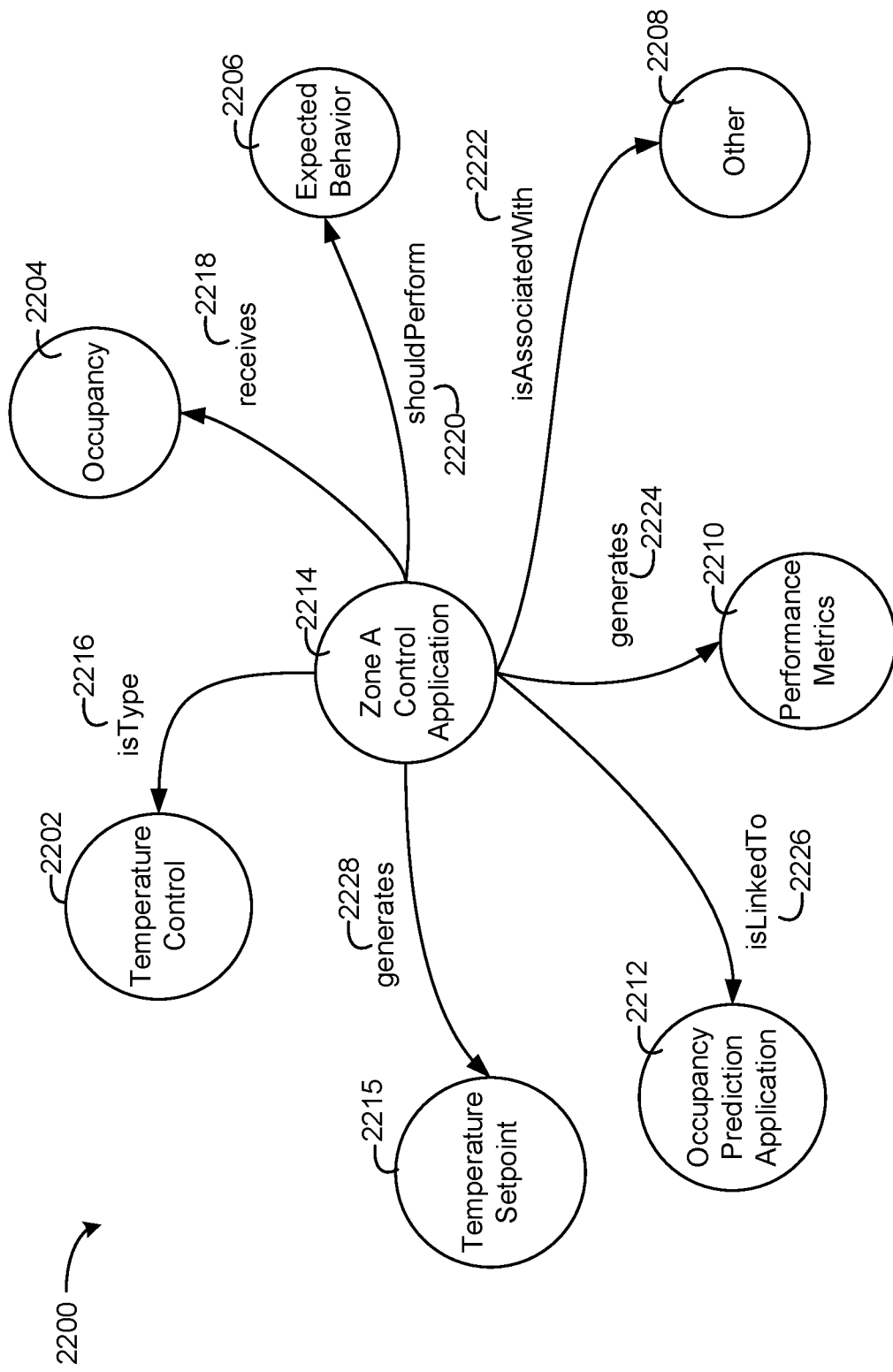
FIG. 22 is a semantic model of a building application, according to an exemplary embodiment.

Referring now to FIG. 22, a semantic building application 2200 is shown, according to an exemplary embodiment. The semantic building application 2200 can be the semantic building application discussed with reference to FIGS. 3-21 and the semantic managers 320 can be configured to utilize the application 2200 to perform each of their respective operations. The application 2200 can be defined according to an ontology defining possible node types and/or relationship types. The application 2200 includes nodes 2202-2214 and relationships 2216-2228. The application 2200 can define a particular temperature control application, "Zone A Control Application," represented by node 2214. The type of the application 2200 can be defined by node 2202, "Temperature Control." The application 2214 can be defined as the type "Temperature Control" via relationship 2216, "isType."

The application node 2214 can be linked to inputs and outputs, i.e., temperature setpoint node 2215 can be an output generated by the application node 2214. For this reason, a relationship 2228 "generates" can link the application node 2214 to the temperature setpoint node 2215. The input can be occupancy node 2204. The application node 2214 can be an application including multiple operations for determine a temperature setpoint (node 2215) based on an occupancy level (node 2204). The application node 2214 can be linked to the input via the "receives" relationship 2218.

The relationship 2226, "isLinkedTo" can define a relationship between the application node 2214 and another application, i.e., the occupancy prediction application indicated by node 2212. This relationship between the applications can indicate that the output of the application node 2212 is used as an input to the application node 2214 (e.g., the occupancy node 2204). The application 2200 further includes an expected behavior node 2206 which can define one or more criteria for performance metrics node 2210 to comply with for the application node 2214 to be operating properly. The application node 2214 can be related to the behavior node 2206 via the "shouldPerform" relationship 2220. The application node 2214 can be related to the metrics node 2210 via the "generates" relationship 2224 which can indicate that the application node 2214 operates to generate performance metrics defined by the node 2210.

Figure 23:
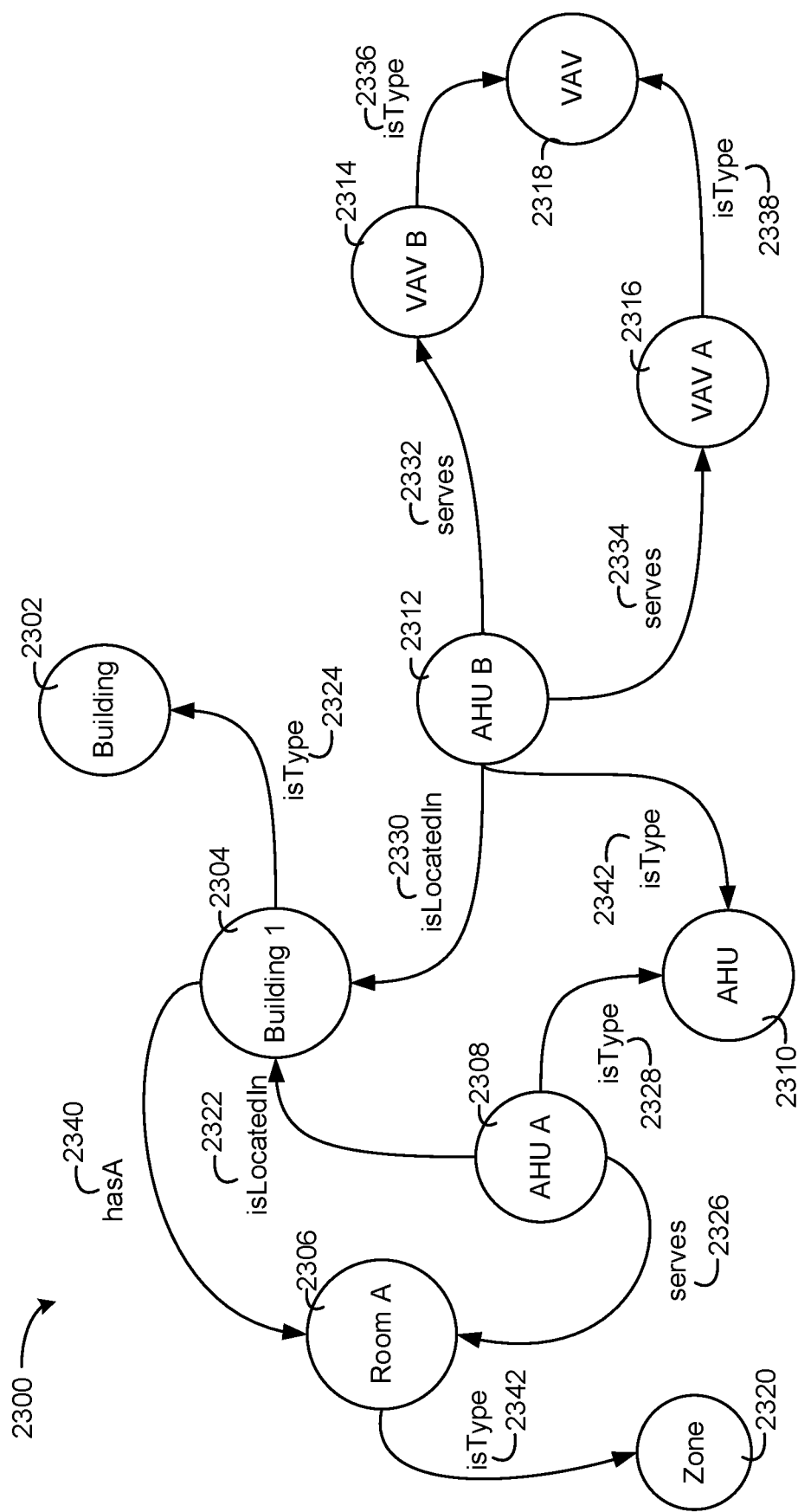
FIG. 23 is a semantic model of a building and building equipment, according to an exemplary embodiment.

Referring now to FIG. 23, a semantic model 2300 of a building and building equipment, according to an exemplary embodiment. The semantic building model 2300 can be the semantic building model discussed with reference to FIGS. 3-21 and the semantic managers 320 can be configured to utilize the model 2300 to perform each of their respective operations. The model 2300 can be defined according to an ontology defining possible node types and/or relationships. The model 2300 includes nodes 2302-2320 and relationships 2322-2344. The model 2300 can define a particular building and air equipment, i.e., AHUs and VAVs that serve the building.

The model 2300 includes a "Building 1" node 2304 defining a particular building. The node 2304 can be of type "Building" as defined by node 2302 and the relationship 2324, "isType" between the node 2304 and the node 2302. The node 2304 can include a particular space, "Room A" node 2306. The node 2304 can be linked to the node 2306 via the relationship 2340, "hasA." The "Room A" node 2306 can be of a particular type as defined by the relationship 2342, "isType," and the node 2320, "zone."

Node 2308 defines an AHU, "AHU A," which is located in the "Building 1" as defined by the relationship 2322, "isLocatedIn," between the node 2308 and the node 2304. The purpose of the AHU defined by the node 2308 can be to serve a particular area, the "Room A" as defined by the relationship 2326, "servers," between the node 2308 and the node 2306. The type of the "AHU A" can be defined via the node 2310, "AHU," and the relationship 2328, "isType." Similarly, another AHU, "AHU B," defined by the node 2312 can be of type AHU based on the relationship 2342, "isType." The "AHU B" can be located within the "Building 1" which can be defined based on the relationship 2330, "isLocatedIn," between the node 2312 and the node 2304.

The "AHU B" can serve (provide air to) to different VAVs, "VAV A" and "VAV B" defined by node 2316 and node 2314 and the relationship 2332 and the relationship 2334 between the node 2312 and the node 2314 and the node 2316 respectively. Both of the VAVs can be of type "VAV" as defined by the relationship 2336, "isType" between the node 2314 and the node 2318 and the relationship "2338, "isType," between the node 2316 and the node 2318.

Data Preparation

Referring generally to FIGS. 24-31, a building system with data preparation for artificial intelligence (AI) is shown, according to various exemplary embodiments. In a building, raw building data is collected by building systems. However, this raw data may be unreliable in training artificial intelligence (AI) learning systems since the raw data may include inaccuracies or may otherwise be corrupt. Inaccurate or corrupt raw data can be the result of faults or issues pertaining to the equipment that collects and/or generates the building data. These faults or issues can be the result of temporal faults, configuration faults, measurement uncertainty, commissioning, and/or frequency domain faults.

If the building data that is corrupt or otherwise unreliable, the building data can be cleansed, flagged, enhanced, and/or otherwise improved by the building system, data from a building management system (BMS) could be provided to (e.g., sold to), and utilized by, an AI platform. Cleansed data and/or flagged data can provide the AI platform a higher number of reliable dimensions for AI models and learning systems to consider, improving the performance of the AI. AI can determine models of greater complexity by analyzing trends in reliable building data.

Cleansed data utilized in an AI platform can allow the AI platform to perform analysis for control and operational applications. For example, applications such as energy management to control the energy usage of a building and/or campus can utilize the determinations of the AI platform. Furthermore, a building system can provide reports and/or predictions for a building in the form of a performance report. A performance reporting application can, in some cases, rely on determinations made by the AI platform. Furthermore, the building system may utilize a fault detection diagnostics (FDD) system. With cleansed and/or flagged building data, the AI platform can be implemented to perform FDD for the building. Some applications can be configured to generate building equipment and/or system alarms, the applications can leverage the learning of the AI platform to generate the alarms. Furthermore, the AI platform can improve maintenance applications for performing and/or scheduling maintenance on equipment and/or employee productivity to save salary on salary budgets and/or maintenance truck rolls.

Temporal Faults

Data collected by building equipment may have temporal faults, specifically when the collected data is in the form of a timeseries (e.g., a data structure including data values and time values for each data value). Temporal faults can be a fault associated with the time values or otherwise the time-based nature of the timeseries. For example, raw building data can include gaps in data timeseries, i.e., data from the timeseries may be missing. Furthermore, raw building data can become stuck, e.g., a single measurement may span multiple points in time over a time period in a data timeseries. Raw building data may have unrealistic values that are not physically possible. Furthermore, raw building data may have unrealistic rates of change that are not physically possible. Raw building data may have excessive quantization, e.g., values of a data timeseries constrained to an unrealistic discrete interval, in some cases. Also, raw building data may have timestamp errors and predicting when a data sample was collected may be difficult.

Configuration Faults

In some cases, the unreliable data is the result of equipment configuration. In this regard, the settings of equipment and/or relationships between equipment may cause the data collected and/or generated by the equipment to be unreliable for the AI platform. In some cases, raw building data can be improperly tagged, e.g., a data point for a temperature sensor may be improperly tagged as a humidity measurement. Raw building data can be associated with building systems or building structures improperly, e.g., temperature measurements of a sensor within a Zone A may mistakenly be associated with a Zone B. Furthermore, Change On Value (COV) measurement schemes may be improperly configured for equipment with inappropriate trigger levels, e.g., important data may not be measured when important changes occur if those changes are below/above the trigger level.

Measurement Uncertainty

In some cases, there may be uncertainty in the measurements of building equipment. This uncertainty may make the data collected by building equipment unusable or otherwise poor, for the AI platform. Measurements of a sensor may have an uncertainty, e.g., a temperature measured in a chiller well may have an inappropriate level due to self-heating of a circuit. In some cases, if multiple data points are utilized to calculate another data point, the uncertainties of the data points in the calculation can be compounded.

Commissioning

In some cases, the unreliability of the data of the equipment is linked to improper commissioning. For example, sensors may be improperly calibrated, leading to poor measurements. In other cases, sensors may be inappropriately located, leading to poor measurements.

Frequency Domain Faults

Furthermore, in some cases, equipment data errors may be the result of transients. For example, data collected by building equipment may only be reliable in a steady state. Transients during a startup or shutdown phase of equipment of an equipment system may result in the equipment being unreliable. The equipment may include hardware circuit filters and/or digital filters. These filters can handling high frequency noise in measurements. However, the filters may be configured with inappropriate parameters and/or filter types. Some equipment may not include filters at all.

In some embodiments, the building semantic model system 306 can be configured to prepare data for the AI platforms. For example, the building semantic model system 306 can be configured to generate building applications (e.g., the dynamic semantic building application 416) and/or custom logic (e.g., the custom building logic 744) to perform data preparation (e.g., data flagging, reliability timeseries generation, data cleansing, etc.). For example, the application 416 and/or the logic 744 can be configured to cleanse data and/or flag data before an AI platform consumes and operates on the data.

For example, the building application manager 322 can be configured to generate the dynamic semantic building application 416 based on the static semantic building application 400, where the static semantic building application 400 defines a particular data cleansing algorithm (e.g., remove data outliers, correct data timestamp errors, etc.). The dynamic semantic building application 416 can be a particular instance of the data cleansing algorithm (applied for and/or applied by a particular piece of building equipment) and the data which the application 416 generates can be provided to the AI platform.

For example, the static semantic building application 400 can define a particular uncertainty calculation for thermostat temperature measurements. In this regard, the building application manager 322 can identify thermostat targets via the semantic building model 420 that the uncertainty calculation algorithm can be deployed and generate the dynamic semantic building application 416 to generate the uncertainty for each thermostat temperature measurement. The result of the operation by the dynamic semantic building application 416 (e.g., as performed by the building controller 330) can be provided to the AI platform.

Furthermore, the logic 744 can further perform data preparation for the AI platform. For example, a user may identify that a particular temperature of a zone causes the AI platform to perform AI learning improperly if the temperature deviates significantly from a particular temperature range (resulting from equipment in the zone operating improperly). The user can generate the natural language input 709 to be, "generate an AI processing flag if the temperature of Zone B goes outside of an operating range of 60 degrees Fahrenheit to 80 degrees Fahrenheit." The custom logic generator 324 can generate the custom building logic 744 to generate the flag and data provided to the AI platform can be analyzed by the logic 744 and flagged by the logic 744 as appropriate. The result of the preparation by the custom logic 744, which can be performed by the building controller 330, can be provided to the AI platform by the building controller 330.

Furthermore, in some embodiments, the semantic models generated, managed, and/or otherwise maintained by the building semantic model system 306 can be utilized in the data preparation and/or by the AI platform itself. For example, the semantic building models semantically describing a building that the system 306 stores can be utilized by the systems described with reference to FIGS. 24-31.

Figure 24:
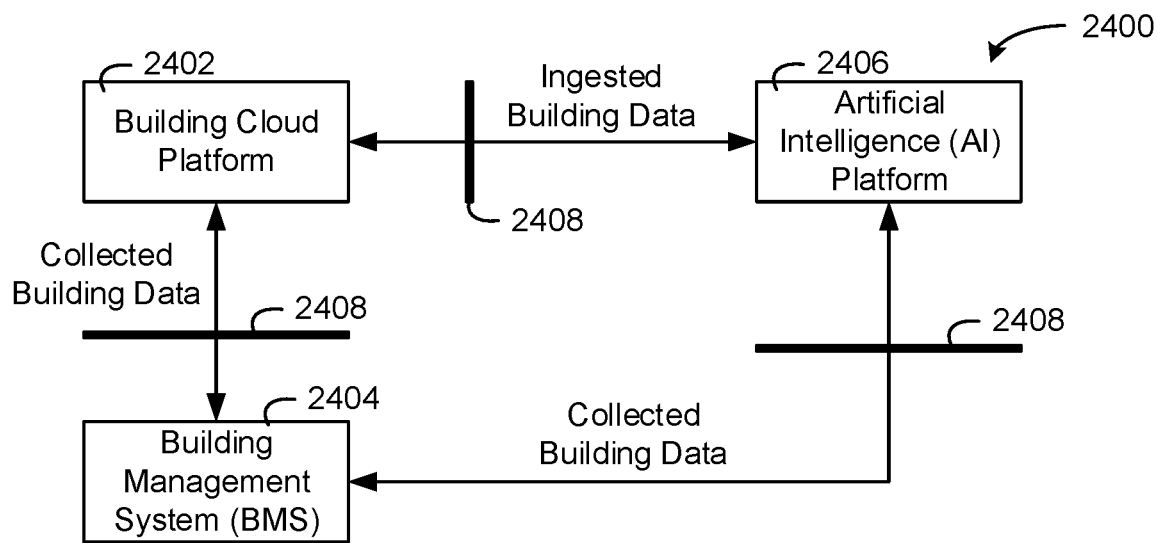
FIG. 24 is a block diagram of a system including a building management system (BMS) and a building cloud platform that provides collected building data and ingested building data to an artificial intelligence (AI) platform, according to an exemplary embodiment.

Referring now to FIG. 24, a system 2400 for a building including a building platform 2402, a building management system 2404, and an artificial intelligence (AI) platform 2406 is shown, according to an exemplary embodiment. The system 2400 is shown to communicate collected data and ingested data via a network 2408. In some embodiments, the network 2408 communicatively couples the devices, systems, and servers of the system 2400. In some embodiments, the network 2408 is at least one of and/or a combination of a Wi-Fi network, a wired Ethernet network, a Zigbee network, a Bluetooth network, and/or any other wireless network. The network 2408 may be a local area network and/or a wide area network (e.g., the Internet, a building WAN, etc.) and may use a variety of communications protocols (e.g., BACnet, IP, LON, etc.). The network 2408 may include routers, modems, and/or network switches. The network 2408 may be a combination of wired and wireless networks.

The BMS 2404 can include various controllers and can be configured to operate building subsystems, and/or equipment (e.g., the equipment as described with reference to FIGS. 1-2). The BMS 2404 can collect and/or generate building data. The building data can be measured conditions, e.g., zone temperature, zone humidity, zone air quality, environmental conditions measured for equipment (e.g., equipment circuit board temperature, heating well temperature, valve position sensor data, etc.) and/or can include operational data (e.g., control command logs, setpoints, settings, etc.). The data can, in some embodiments, be timeseries data including both data values (e.g., measurements, recorded values, etc.) and a timestamp (e.g., a date and/or time value, a sequence number, etc.). The BMS is configured to provide the collected building data to the building cloud platform 2402 and/or the AI platform 2406 via the network 2408, in some embodiments.

The building cloud platform 2402 can be configured to collect the building data and generate ingested building data based on the collected data received from the BMS 2404 via the network 2408. In some embodiments, the building cloud platform 2402 can ingest and store the collected building data based on an ontology. For example, various building models and/or ontology structures may define how building equipment is associated with other equipment, zones, buildings, cities, etc. Furthermore, actuators and/or sensors of the equipment can include similar limitations. Various contextual information (e.g., equipment age, equipment type, manufacture, location, calibration date, etc.) and/or the ontology can be applied to the collected building data to generate the ingested building data. The building cloud platform 2402 is configured to communicate the ingested building data to the AI platform 2406 via the network 2408, in some embodiments.

The AI platform 2406 is configured to receive the ingested building data and/or the collected building data via the network 2408 from the building cloud platform 2402 and/or the BMS 2404, in some embodiments. The AI platform 2406 is configured to generate and/or train various AI models based on the ingested building data and/or the collected building data. The models can be supervised, unsupervised, and/or supervised-unsupervised hybrid models. The AI models can include, Artificial Neural Networks (ANNs) (e.g., Convolutional Neural Networks (CNNs), Recurrent Neural Networks (RNN), CNN-RNN hybrid networks, Feedforward Neural Networks (FNNs), Long Short-Term Memory (LSTM) ANNs etc.).

Furthermore, the AI models can include Multivariate Gaussian Models (MVGs), Decision Trees, Support Vector Machines (SVMs), Logistic Regressions, etc. In some embodiments, a higher number of data points (e.g., dimensions) can lead to more accurate and/or models that can produce higher levels of results. In this regard, the data cleansing and/or enhancing techniques as described with reference to FIGS. 24-31 can be utilized to improve the collected building data and/or the ingested building data used by the AI platform 2406.

Figure 25:
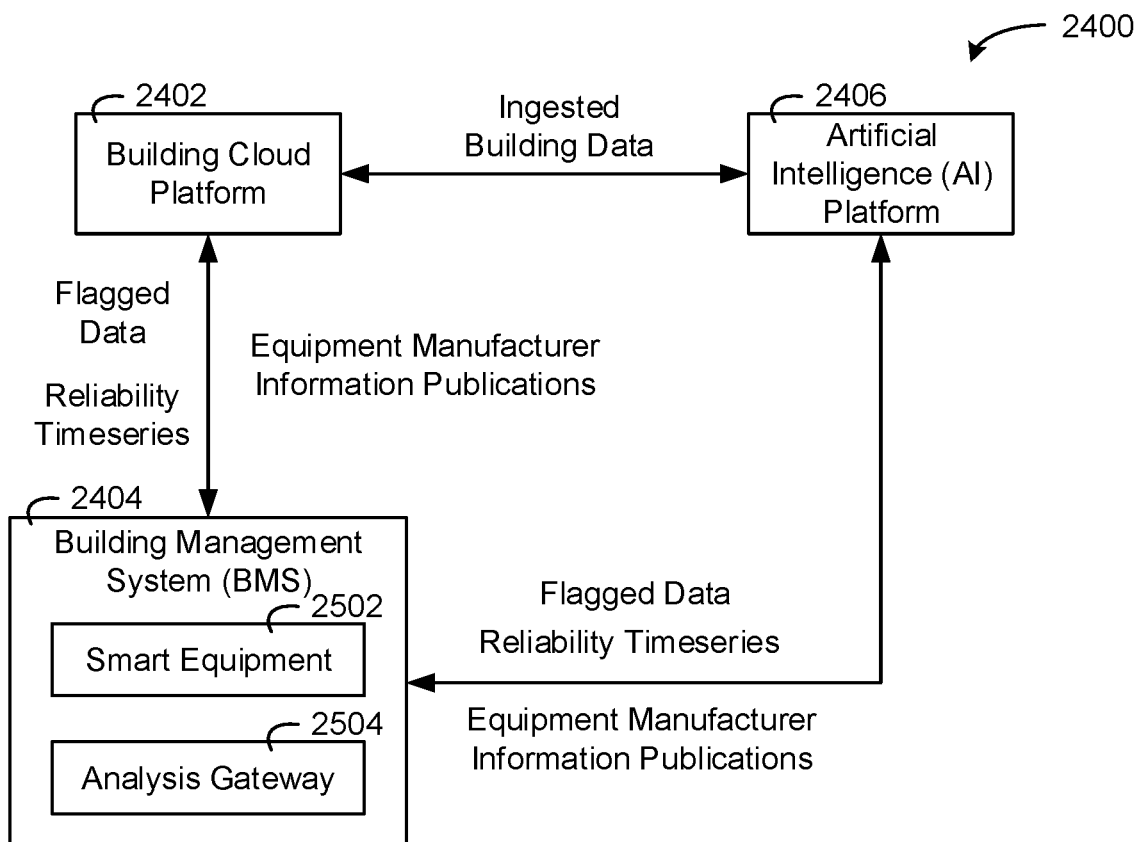
FIG. 25 is a block diagram of the system of FIG. 24 where the BMS includes smart equipment and an analysis gateway configured to flag collected data, generate reliability timeseries, and publish equipment manufacturer information, according to an exemplary embodiment.

Referring now to FIG. 25, the system 2400 is shown with the BMS 2404 including smart equipment 2502 and an analysis gateway 2504, according to an exemplary embodiment. The analysis gateway 2504 is configured, in some embodiments, to add the published information to collected building equipment data before pushing the data to the AI platform 2406. The smart equipment 2502 and/or the analysis gateway 2504 can be configured to generate and/or published enhanced data and communicate the enhanced data to the AI platform 2406 for use in learning and/or generating models.

The enhanced data can be, or can include, flagged data, reliability timeseries, and/or equipment manufacturer information publications. In some embodiments, the smart equipment 2502, which may be thermostats, controllers, actuators, air handler units (AHUs), boilers, or any of the equipment as described with reference to FIGS. 1-4, can be "smart equipment," equipment that includes processing circuits and/or network connections for processing collected building data collected by the smart equipment 2502, generating the flagged data, the reliability timeseries, and/or publishing (e.g., communicating), the flagged data, the reliability timeseries, and/or the equipment manufacturer information, and communicating the information to the AI platform 2406.

In some embodiments, the analysis gateway 2504 adds the flagged data, reliability timeseries, and/or equipment manufacturer publications to collected data received from the smart equipment 2502 and publishes (e.g., communications) the enhanced data to the AI platform 2406. For example, if the analysis gateway 2504 provides a virtual timeseries and a first timeseries and a second timeseries to the analysis gateway 2504, the analysis gateway 2504 is configured to generate a reliability timeseries for the first timeseries and/or the second timeseries.

The analysis gateway 2504 can further determine that the virtual timeseries is a calculation based timeseries determined from both the first time series and/or the second timeseries (e.g., current and voltage measurements used together to determine power measurements). In response to determining that the virtual timeseries is based on the first timeseries and the second timeseries, the analysis gateway 2504 can determine a reliability timeseries from the reliability timeseries of the first timeseries and the second timeseries for the virtual timeseries. Virtual data points and virtual timeseries are described in greater reference in U.S. patent application Ser. No. 15/644,581 field Jul. 7, 2017, the entirety of which is incorporated by reference herein.

In some embodiments, the flagged data, the reliability timeseries, the equipment manufacturer information publications can be generated according to the semantic systems described with reference to FIGS. 3-23. For example, in some embodiments, the building semantic model system 306 is included within the BMS 2404 (e.g., within the smart equipment 2502 and/or the analysis gateway 2504). In this regard, data flagging, data cleansing, timeseries generation with reliability indications, and/or information publication can be performed according to the custom building logic 744 and/or the dynamic semantic building application 416.

In some embodiments, the BMS 2404 (e.g., the smart equipment 2502 and/or the analysis gateway 2504) itself generate the custom building logic 744 and/or the dynamic semantic building application 416). In this regard, the BMS 2404 can include all the necessary systems necessary for generating the logic 744 and/or the application 416. In some embodiments, the building semantic model system 306 exists separately from the BMS 2404 but includes semantic models of the building and/or equipment associated with the BMS 2404. In some embodiments, the building semantic model system 306 can generate and deploy the logic 744 and/or the application 416 to perform data preparation for the AI platform to the BMS 2404 (e.g., to the smart equipment 2502 and/or the analysis gateway 2504) for the BMS 2404 to execute (e.g., executed by the smart equipment 2502 and/or the analysis gateway 2504).

Figure 26:
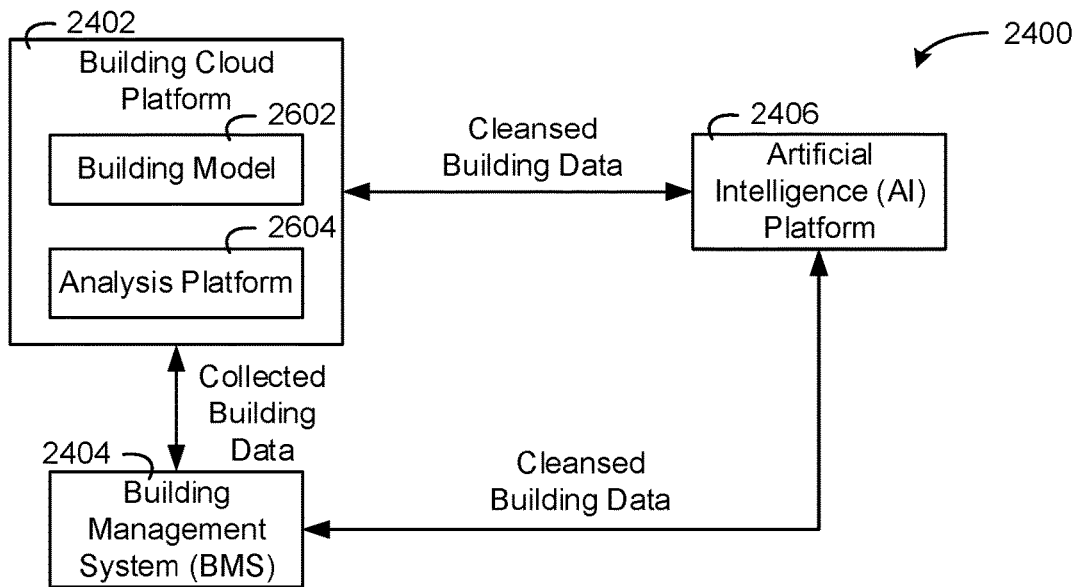
FIG. 26 is a block diagram of the system of FIG. 24 where the building cloud platform includes a building model and an analysis platform for cleansing building data and providing the cleansed building data to the AI platform, according to an exemplary embodiment.

Referring now to FIG. 26, the system 2400 as described with reference to FIG. 24 is shown with the building cloud platform 2402 including a building model 2602 and an analysis platform 2604, according to an exemplary embodiment. The analysis platform 2604 can be configured to ingest and/or cleanse the collected building data received from the BMS 2404 and provide cleansed building data to the AI platform 2406. In some embodiments, the analysis platform 2604 can perform various analysis techniques to identify whether data is reliable or unreliable and filter out unreliable data before providing the data to the AI platform 2406. Furthermore, in some embodiments, the analysis platform 2604 is configured to perform cleansing operations e.g., monitoring network traffic of the BMS 2404 and improving timestamp data based on levels of network traffic in the BMS 2404.

The analysis platform 2604 can be configured to generate and/or maintain a building model 2602. The building model 2602 may be a "Smart Entity" graph-based building model representing entities and relationships. Furthermore, the building model 2602 can be a BRICK building model. The building model 2602 may be the same as and/or like the building models described withy reference to U.S. Provisional Application No. 62/751,926, filed Oct. 29, 2018 and U.S. patent application Ser. No. 16/048,052 filed Jul. 27, 2018, the entirety of both of which are incorporated by reference herein. In some embodiments, the building model 2602 is a semantic building model, e.g., the semantic building model 420, the semantic building model 716, the models 900 and/or 902, the model 1228, the model 2200, the model 2300 and/or any other semantic building described with reference to FIGS. 3-23.

The analysis platform 2604 can be configured to utilize the building model 2602 to ingest the collected building data. However, in some embodiments, the relationships of equipment in the building model 2602 (e.g., what thermostat controls what VAV unit), may be incorrect. In this regard, the analysis platform 2604 can analyze the building model 2602 and/or the collected building data and update the building model 2602. Examples of determining proper relationships based on control decisions and measured conditions is described in greater detail in U.S. patent application Ser. No. 15/400,926 filed Jan. 6, 2017, the entirety of which is incorporated by reference herein. In some embodiments, the custom building logic 744 and/or the dynamic semantic building application 416 can be configured to analyze the building model 2602 with collected data to update the building model 2602 (e.g., add new equipment nodes, new equipment relationships, etc.) for other logic applications and/or dynamic semantic applications to be deployed. For example, if a new AHU node is identified and a static semantic building application 400 defines an optimization algorithm for AHUs, the building application manager 322 can be configured to generate a dynamic semantic building application 416 according to a new node of the semantic building model 420 to deploy the optimization algorithm on the AHU.

Figure 27:
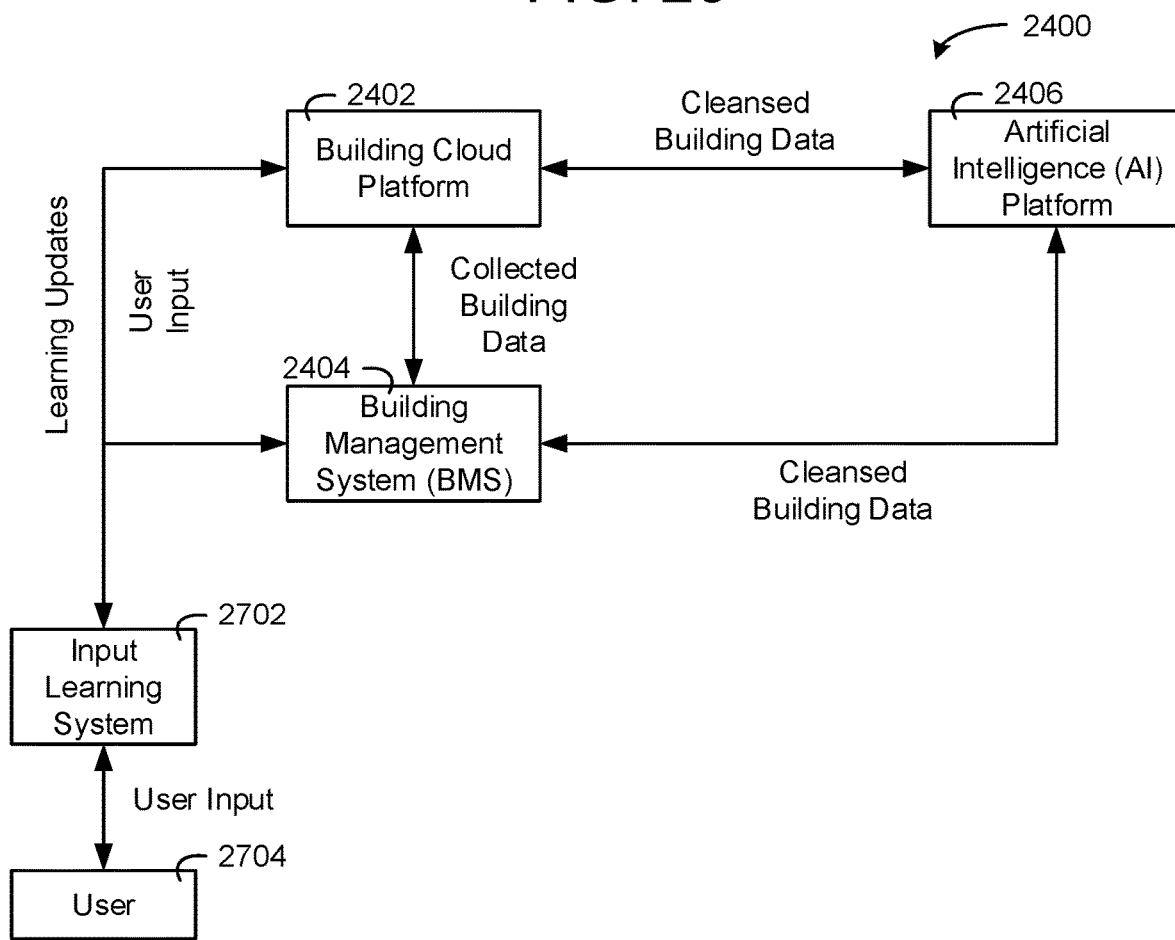
FIG. 27 is a block diagram of the system of FIG. 24 where the system includes an input learning system for receiving user input and cleansing collected building data based on the user input, according to an exemplary embodiment.

Referring now to FIG. 27, the system 2400 is shown including an input learning system 2702, according to an exemplary embodiment. The input learning system 2702 can be configured to utilize user input to improve the data cleansing operations of the BMS 2404 and/or the building cloud platform 2402. The input learning system 2702 can be a user interface (UI) based learning system can be utilized to acquire user input to learn whether equipment is performing properly. In some embodiments, the learning system can provide the user input to the AI platform 2406. Examples of such a learning system can be the "Ask Metasys Anything" (AMA) system.

In some embodiments, the building cloud platform 2402 performs a virtual walkthrough of the BMS 2404 to identify faulty equipment. The virtual walkthrough is described in greater detail with reference to U.S. Provisional Patent Application No. 62/769,447 filed Nov. 19, 2018, the entirety of which is incorporated by reference herein. The UI based learning system, e.g., the input learning system 2702, can be utilized to help perform virtual walkthroughs of buildings by providing input and/or output to a user 2704. The input to the input learning system 2702 can be used by the building cloud platform 2402 is performing the virtual data walkthrough.

In some embodiments, the input learning system 2702 can provide a user with indications of subsystems and/or performance data of each of the subsystems. The user can provide the input learning system 2702 with indications e.g., "subsystem good," "equipment good," "setpoint in safe range," "data point reliable," etc. The input learning system 2702 can utilize the user input to perform self-assessment and/or to learn to perform supervised machine learning. In some embodiments, the user input is provided directly to the BMS 2404 and/or the smart equipment 2504 which can perform a self-assessment based on the user input.

In some embodiments, the input learning system 2702 is configured to attempt various settings, calibration values, etc. until a user indicates the equipment is performing appropriately. User approval of equipment and/or settings can be used in the AI platform 2406 so that the AI platform 2406 can place higher or low reliability on the equipment based on the user input. In some embodiments, the input learning system 2702 may be a goal-based learning system, e.g., may have one or more goals and test settings or other configurations to achieve the goals. The goals may be constrained by physical bounds, goal weights, etc. In some embodiments, the input learning system 2702 receives the physical bounds and/or goal weights via a user interface from a user.

In some embodiments, the input learning system 2702 includes the custom logic generator 324. In this regard, the input learning system 2702 can generate the custom building logic 744 to generate updates according to the semantic building model 716 and/or the semantic logic application 718. For example, the user input may define a goal, "Lights in Conference Room A should only be on 40% of the time on a working day." The input learning system 2703 can generate a logic application 728 which determines on and off schedules for the particular conference room such with the goal of turning the lights on when occupants are present but keeping the lights on only for approximately 40% of the time on a weekday.

Figure 28:
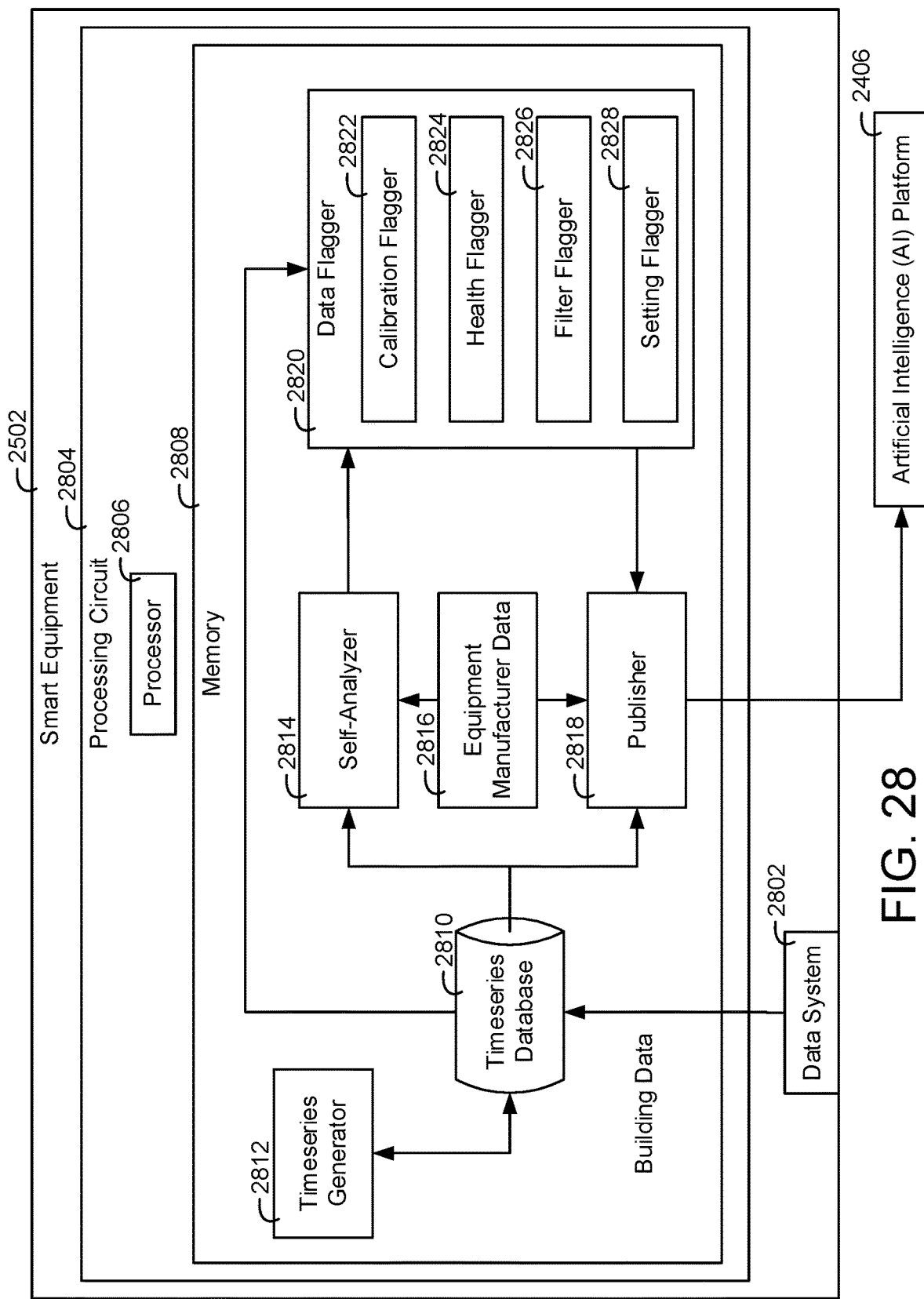
FIG. 28 is a block diagram illustrating the smart equipment of FIG. 25 in greater detail, according to an exemplary embodiment.

Referring now to FIG. 28, the smart equipment 2502 is shown in greater detail, according to an exemplary embodiment. The smart equipment 2502 is shown to include a processing circuit 2804, the processing circuit 2804 including a processor 2806 and memory 2808. The processing circuit 2804, the processor 2806, and the memory 2808 can be the same as and/or like the processing circuit 308, the processor 310, and/or the memory 312 as described with reference to FIG. 3.

Indications such as flags, equipment information, reliability data points, etc. can be generated by the smart equipment 2502 (e.g., on an equipment level) and provided to the AI platform 2406 by the smart equipment 2502. Flags may identify health information of the smart equipment 2502 so that the AI platform 2406 can train models based on a data point indicative of how reliable the data of the smart equipment 2502 is.

The reliability data points may be data points for data timeseries that tracks how reliable certain data is, e.g., temperature of a thermostat may become more unreliable over time due to internal heating of the thermostat, a reliability timeseries may track this trend over time. The smart equipment 2502 can further be configured to publish equipment manufacturer information. For example, indications such as equipment size, equipment capacity, equipment power consumptions, etc. can be utilized by the AI platform 2406 to generate effective machine learning. In some embodiments, the AI platform 2406 (or the smart equipment 2502) can identify whether a health flag indicates a health level that is above a predefined amount (e.g., above 85%) and only utilize data of the equipment if the health level is above the predefined amount.

The smart equipment 2502 is further shown to include a data system 2802. The data system 2802 can be a sensor and/or an actuator. The sensor can be a temperature sensor, a humidity sensor, a current sensor, a voltage sensor, etc. The actuator can be a relay, a motor, etc. The data system 2802 can generate building data (e.g., settings, operational logs, environmental condition measurements, etc.) which can be converted into timeseries data.

The memory 2808 is shown to include a timeseries database 2810. The timeseries database 2810 can be configured to store the building data collected from the data system 2802. The memory 2808 includes a timeseries generator 2812. The timeseries generator 2812 can be configured to convert the building data received from the data system 2802 into data timeseries. In some embodiments, the timeseries generator 2812 can be configured to generate reliability timeseries for each of the data timeseries stored in the timeseries database 2810. Furthermore, for data timeseries that are virtual, i.e., generated based on other timeseries, the timeseries generator 2812 can generate a virtual reliability timeseries for the virtual timeseries, the reliability timeseries taking into account the reliability timeseries of other timeseries. When timeseries are combined to higher and higher levels of virtualization, the uncertainties of the timeseries compound. In this regard, a reliability timeseries can allow the AI platform 2406 to identify how reliable a data timeseries is.

The memory 2808 is shown to include a data flagger 2820. The data flagger 2820 can analyze the building data and/or timeseries data of the timeseries database 2810 and apply flags to the data. These equipment level data flags can be published by publisher 2818 to the AI platform 2406. The data flags can indicate the performance of the smart equipment 2502 to help the AI platform 2406 train AI models accurately, i.e., build accurate models based on the building data of the smart equipment 2702.

The data flagger 2820 includes a calibration flagger 2822 configured to generate a calibration flag for the smart equipment 2502. The calibration flag can be an indication when the equipment was last calibrated (e.g., date when last calibration, number of days since last calibrated, number of months since last calibrated, etc.) and/or whether the smart equipment 2502 requires calibration. The AI platform 2406 is configured to identify trends in calibration time periods to determine how reliable the data is for the AI platform 2406 and/or whether the equipment requires calibration.

The data flagger 2820 includes a health flagger 2824. The health flagger 2824 is configured to add a smart equipment health flag (e.g., a reliability metric, a healthy/unhealthy metric, a 0-100 reliability score) to data published by the publisher 2818. The smart equipment 2502 can perform a self-assessment via self-analyzer 2814 (e.g., identify how well the equipment is being controlled and/or is performing), identify a score for the equipment, and publish the score for the AI platform 2406 to consume and utilize in AI learning. In some embodiments, the AI platform 2406 is configured to identify what data should be used or discarded from the AI learning based on the published health flag.

The data flagger 2820 includes a filter flagger 2826 which can generate a filter flag for the smart equipment 2502. The setting flagger 2828 is configured to identify whether filters have been setup in the equipment to handle transient noise (e.g., transients that occur when systems or equipment are starting or shutting down). The publisher 2818 can publish the filter flag indicating whether a filter is present in the smart equipment 2502 and/or has been configured. In some embodiments, the filter flag generated by the filter flagger 2826 includes an indication of the parameters used in the filter.

The data flagger 2820 includes a setting flagger 2828 configured to generate a settings flag, in some embodiments. The setting flagger 2828 is configured to determine whether the smart equipment 2502 has an inappropriate setpoints (e.g., an unusually high or low value), in some embodiments. The data flagger 2820 can include a flag indicating whether the setpoint for the equipment is normal or abnormal to help the AI platform 2406 to identify how a system is being operated and/or whether the data generated by the system is reliable.

In some embodiments, setting flagger 2828 is configured with various ranges and can determine the reliability settings within or outside the ranges for determining the settings flag flags. For example, the setting flagger 2828 is configured to identify whether a setpoint is within a predefined range, whether a measured temperature is changing at a reliable rate by comparing a temperature change to a temperature change rate, etc. In some embodiments, setting flagger 2828 determines how far from a nominal value (or a nominal range) is to determine a value for the setting flag.

The memory 2808 includes the publisher 2818. The publisher 2818 is configured to publish information (e.g., the flags) received from the data flagger 2820. The publisher 2818 can, in some embodiments, make an endpoint available for the AI platform 2406 to query. In some embodiments, the publisher 2818 transmits the information to the AI platform 2406 directly (e.g., pushes the information).

The "data cleansing features" of the smart equipment 2502 can enable the smart equipment 2502 to be AI ready, i.e., the data of the smart equipment 2502 can be provided directly to the AI platform 2406 without requiring any external system to analyze the data. Since the data cleansing features are built into the smart equipment 2502, the features can be turned on or off based on whether an equipment owner pays for the cleansing features, e.g., the publisher 2818 can activate the cleansing features and publish the information for cleansing or deactivate the features. In some embodiments, the smart equipment 2502 is a chiller ready for optimization and/or AI that publishes information (e.g., flags) that can be utilized for high levels of accuracy in optimization and/or AI decision making.

In some embodiments, the smart equipment 2502 (or a subsystem to which the smart equipment 2502 belongs) includes multiple redundant sensors and/or communicates with nearby devices measuring the same conditions. The publisher 2818 is configured to, in some embodiments, utilize the measurements of the redundant sensors to drive down uncertainty, e.g., perform averages of sensor measurements of redundant sensors.

The memory 2808 includes self-analyzer 2814, the self-analyzer 2814 being configured to perform a self-analysis of the smart equipment 2502, in some embodiments. In some embodiments, the self-analyzer 2814 performs equipment level fault detection diagnostics (FDD) to determine whether the smart equipment 2502 itself is healthy. The self-analyzer 2814 can generate a health metric and provide the metric to the health flagger 2824 to publishing to the AI platform 2406. The self-analyzer 2814 is configured to, based on the building data and/or data timeseries of the timeseries database 2810, identify what sensors of the smart equipment 2502 is impacted by particular operations of the smart equipment 2502. This indication of a link (e.g., indication of what sensors measure changes resulting from an operation) can be published by publisher 2818 to the AI platform 2406. In some embodiments, the self-analyzer 2814 can identify whether sensors need to be replaced and/or whether new sensors should be added for the smart equipment 2502.

The equipment manufacturer data 2816 can be data describing the characteristics of the smart equipment 2502. For example, physical dimensions, power ratings, time constants, and/or any other information for the smart equipment 2502 that may be defined by a manufacturer of the smart equipment 2502 can be stored as the equipment manufacturer data 2816. In some embodiments, the self-analyzer 2814 is configured to utilize the equipment manufacturer data 2816 to perform a self-analysis. In some embodiments, the equipment manufacturer data 2816 stored by the smart equipment 2502 (or by another subsystem) is published to the AI platform 2406 automatically and/or based on requests received from the AI platform 2406 by the publisher 2818 for use in AI training by the AI platform 2406. In some embodiments, based on the equipment manufacturer data 2816, the self-analyzer 2814 is configured to perform self-analysis to determine what updates and/or service should be performed for the smart equipment 2502.

In some embodiments, the data flagger 2820 includes one or multiple applications generated by the building semantic model system 306, e.g., the application 416 and/or the custom building logic 744. In this regard, the flaggers of the data flagger 2820 (e.g., the calibration flagger 2822, the health flagger 2824, the filter flagger 2826, and/or the setting flagger 2828 can be defined and/or can be an implementation of the application 416 and/or the custom building logic 744 generated by the smart equipment 2502 or deployed to the smart equipment 2502 by the building semantic model system 306.

Figure 29:
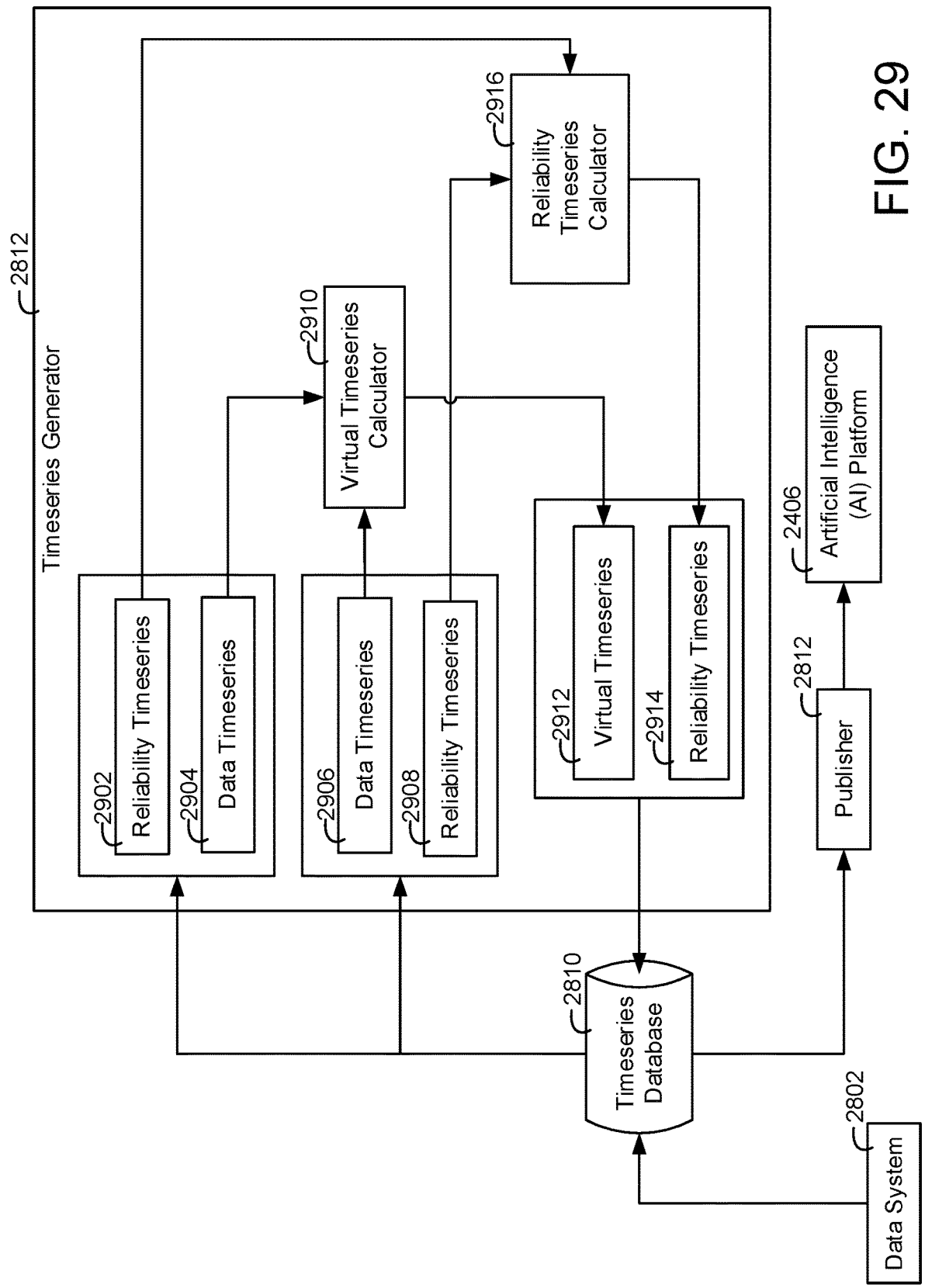
FIG. 29 is a block diagram of a timeseries generator that can be implemented by the smart equipment of FIG. 25 or the building cloud platform of FIG. 24 for generating a reliability timeseries, according to an exemplary embodiment.

Referring now to FIG. 29, the timeseries generator 2812 and the timeseries database 2810 of the smart equipment 2502 as described with reference to FIG. 28 are shown in greater detail, according to an exemplary embodiment. Building systems can collect data of multiple points and utilize the point data to generate virtual points. However, as the points are virtualized to higher and higher levels, the uncertainty of the virtual point data increases i.e., the uncertainty of the timeseries is compounded. To remedy this uncertainty issue, each virtual point can be associated with a virtual "reliability" point. The virtual reliability point can be linked to the virtual point which it describes and provide an indication that AI can utilize to identify how reliable a particular virtual point is. The virtual reliability point can be associated with a virtual timeseries of discrete values of reliability of the virtual point.

While the timeseries generator 2812 and the timeseries database 2810 are described as being integrated within the smart equipment 2502, the timeseries generator 2812 and/or the timeseries database 2810 can be implemented in the building cloud platform 2402, the AI platform 2406, and/or any other computing device as described herein.

The timeseries generator 2812 is shown generating a virtual timeseries and a reliability timeseries based on two different timeseries. The timeseries generator 2812 can, in some embodiments, generate a virtual timeseries based on any number of input timeseries. In some embodiments, the input timeseries are themselves virtual timeseries. In this regard, the virtual timeseries can be virtualized to one or multiple levels of virtualization. For example, current and voltage of multiple devices can be utilized to determine power consumption of multiple devices (a virtual point of a first level of virtualization). The power consumption of the multiple devices can be combined to determine a power consumption for an entire building (a virtual point of a second level of virtualization).

The timeseries generator 2812 is configured to receive (e.g., retrieve) data timeseries 2904 and data timeseries 2906 from timeseries database 2810. In some embodiments, the data timeseries 2904 and the data timeseries 2906 are associated with (linked to) reliability timeseries. In some embodiments, the timeseries generator 2812 generates the reliability timeseries 2902 based on the data timeseries 2904 and the reliability timeseries 2908 based on the data timeseries 2906.

For example, the timeseries generator 2812 can identify a level of uncertainty or noise in the data timeseries 2904 and generate the reliability timeseries 2902 based on the levels of uncertainty and/or noise. Furthermore, the timeseries generator 2812 can be configured to store reliability data for the sensors used to collect the data timeseries 2904. For example, a particular temperature sensor may be accurate to one quarter degree Fahrenheit based on a published manufacturer datasheet. The timeseries generator 2812 can store the manufacturer defined uncertainty and utilize the uncertainty in determining the data timeseries 2904.

The timeseries generator 2812 includes a virtual timeseries calculator 2910. The virtual timeseries calculator 2910 can be configured to generate a virtual point and/or a virtual timeseries for the virtual point. The virtual timeseries calculator 2910 can receive the data timeseries 2904 and the data timeseries 2906 and generate the virtual timeseries 2912. The timeseries generator 2812 is further shown to include a reliability timeseries calculator 2916. The reliability timeseries calculator 2916 is configured to generate the reliability timeseries 2904 based on the reliability timeseries 2902 and/or the reliability timeseries 2908. The reliability timeseries 2914 can indicate how reliable the virtual timeseries 2912 values are. Since the unreliability of the data timeseries 2904 and 2908 are compounded when used to generate the virtual timeseries 2912, the reliability timeseries calculator 2916 can determine the reliability timeseries 2914 based on the reliabilities of the data timeseries 2904 and the data timeseries 2906 (e.g., the reliability timeseries 2902 and the reliability timeseries 2914).

The publisher 2818 can receive and/or retrieve timeseries data from the timeseries database 2810 and push the timeseries data to the AI platform 2406. In some embodiments, the publisher 2818 publishes each data timeseries or virtual timeseries with its corresponding reliability timeseries. For example, the publisher can form a data package including both a data timeseries and its reliability timeseries so that the AI platform 2406 receiving the package can identify the correspondence between the data timeseries and the reliability timeseries.

In some embodiments, the reliability timeseries 2902, 2908, and/or 9914 are generated by the timeseries generator 2812 according to the semantic algorithms of the system 306. For example, the dynamic semantic building application 416 and/or the logic 744 can operate to generate a reliability timeseries for a data point. In some embodiments, the model 716 (or the model 420) can include an indication of nodes for various timeseries data points. In this regard, the static semantic building application 400 can define an algorithm for calculating a reliability timeseries for particular types of data points. In this regard, the building application manager 322 can identify the data point via the corresponding node in the model 716 and determine that the static semantic building application 400 can generate a reliability timeseries appropriate for the identified data point. Accordingly, the building application manager 322 can generate the dynamic semantic building application 416 to generate the reliability timeseries. Similarly, a user defined custom logic application 722 can be deployed to generate the reliability timeseries.

In some embodiments, the manager 322 can link multiple applications and/or custom logics together. For example, a first algorithm can generate the reliability timeseries 2902 while a second algorithm can generate the reliability timeseries 2908. The manager 322 can identify, based on nodes relating the timeseries 2904, 2908, and 2914 (e.g., timeseries 2914 being generated from timeseries 2904 and 2904), that a third algorithm should be deployed to generate the reliability 2914. The third algorithm can be generated such that the inputs from the outputs from the first two algorithms (e.g., the data timeseries 2904 and the data timeseries 2908) are used to generate the output of the third algorithm (the reliability timeseries 2914).

Figure 30:
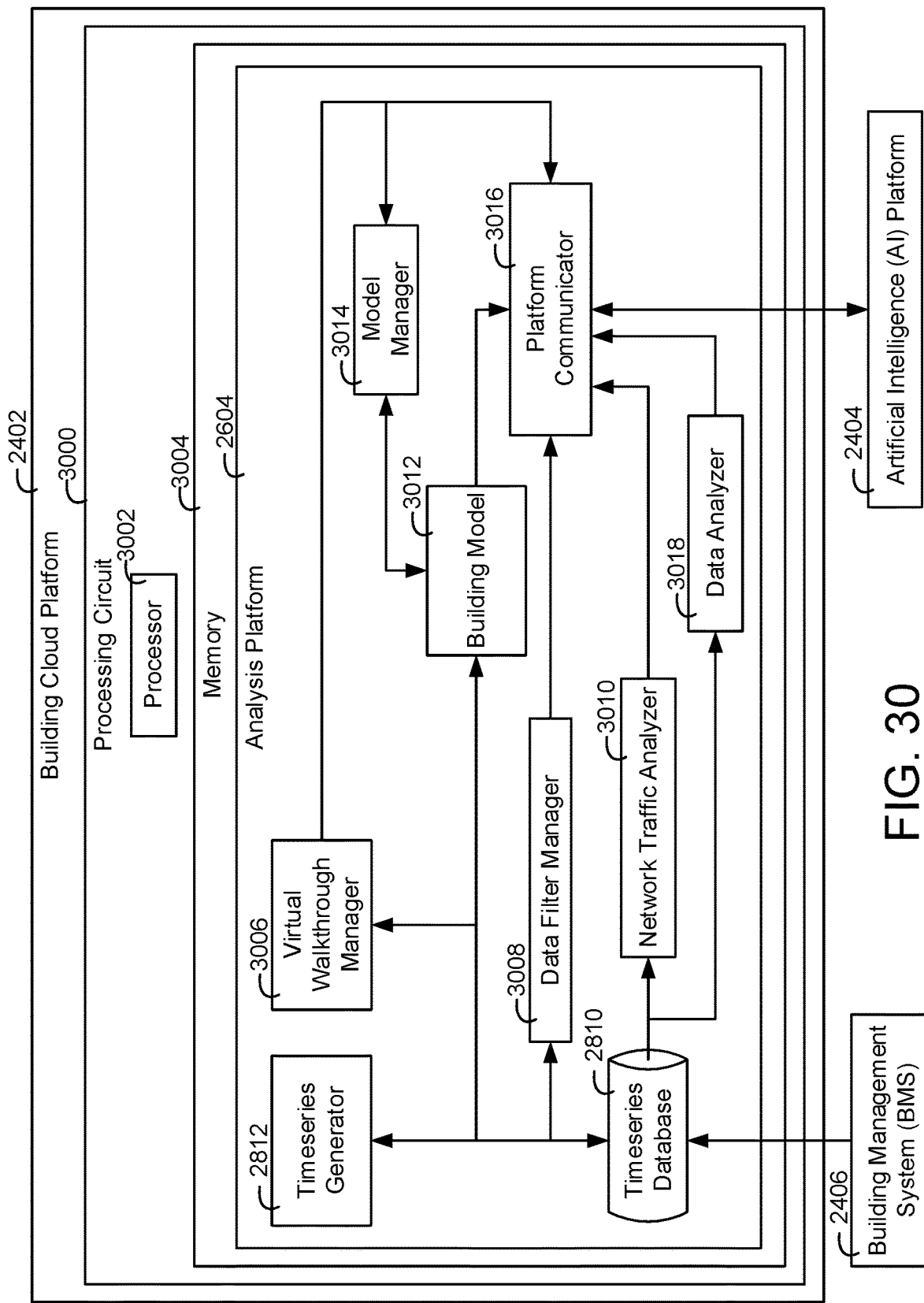
FIG. 30 is a block diagram illustrating the building cloud platform of FIG. 24 in greater detail, according to an exemplary embodiment.

Referring now to FIG. 30, the building cloud platform 2402 is shown in greater detail, according to an exemplary embodiment. The building cloud platform 2402 can be configured to cleanse and prepare data for the AI platform 2406. Furthermore, the building cloud platform 2402 can analyze and identify faulty equipment of the building management system 2406. In some embodiments, the BMS 2404 provides data to the analysis platform 2604 which performs analysis and/or data cleansing before providing the equipment to the AI platform 2406. Although the operations of the cloud platform 2402 are performed by the analysis platform 2604, in some embodiments, the operations of the analysis platform 2604 are implemented in the smart equipment 2502 and/or in the analysis gateway 2504. In some embodiments, the analysis platform 2604 is configured to digitize job data of buildings to aid in the performance of simulation and/or fault analysis.

The cloud platform 2402 is shown to include a processing circuit 3000. The processing circuit 3000 includes a processor 3002 and a memory 3004. The processing circuit 3000, the processor 3002, and the memory 3004 can be the same as and/or similar to, the processing circuit 308, the processor 310, and/or the memory 312. The memory 3004 includes the analysis platform 2604. The analysis platform 2604 includes the timeseries database 2810 and the timeseries generator 2812. In this regard, the analysis platform 2604 can perform the same reliability timeseries operations as described with reference to FIGS. 28-29. In this regard, rather than performing, or in addition to performing, the timeseries operations as described with reference to FIGS. 28-29 in the BMS 2404, the timeseries operations can be performed by the analysis platform 2604. The platform communicator 3016 can provide the data timeseries, the virtual timeseries, and/or the reliability timeseries of the timeseries database 2810 to the AI platform 2406.

The analysis platform 2604 includes a network traffic analyzer 3010. The network traffic analyzer 3010 can be configured to analyze network traffic data received from the BMS 2404. In some embodiments, the network traffic analyzer 3010 is configured to utilize network data to determine whether the collected data of the BMS system is reliable. High network traffic may indicate that data of the BMS 2404 may be unreliable since the data may become corrupted, delayed, or in part lost in high network traffic situations. The network traffic analyzer 3010 is configured to adjust and/or determine reliability metrics for equipment and/or subsystems based on network traffic levels, in some embodiments. In some embodiments, the network traffic analyzer 3010 is an algorithm generated according to the semantic modeling architecture described with reference to FIGS. 1-23) (e.g., the network traffic analyzer 3010 is or includes the custom building logic 744 and/or the dynamic semantic building application 416).

In some embodiments, the network traffic analyzer 3010 can isolate and remove data of poorly performing equipment from being communicated to the AI platform 2406. High bursts of data may be indicative of faulty performance. Data collected during a high level of network activity may be discarded. Such trends can be identified and flagged by the network traffic analyzer 3010. Data of faulty equipment identified by the network traffic analyzer 3010, the network traffic analyzer 3010 can prevent the data of the faulty equipment from being communicated to the AI platform 2406. In some embodiments, the network traffic analyzer 3010 may allow the data to be transmitted by may mark the data as being potentially unreliable, allowing the AI platform 2406 to weight the data used to train the models of the AI platform 2406 appropriately.

In some embodiments, the analysis platform 2604 is configured to identify whether networking equipment is being properly utilized. High traffic levels, performance data of network engines, etc. can be analyzed by the network traffic analyzer 3010 to determine whether the networking equipment is being operated effectively. The network traffic analyzer 3010 is configured to generate a report based on the network data, in some embodiments. The report may indicate whether networking settings should be updated and/or whether additional networking equipment should be added to a system. The report can be provided to an end user (e.g., via a user device) to help the user improve the performance of the BMS 2404, resulting in higher quality BMS data for the AI platform 2406 to analyze.

In some embodiments, the network traffic analyzer 3010 is configured to generate a network report indicating the performance of equipment and/or a building network. The report can include recommendations generated by the network traffic analyzer 3010. For example, the recommendations can be to upgrade the network and/or components of the network, add additional network trunks, etc.

The network traffic analyzer 3010 can be configured to determine whether timeseries data of the timeseries database 2810 has timestamp errors based on an analysis of network traffic data of the BMS 2404. In some case, if network traffic levels of network of the BMS 2404 is higher than a predefined amount during a period of time, the data of the timeseries may be received out of order during that period. During normal network traffic levels, the building cloud platform 2402 may store the data timeseries in the timeseries database 2810 in the order that the data is received.

However, in response to determining that there are timestamp errors (e.g., high network traffic levels), the network traffic analyzer 3010 can be configured to analyze timestamps of the data of the timeseries database 2810 received during the high network traffic level time periods and reorder the data based on the timeseries. If no timestamps are available, the network traffic analyzer 3010 may send a request to the BMS 2404 to resend the data and overwrite the stored data of the timeseries database 2810.

The analysis platform 2604 includes a model manager 3014. The model manager 3014 is configured to generate and/or update the building model 3012. The model manager 3014 is configured to simulate building structures and/or equipment setups to identify faults and/or errors in building construction and/or equipment setup. The model manager 3014 is configured to generate results for improving the performance of the equipment based on the simulation and analysis. The results can be presented to a user via a user device.

In some embodiments, based on data collections, the model manager 3014 can generate and/or update equipment relationships of the building model 3012 (e.g., what equipment is located in what zone, what equipment controls conditions of what zone, etc.) In some embodiments, the model manager 3014 is configured to correct errors in algorithm setups and/or equipment/space relationships (e.g., BRICK models) by analyzing collected building data. The relationships can be provided by the model manager 3014 to the AI platform 2406 for utilizing the correlations in machine learning. In some embodiments, the building model 3012 is a semantic building model, e.g., the semantic building model 420, the semantic building model 716, the models 900 and/or 902, the model 1228, the model 2200, the model 2300 and/or any other semantic building described with reference to FIGS. 3-23.

In some embodiments, the data filter manager 3008 can be configured to filter data received from the BMS 2404 and providing the filtered data to the AI platform 2406. The data filter manager 3008 can be configured to perform machine learning and/or apply analysis rules to separate good data from bad data of the BMS 2404 and remove bad data from training data pools before providing the data to the AI platform 2406. The data filter manager 3008 can generate an indication to service equipment associated with the bad data. In some embodiments, the filtering algorithm is defined according to a semantic building application and/or logic application generated by the building semantic model system 306 (e.g., the custom building logic 744 and/or the application 416). The semantically generated applications and/or logic for data filtering can be generated by the building cloud platform 2402 and/or otherwise generated by the building semantic model system 306 and deployed to the building cloud platform 2402.

In some embodiments, the data analyzer 3018 is configured to collect data of one or multiple building sites to quantify uncertainty levels for equipment, quantify ranges and/or capacities for equipment, identify uncertainty patterns, etc. In some embodiments, different patterns of uncertainties may indicate whether data should be utilized for AI or not. In some embodiments, the data analyzer 3018 is configured to quantify alarm quantities and/or alarm event frequencies to identify predicted equipment faulty performance. In some embodiments, the analysis algorithms performed by the data analyzer 3018 is defined according to a semantic building application and/or logic application generated by the building semantic model system 306 (e.g., the custom building logic 744 and/or the application 416). The semantically generated applications and/or logic for data analysis can be generated by the building cloud platform 2402 and/or otherwise generated by the building semantic model system 306 and deployed to the building cloud platform 2402.

The analysis platform 2604 includes a virtual walkthrough manager 3006. The virtual walkthrough manager 3006 can be configured to collect building data for an entire building (or subsystems of a building) and utilize the data to identify whether the building is operating properly. The virtual walkthrough manager 3006 is configured to identify individual subsystems (e.g., heating subsystem, security subsystem, ventilation system, etc.). Based on data of the individual systems, the virtual walkthrough manager 3006 is configured to identify whether each of the subsystems are operating properly.

In response to determining that one of the subsystems is faulty, the faulty subsystem can be isolated and analyzed. Equipment of the isolated subsystem can be analyzed by the virtual walkthrough manager 3006, based on the data of the equipment, to identify equipment that is broken. Data of the faulty equipment can be excluded by the virtual walkthrough manager 3006 from being provided to the AI platform 2406. Furthermore, the virtual walkthrough manager 3006 is configured to generate a report for an end user to review and properly service faulty equipment.

Figure 31:
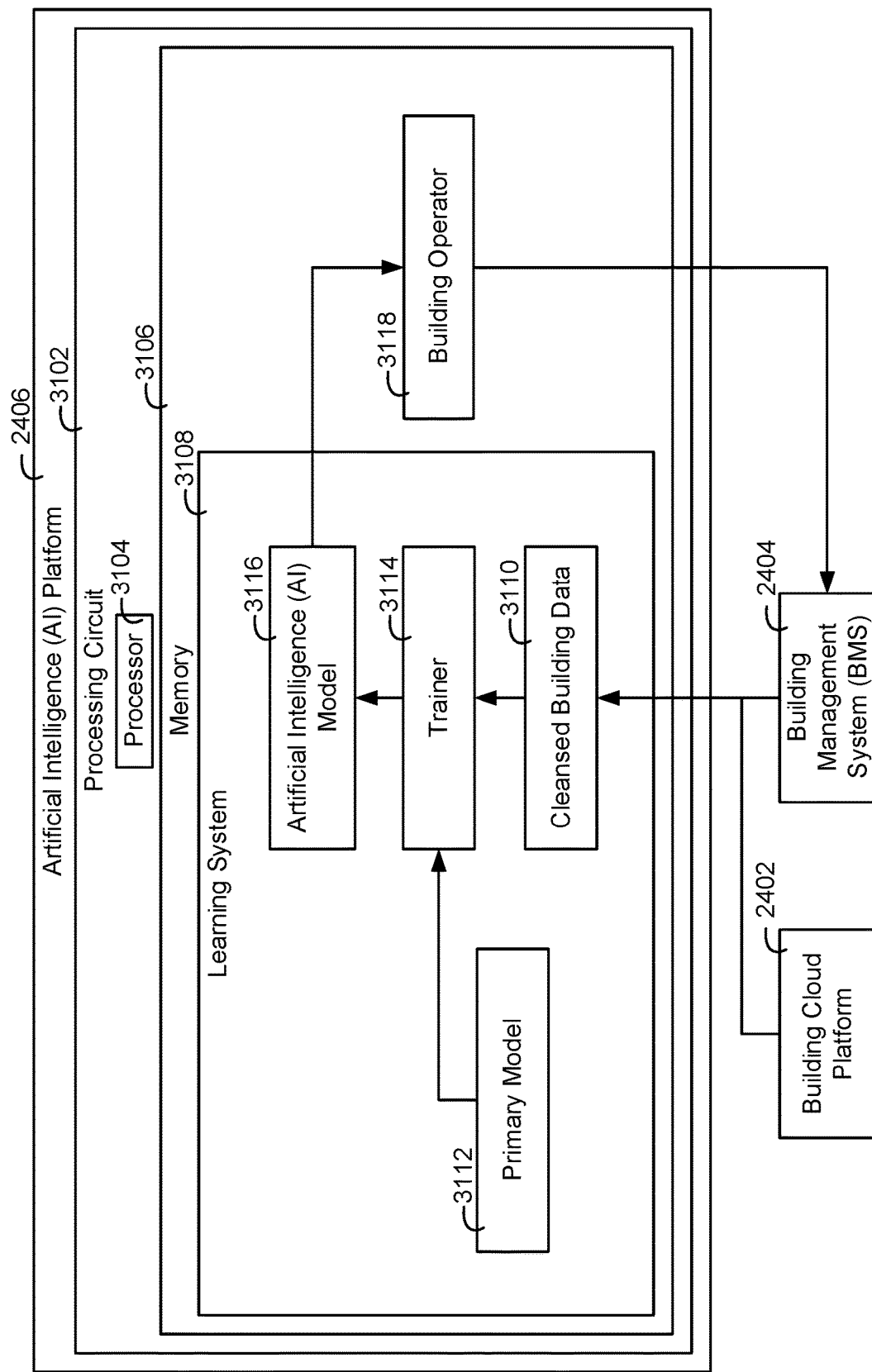
FIG. 31 is a block diagram illustrating the AI platform in greater detail, according to an exemplary embodiment.

Referring now to FIG. 31, the AI platform 2406 is shown for utilizing building data cleansed, flagged, and/or otherwise improved to operate the BMS 2404, according to an exemplary embodiment. The AI platform 2406 is shown to include a processing circuit 3102, a processor 3104, and a memory 3106. The processing circuit 3102, the processor 3104, and the memory 3106 can be the same as, or similar to, the processing circuit 308, the processor 310, and the memory 312 as described with reference to FIG. 3.

The memory 3106 is shown to include a learning system 3108 for training AI models to perform building control operations. Artificial intelligence models that utilize highly reliable data can be used in systems where cascaded models are utilized. The learning system 3108 includes a primary model 3112. The primary model 3112 can be user defined. For example, an engineer can define the primary model 3112 based on historical knowledge. The primary model 3112 can model a piece of building equipment, a subsystem, and/or a building. The primary model 3112 may be based on known characteristics of the building equipment subsystem, and/or building and can be generated empirically, and/or can be based on theory.

The learning system 3108 is shown to include a trainer 3114. The trainer 3114 is configured to utilize cleansed building data 3110 received from the building cloud platform 2402 and/or the BMS 2404 to train an AI model 3116. In some embodiments, the trainer 3114 utilizes both the cleansed building data 3110 and the primary model 3112 together to generate the AI model 3116. This combination of a control models (e.g., the primary model 3112) combined with artificial intelligence models can be a form of "Graybox" learning where the AI model 3116 is seeded with known information, i.e., a primary model 3112. The learning system. The memory 3106 is shown to include a building operator 3118. The building operator can be configured to utilize the AI model 3116 to perform control, building learning, optimization, generate performance predictions, and/or generate analysis of the BMS 2404 based on the AI model 3116.

In some embodiments, the building operator 3118 performs a graduated controls approach. The building operator 3118 may first being operating based on the primary model 3112 and monitor the performance of the AI model 3116 as the AI model 3116 is learned. In response to determining that the determinations of the AI model 3116 are accurate to a predefined level, the building operator 3118 can switch operation of the BMS 2404 from being based on the primary model 3112 to the AI model 3116. For example, a new building may have a chiller, the primary model 3112 being a model for the chiller. The building operator 3118 can optimize the performance of the chiller with the primary model 3112 and utilize collected data of the chiller to train the AI model 3116. Once the AI model 3116 is reliable (e.g., is accurate based on the collected training data above a predefined amount), the building operator 3118 can begin optimizing the chiller based on the AI model 3116.

In some embodiments, the primary model and/or the AI model 3116 can be semantically defined building models. For example, can define one or more control operations. In some embodiments, the models 3112 and/or 3116 can be the same as, or similar to, the applications 400 and/or 416, the applications 500, 420, and/or 528, the application 718, and/or any other semantic model described herein.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building system for searching a semantic building model, the building system comprising:
   one or more memory devices configured to store instructions thereon, wherein the instructions, when executed by one or more processors, cause the one or more processors to:

cause a user interface of a user device to display a graphic interface including a first element including a plurality of nodes of the semantic building model and a plurality of relationships between the plurality of nodes of the semantic building model and a second element configured to receive a user defined search input;

receive, via the second element of the graphic interface, the user defined search input from the user device, the user defined search input defining a query comprising a first indication of a first node type, a second indication of a second node type, and a relationship indication of a relationship type relating the first node type and the second node type;

generate a search result based on the user defined search input by causing the search result to include a query result from querying the semantic building model with the query, wherein the query result comprises an indication of a portion of nodes of the plurality of nodes and a portion of relationships of the plurality of relationships identified responsive to the query; and cause the graphic interface to display the portion of nodes of the plurality of nodes and the portion of relationships of the plurality of relationships in the first element.

2. The building system of claim 1, wherein the instructions cause the one or more processors to:

receive a selection via the user device, wherein the selection is at least one of a selection of one or more of the portion of nodes, a selection of one or more relationships of the portion of relationships, or a subgraph of a graph defined by the portion of nodes and the portion of relationships; and generate and execute an application based on an application definition and the selection.

3. The building system of claim 1, wherein the user defined search input is a natural language input defined by a user of the user device;

wherein the instructions cause the one or more processors to generate the query based on the natural language input.

4. The building system of claim 1, wherein the user defined search input comprises a particular indication of a node type in a natural language.

5. The building system of claim 1, wherein the instructions cause the one or more processors to:

determine whether the plurality of nodes includes one or more first nodes of the first node type and one or more second nodes of the second node type;

determine whether the one or more first nodes are related to the one or more second nodes by one or more relationships of the plurality of relationships of the relationship type; and cause the portion of nodes of the plurality of nodes to include the one or more first nodes and the one or more second nodes and cause the portion of relationships of the plurality of relationships to include the one or more relationships in response to a determination that:

the plurality of nodes include the one or more first nodes of the first node type and the one or more second nodes of the second node type; and the one or more first nodes are related to the one or more second nodes by the one or more relationships of the plurality of relationships of the relationship type.

6. The building system of claim 1, wherein the instructions cause the one or more processors to receive a second search input from the user device, wherein the second search input is a shape drawn by a user on the user interface, wherein the instructions cause the one or more processors to generate a second search result based on the shape.

7. The building system of claim 6, wherein the instructions cause the one or more processors to determine whether the portion of nodes of the plurality of nodes displayed by the user interface are graphically within the shape drawn by the user;

wherein the instructions cause the one or more processors to generate the second search result to include the portion of nodes in response to a determination that the portion of nodes are graphically within the shape drawn by the user.

8. The building system of claim 1, wherein the instructions cause the one or more processors to:

receive historical user input indicating feedback of a user of previous search results at a first point in time, the historical user input indicating preferred search results; and store the historical user input;

wherein the instructions cause the one or more processors to generate the search result further based on a learning model and the historical user input, wherein the search result is generated at a second point in time after the first point in time and is based on the preferred search results.

9. The building system of claim 8, wherein the instructions cause the one or more processors to:

receive, one or more interactions with the user interface causing the user interface to display one or more other nodes of the plurality of nodes and one or more other relationships of the plurality of relationships; and update the historical user input to include the one or more interactions, the one or more other nodes, the one or more other relationships, and the user defined search input.

10. The building system of claim 1, wherein the user defined search input is a text input defined by a user of the user device.

11. A method of searching a semantic building model, the method comprising:

causing, by a processing circuit, a user interface of a user device to display a graphic interface including a first element including a plurality of nodes of the semantic building model and a plurality of relationships between the plurality of nodes of the semantic building model and a second element configured to receive a user defined search input;

receiving, by the processing circuit, via the second element of the graphic interface, the user defined search input from the user device, the user defined search input defining a query comprising a first indication of a first node type, a second indication of a second node type, and a relationship indication of a relationship type relating the first node type and the second node type;

generating, by the processing circuit, a search result based on the user defined search input by causing the search result to include a query result from querying the semantic building model with the query, wherein the query result comprises an indication of a portion of nodes of the plurality of nodes and a portion of relationships of the plurality of relationships identified responsive to the query; and causing, by the processing circuit, the graphic interface to display the portion of nodes of the plurality of nodes and the portion of relationships of the plurality of relationships in the first element.

12. The method of claim 11, wherein the user defined search input is a natural language input defined by a user of the user device;
wherein the method further comprises generating, by the processing circuit, the query based on the natural language input.

13. The method of claim 11, wherein the user defined search input further comprises a particular indication of a node type;
wherein generating, by the processing circuit, the search result comprises identifying, based on the particular indication of the node type, the portion of nodes by identifying that the portion of nodes are the node type.

14. The method of claim 11, wherein the method further comprises:
determining, by the processing circuit, whether the plurality of nodes includes one or more first nodes of the first node type and one or more second nodes of the second node type;
determining, by the processing circuit, whether the one or more first nodes are related to the one or more second nodes by one or more relationships of the plurality of relationships of the relationship type; and
causing, by the processing circuit, the portion of nodes of the plurality of nodes to include the one or more first nodes and the one or more second nodes and cause the portion of relationships of the plurality of relationships to include the one or more relationships in response to a determination that:
the plurality of nodes include the one or more first nodes of the first node type and the one or more second nodes of the second node type; and
the one or more first nodes are related to the one or more second nodes by the one or more relationships of the plurality of relationships of the relationship type.

15. The method of claim 11, further comprising receiving, by the processing circuit, a second search input from the user device, wherein the second search input is a shape drawn by a user on the user interface, wherein the method further comprises generating, by the processing circuit, a second search result based on the shape.

16. The method of claim 15, further comprising determining, by the processing circuit, whether the portion of nodes of the plurality of nodes displayed by the user interface are graphically within the shape drawn by the user;
wherein generating, by the processing circuit, the second search result comprises causing the search result to include the portion of nodes in response to a determination that the portion of nodes are graphically within the shape drawn by the user.

17. The method of claim 11, further comprising receiving, by the processing circuit, historical user input indicating feedback of a user of previous search results;
wherein generating, by the processing circuit, the search result is based on a learning model and the historical user input.

18. The method of claim 17, further comprising:
receiving, by the processing circuit, one or more interactions with the user interface causing the user interface to display one or more other nodes of the plurality of nodes and one or more other relationships of the plurality of relationships; and
updating, by the processing circuit, the historical user input to include the one or more interactions, the one or more other nodes, the one or more other relationships, and the user defined search input.

19. The method of claim 11, wherein the user defined search input is a text input defined by a user of the user device.

20. A building system for searching a semantic building model, the building system comprising:
one or more memory devices configured to store instructions and the semantic building model, wherein the semantic building model comprises a plurality of nodes and a plurality of relationships between the plurality of nodes; and
one or more processors configured to execute the instructions to:
cause a user interface of a user device to display a graphic interface including a first element including the plurality of nodes of the semantic building model and the plurality of relationships between the plurality of nodes of the semantic building model and a second element configured to receive a user defined search input;
receive, via the second element of the graphic interface, the user defined search input from the user device, the user defined search input defining a query comprising one or more first nodes of the plurality of nodes and one or more relationships, the one or more relationships relating the one or more first nodes to one or more second nodes of the plurality of nodes, wherein the user defined search input is a natural language input defined by a user of the user device;
generate the query based on the natural language input;
generate a search result based on the user defined search input by causing the search result to include a query result from querying the semantic building model with the query, wherein the search result comprises an indication of a portion of nodes of the plurality of nodes and a portion of relationships of the plurality of relationships identified responsive to the query; and
cause the graphic interface to display the portion of nodes of the plurality of nodes and the portion of relationships of the plurality of relationships in the first element;
wherein the building system is at least one of:
a local system located within a physical building; or
a remote processing system located outside the physical building.

* * * * *